(12) United States Patent
Eliscu

(10) Patent No.: US 7,769,649 B1  
(45) Date of Patent: Aug. 3, 2010

(54) SYSTEM FOR AND METHOD OF HANDLING REFERRALS FROM REFERRING PARTIES

(75) Inventor: A. Maxwell Eliscu, Orlando, FL (US)

(73) Assignee: LSQ II, LLC, Orlando, FL (US)

( * ) Notice: Subject to any disclaimer, the term of this patent is extended or adjusted under 35 U.S.C. 154(b) by 2459 days.

(21) Appl. No.: 09/667,391

(22) Filed: Sep. 20, 2000

(51) Int. Cl.
 *G06Q 40/00* (2006.01)
(52) U.S. Cl. ........................................ 705/35
(58) Field of Classification Search .............. 705/35–37
 See application file for complete search history.

(56) References Cited

U.S. PATENT DOCUMENTS

| | | | |
|---|---|---|---|
| 5,774,883 A * | 6/1998 | Andersen et al. ............. | 705/38 |
| 6,029,141 A * | 2/2000 | Bezos et al. .................. | 705/27 |
| 2001/0034615 A1 * | 10/2001 | Wilkinson et al. ............. | 705/2 |
| 2001/0037265 A1 * | 11/2001 | Kleinberg ..................... | 705/27 |
| 2001/0037274 A1 * | 11/2001 | Monticciolo .................. | 705/35 |
| 2001/0049646 A1 * | 12/2001 | Wilkinson .................... | 705/36 |

* cited by examiner

*Primary Examiner*—Hyung Sough  
*Assistant Examiner*—Jennifer Liversedge  
(74) *Attorney, Agent, or Firm*—Foley & Lardner LLP

(57) ABSTRACT

A method in a transaction management and financial services system configured to communicate between a server and at least one remote device via a network is described. The method can include the steps of receiving a referral from a referring party where the referral including information regarding any one of a financing-seeking party that has been declined by the referring party and a transaction management-seeking party; and storing the information regarding the referral in a storage device. Other methods performed by the integrated financial and transaction management services system are also described.

58 Claims, 47 Drawing Sheets

SYSTEM FOR AND METHOD OF HANDLING REFERRALS FROM REFERRING PARTIES

FIELD OF THE INVENTION

The present invention relates generally to transaction management and financial services. More particularly, the present invention relates to a system for and a method of providing financial and transaction management services to small companies. Additionally, the present invention relates to a system for and a method of receiving referrals from referring parties, including independent lenders, insurance companies, leasing companies, governmental groups (e.g., local, state, federal, international), business to business web portals or e-commerce marketplaces or any party referring businesses who may be seeking or may benefit from the transaction management and financial services provided by the system.

BACKGROUND OF THE INVENTION

Small businesses are traditionally forced to spend a significant amount of resources on tasks that are unrelated to the main focus of their business. Examples of these tasks for a small business acting as a Seller include obtaining financing, managing financing transactions, identifying potential commercial customers, determining viability and suitability of potential commercial customers (e.g., credit evaluation), engaging commercial customers, completing orders for the commercial customers, preparing and managing all the paperwork associated with the commercial transaction, managing accounts receivable which are the outcome of a commercial transaction with the engaged customer for which credit terms were extended, receiving payments on accounts receivable, applying those received payments, preparing deposit tickets and depositing received payments, handling disputes over commercial transactions, managing relationship with commercial customers, etc. Examples of these tasks for a small business acting as a Buyer include locating commercial concerns capable of providing requested products and services, requesting financing, providing and transferring the information requested by the located commercial concern in order to approve the requested financing, obtaining financing (e.g., domestic trade credit, net 30 net 60), preparing and sending purchase orders, receiving product or service, receiving commercial transaction documentation which may include detail concerning the amount and date moneys are owed, confirming the accuracy of commercial transaction documentation, scheduling requests for payment, on the scheduled date identifying that sufficient funds are available to make payment, initiating payment, reconciling and closing the commercial transaction, etc.

Traditionally, managing these tasks either for a Seller or a Buyer requires significant resource allocation as Sellers and Buyers utilize traditional tools (e.g., phone calls, voice mail messages, faxes, mail, etc) to approve and manage their relationships with each other, the commercial transactions resulting from those relationships, and the commercial transactions documents resulting from those transactions. Larger businesses are able to handle many of these transactions using automated systems and properly staffed and trained departments. Additionally, they often offer transactional services to their customers over the Internet. Small businesses generally are not able to dedicate the same level of human or technological resources to these administrative functions as their larger counterparts. Driving this inequity are the scale and capital base required to justify the human and technological investment made by larger companies.

Small businesses also face problems when they seek to offer business to business e-commerce services to their customers. E-commerce can replace phone calls, faxes, invoicing, direct sales, and other communication means traditionally used in buying, selling, and post-sales customer support between businesses. However, business to business e-commerce poses challenges for small businesses. For example, small companies do not generally have the resources to implement e-commerce solutions or gain real time knowledge regarding new customers.

Thus, there is a need in the marketplace to facilitate and/or conduct business to business financial and transaction management services for small companies, thereby alleviating internal workload constraints and saving business managers and owners from unnecessary distractions.

Small businesses also face difficulties when obtaining financing from traditional financing institutions. In many cases, small business are unable to meet a financial institution's minimum criteria, and are thus declined for the requested financing. As financial institutions have a substantial investment in the distribution channels (e.g., branch network, sales force, Internet, brand awareness, etc.) necessary to attract prospective customers and migrate existing customers to new products and services, declining small businesses for financing creates enormous sunk costs for financial institutions. Further, being declined by a financial institution forces small businesses to seek financing elsewhere, requiring them to repeat the financing request process.

The traditional referral model, which is designed to extract value from customers that are declined for financing—"declinations"—or that are referred for other reasons, is cumbersome and incapable of recouping the substantial value that exists within these declinations. In the traditional referral model, financial institutions seek to extract value from these declinations by recommending or providing information on alternative solution providers. Although such alternative solution providers may not be owned by the financial institution, suggesting an alternative solution provider lessens the negative effect of the financial institutions' inability to meet the financing needs of its customers and prospects. The financial institution may also be able to obtain fee income from the alternative solution providers.

The traditional referral process, which is paper-intensive and includes little if any automation, breeds inefficiencies as financial institutions seek to compile, refer, track, and manage referrals to alternative solution providers. In addition, as financial institutions refer declinations to alternative solution providers and declinations become the customers of these alternative solution providers, financial institutions erode their relationship, access, and brand exposure to declinations. As a result of this erosion, financial institutions cannot fully leverage the value to the franchise which may exist within the declinations.

Thus, there is a need for an automated system and method that manages and tracks declinations and referrals. There is a further need for a system that allows financial institutions or any other party that may provide referrals to more completely recoup the sunk cost that exists within their declined customers and prospects, but cannot be captured through the traditional declination and referral model. More generally, there is a need for a system and method for referring parties in a manner which improves and deepens the relationship between the referring party and the referred party. Further, there is a need for a system and method for financial institutions to automate the delivery of targeted content, products, and services to declinations. Further still, there is a need for a declination referral model that provides alternative credit offers to small businesses not qualifying for credit from a financial institution. Yet even further, there is a need to enable a plurality of financial institutions to seamlessly deliver a full complement of banking products and services to declined customers and prospects while retaining access and maintaining brand exposure to these declined customers and prospects.

SUMMARY OF THE INVENTION

One aspect of an exemplary embodiment of the invention relates to a transaction management and financial services system configured to communicate between a server and at least one remote device via a network. In such a system, a method includes receiving a referral from a referring party where the referral includes information regarding any one of a financing-seeking party that has been declined by the referring party, a transaction management-seeking party, a trade credit-seeking party, and a credit guarantee-seeking party; and storing the information regarding the referral in a storage device.

Briefly, another exemplary embodiment relates to a system configured to provide transaction management and financial services and to communicate between a server and at least one remote device via a network. The system includes means for receiving a referral from a referring party where the referral includes information regarding any one of a financing-seeking party that has been declined by the referring party, a transaction management-seeking party, a trade credit-seeking party, and a credit guarantee-seeking party; and means for storing the information regarding the referral in a storage device.

Briefly, another exemplary embodiment relates to a computer program product comprising computer readable program code for handling declinations. The program code in the computer program product including first computer readable program code for receiving a referral from a referring party where the referral including information regarding any one of a financing-seeking party that has been declined by the referring party, a transaction management-seeking party, a trade credit-seeking party, and a credit guarantee-seeking party; and second computer readable program code for storing the information regarding the referral in a storage device.

Other features and advantages of embodiments of the present invention will become apparent to those skilled in the art upon review of the following drawings, the detailed description, and the appended claims.

BRIEF DESCRIPTION OF THE DRAWINGS

The invention is illustrated by way of example and not limitation in the figures of the accompanying drawings, in which like references indicate similar elements and in which:

FIG. 10 [was removed];

FIG. 22 is an exemplary screen display illustrating an account statement for a user of the transaction management and financial services system illustrated in FIG. 1;

FIG. 27 is an exemplary screen display illustrating an account statement where a user of the transaction management and financial services system illustrated in FIG. 1 has elected to dispute one of the invoices listed in the account;

FIG. 30 is an exemplary screen display illustrating the account status for a buyer using the transaction management and financial services system illustrated in FIG. 1;

FIG. 31 is an exemplary screen display illustrating a pop up window that is created when the seller viewing the screen display of FIG. 30 makes an advance request that is greater that the amount of funds available to that seller;

FIG. 33 is an exemplary screen display illustrating a window including communication functionality available to a buyer in the transaction management and financial services system illustrated in FIG. 1;

DETAILED DESCRIPTION OF THE EXEMPLARY EMBODIMENTS

A system for and method of providing financial and transaction management services over a network are described. In the following description, for purposes of explanation, numerous specific details are set forth in order to provide a thorough understanding of exemplary embodiments of the invention. It will be evident, however, to one skilled in the art that the invention may be practiced without these specific details. In other instances, well-known structures and devices are shown in block diagram form in order to facilitate description of the exemplary embodiments of the invention.

In one embodiment, a computer system is used which has a processing unit that executes sequences of instructions contained in a memory. More specifically, execution of the sequences of instructions causes the processing unit to perform steps, which are described below. The instructions may be loaded into a random access memory (RAM) for execution by the processing unit from a read-only memory (ROM), a mass storage device, or some other persistent storage.

In other embodiments, hardwired circuitry may be used in place of, or in combination with, software instructions to implement the present invention. Thus, the embodiments described herein are not limited to any specific combination of hardware circuitry and software, nor to any particular source for the instructions executed by the computer system.

Figure 1:
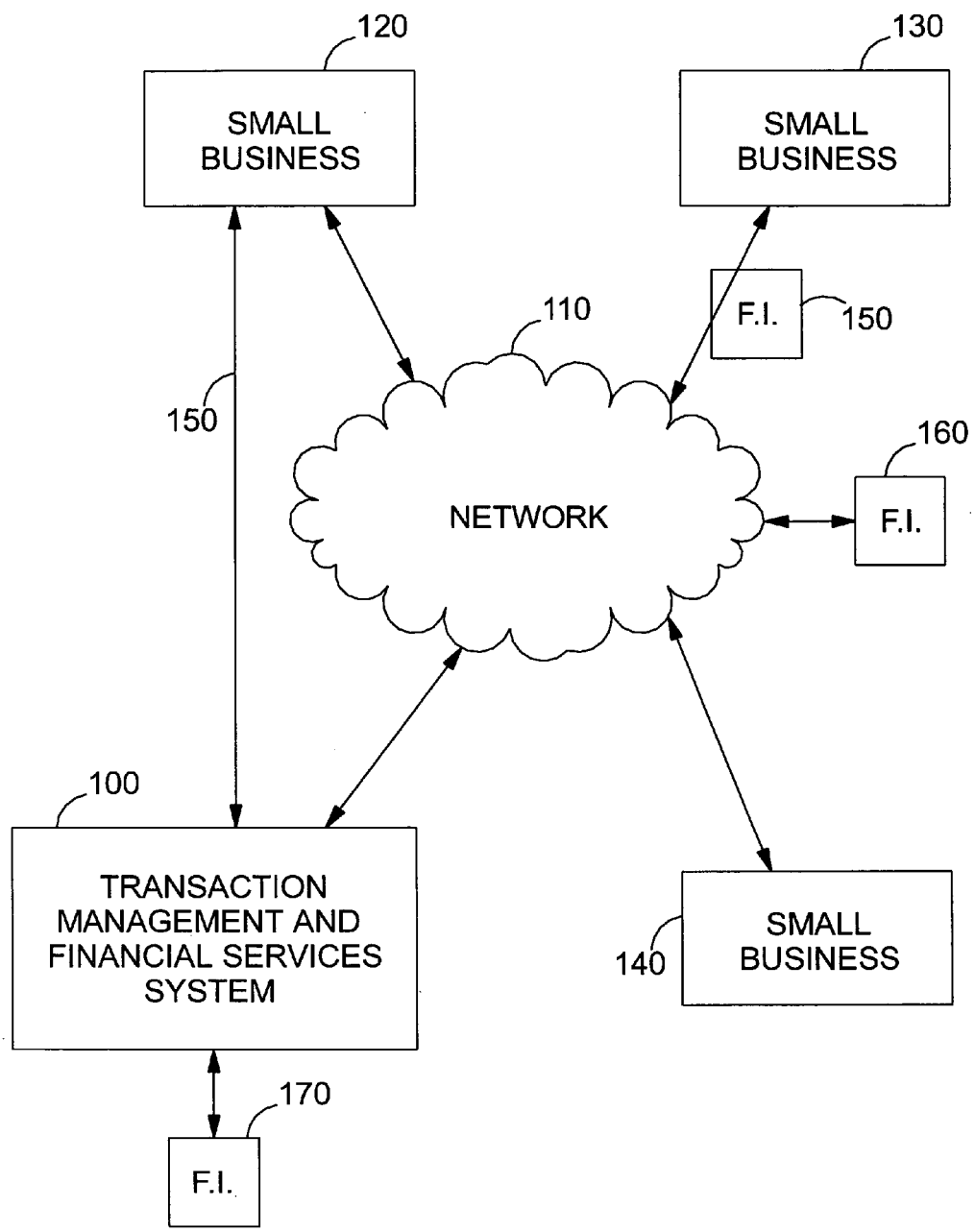
FIG. 1 is a general diagrammatical representation of an environment of operation for a transaction management and financial services system in accordance with an exemplary embodiment of the invention.

FIG. 1 illustrates a transaction management and financial services system 100 that is configured to communicate with network 110. Network 110 can be the Internet, a worldwide network of computer networks that use the TCP/IP network protocols to facilitate data transmission and exchange. In such an embodiment, network 110 provides communication with Hypertext Markup Language (HTML) web pages or any other type of presentation format, such as, formats used in WAP phones or any other communication device. In alternative embodiments, network 110 is any type of network, such as, a virtual private network, an intranet, a WAN, a LAN, or extranet.

System 100 is configured to communicate with any number of small businesses, such as, small business 120, small business 130, and small business 140. Small business 120 can, for example, communicate with system 100 via network 110 or via a direct communication link 150. Small businesses 120, 130, or 140 can communicate with system 100 using a personal computer, a personal digital assistant (PDA), a telephone, or any other device enabled to communicate information to system 100. Businesses 120, 130, and 140 can be associated with any type of commerce, including retail, distribution services, manufacturing, design, etc.

System 100 can communicate with a small business (one of businesses 120, 130, 140) via a financial institution. For example, in one embodiment, small business 130 communicates with system 100 via a financial institution 150 connected to network 110. In another embodiment, a financial institution 160 is configured to communicate with system 100 via network 110. In another embodiment, a financial institution 170 is directly coupled to communicate with system 100 without communication via network 110. Financial institutions 150, 160, and 170 can be banks, credit unions, loan companies, or any entity offering financial services.

Figure 2:
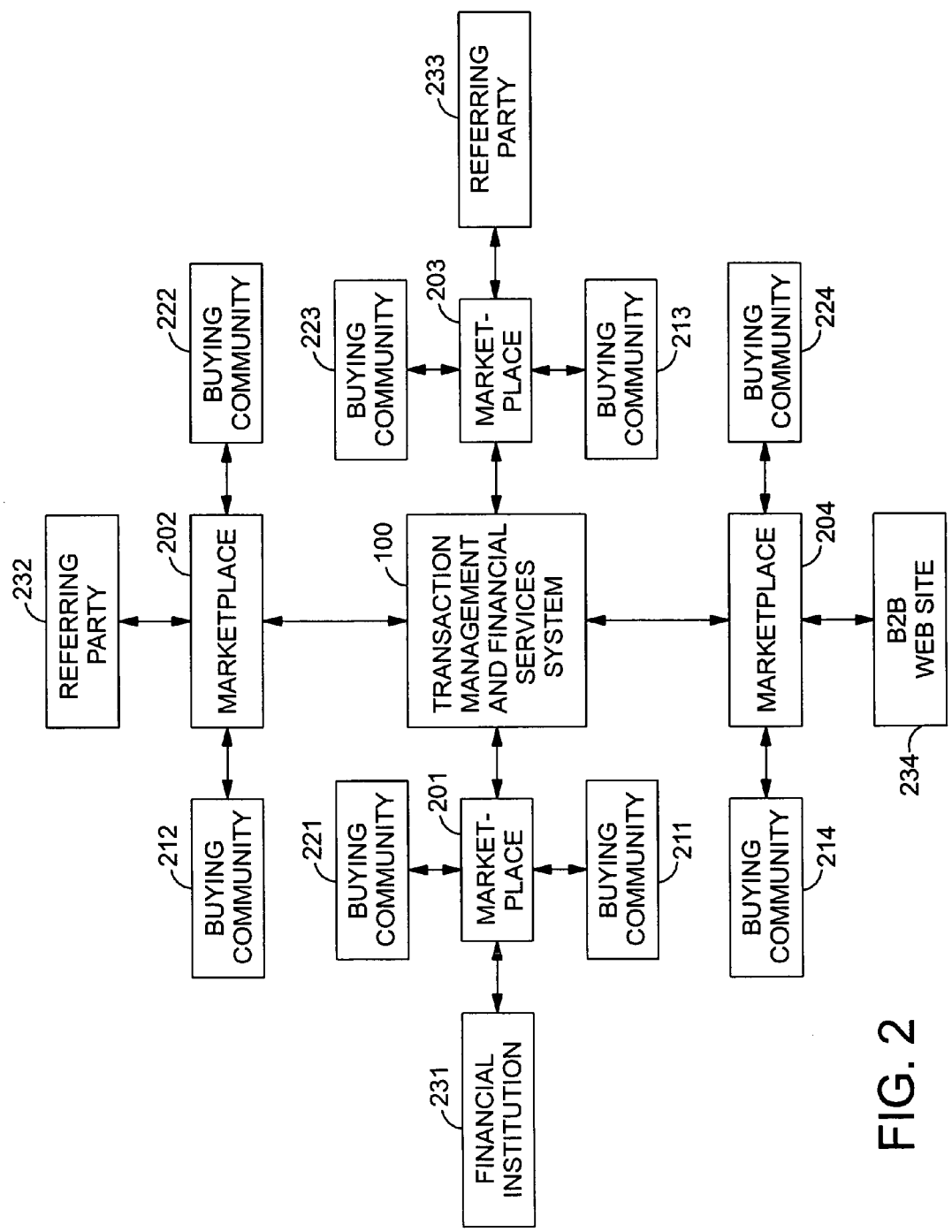
FIG. 2 is a diagrammatical representation of exemplary operational aspects of the transaction management and financial services system illustrated in FIG. 1.

FIG. 2 illustrates operational aspects of an exemplary embodiment of transaction management and financial services system 100. In one embodiment, transaction management and financial services system 100 establishes a marketplace, such as marketplaces 201, 202, 203 and 204 further described below with reference to FIG. 3. A marketplace is an operational environment configured to allow interactions among and between participants in system 100. Participants in system 100 can include financial institutions (institutions 150, 160, 170); buyers; sellers; advertisers; local, state, federal and international governmental bodies; or professional service providers. In one embodiment, each marketplace can be associated with a referring party, such as, a financial institution. Association with a referring party can include providing screen displays which give a look and feel that furthers brand exposure of the referring party, a look and feel which comports with the brand image of the referring party in which an impression is created that the operations of transaction management and financial services system 100 are being performed by the referring party, or a look and feel which comports with the brand image of the referring party in which an impression is created that the operations of transaction management and financial services system 100 are being performed in affiliation with the referring party.

A referring party can be financial institution, an independent lender, an insurance company, a leasing company, a governmental group (e.g., local, state, federal, international), a business to business Web portal or e-commerce marketplace or any party referring businesses who may be seeking or may benefit from the transaction management and financial services provided by system 100, or that has entered into a marketing relationship with transaction management and financial services system 100. In an exemplary embodiment, marketplaces 201, 202, 203 and 204 are associated with financial institutions 231, referring party 232, 233, and B2B web site 234, respectively.

Each marketplace is also associated with at least one buying community. A buying community is a collection of buyers and sellers utilizing the operations of marketplace 201, provided via system 100. In an exemplary embodiment, marketplaces 201, 202, 203, and 204 are also associated with buying communities 211, 212, 213, 214, 221, 222, 223 and 224. The interrelation between the marketplace, the referring party and the associated buying communities are described below with reference to FIG. 3.

Figure 3:
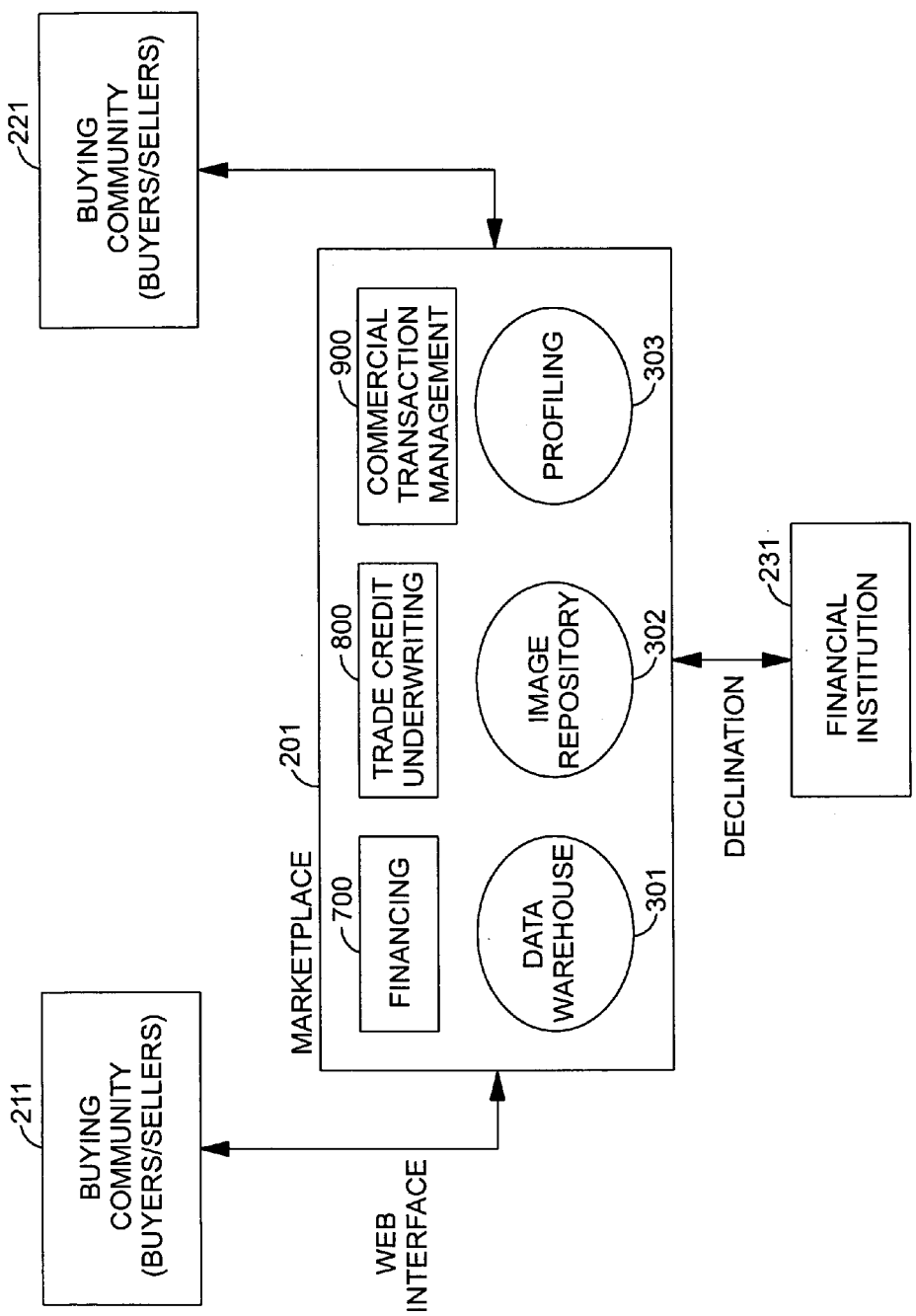
FIG. 3 is a diagrammatical representation of exemplary operations of a marketplace in the transaction management and financial services system illustrated in FIG. 1.

FIG. 3 illustrates an exemplary embodiment of marketplace 201 that is configured to interact with buying communities 211 and 221 and financial institution 231. Buying communities 211 and 221 consist of at least one buyer and at least one seller. Marketplace 201 includes a data warehouse 301, an image repository 302, and a profiling module 303. Exemplary processes carried out in marketplace 201 can include financing 700, trade credit underwriting 800, and commercial transaction management 900.

Marketplace 201 provides buyers and sellers in buying communities 211 and 221 with access to services offered by both financial institution 231 and transaction management and financial services system 100. For example, system 100 provides financing, trade credit underwriting, and commercial transaction management. One embodiment of financing in system 100 is described below with reference to FIG. 7. One embodiment of trade credit underwriting is described below with reference to FIG. 8. One embodiment of commercial transaction management is described below with reference to FIG. 9.

In an exemplary embodiment, marketplace 201 can be implemented as a plurality of customized web pages in which participants interact with other participants in marketplace 201 and in which the web pages contain advertisements for services offered by financial institution partner 231, feature the logo of the financial institution partner 231, or any other desirable customization, including content. Advantageously, these web pages allow participants a convenient forum for managing, maintaining, modifying, and concluding all commercial transactions or financing related services. Similarly, a web page custom created based on the participant's stored profile allows the financial institution for that marketplace to provide target marketing to the participants while enhancing brand exposure and deepening customer relationships. Customization may include brand information associated with the referring party. As explained above, brand information may be used to indicate that operations offered in marketplace 201 are offered in affiliation with a referring party or, alternatively, that operations in marketplace 201 are being performed by a referring party.

In an exemplary embodiment, data warehouse 301 provides a storage device used by marketplace 201 to store data, including commercial transaction information, ancillary commercial transaction information, and all other information captured during and resulting from the operations of marketplace 201 (e.g., trade credit underwriting, commercial transaction management, financing). Image repository 302 stores images, including images associated with commercial transaction information, ancillary commercial transaction information, and all other images captured during and resulting from the operations of marketplace 201. Commercial transaction information can include commercial transaction data and images of the documents evidencing the transaction, such as, invoices, purchase orders, shipping documentation, check copies, check remittance information, credit memos, time tickets, or any other documentation associated with commercial transactions. Ancillary commercial transaction information can include information obtained from external parties, such as, electronic shipping information, bank account information, or any other information necessary to manage, maintain, modify, and conclude commercial transactions. These images can be displayed on a plurality of screen displays or used in some other fashion to assist the participants and system 100 in managing, maintaining, modifying, and completing the operations of marketplace 201.

In one embodiment, image repository 302 stores images of documents involving off-line transactions. As such, obtaining commercial transaction information includes receiving electronic commercial transaction information, receiving paper-based commercial transaction information, converting the paper-based commercial transaction information into an electronic format, and storing the received commercial transaction information in image repository 302.

By storing images and data within the marketplace, participants have real-time (or near real-time) access to all commercial transaction information, whether created online or off-line necessary to manage, maintain, modify, and conclude commercial transactions. Conventionally, a business needing to send commercial transaction information to another party is forced to retrieve the documents containing the requested information from records departments, filing cabinets, or computer records. Then, the documents must be either faxed or mailed to the requesting party. In contrast, transaction management and financial services system 100 allows commercial transaction information to be instantly called up and simultaneously communicated to the requesting party. Preferably, commercial transaction information is stored in a web server, database, or any such structure capable of electronic data storage. An exemplary infrastructure is described below with reference to FIG. 4.

In an exemplary embodiment, profiling module 303 can be used by system 100, participants, and external users to analyze the data (including commercial transaction information, ancillary commercial transaction information, and all other information captured during and resulting from the operations of marketplace 201) in data warehouse 301. The analysis enabled by profiling module 303 results in the creation of a profile for a user, which can be either a specific company user or a specific individual user within a company. In addition to data analysis, the profiling module 303 allows the customization of: the content presented to the user, the look and feel presented to the user, the advertisements presented to the user, the brand images presented to the user, and other information presented to the user.

In an exemplary embodiment, profiles are stored in databases or on a web server. The profile is based in part on unique information gathered by system 100 and in part on external information. The information stored can include the size of the business, number of years in operation, the industry of the business, the nature of the business including whether it manufactures, wholesales, distributes or retails the product it sells, payment records, purchase records, banking records, credit record, and a summary of any transactions conducted in transaction management and financial services system 100, as well as other information.

Profiling module 303 shown in FIG. 3 allows transaction management and financial services system 100 to deliver highly customized products, services, advertisements, and content to marketplace participants. For example, an advertiser or financial institution can market products and services based on any aspect or a combination of aspects in a profile. Because the advertisement can be highly specific, targeting the needs, interests, wants, problems, and other characteristics identified through profiling module 303, participants will receive content, advertisements, product and service offerings, screen display customization, and other information which is more likely to provide benefit. In addition, participants are unlikely to be subjected to advertising, content, product and service offerings, etc. which are not aligned with their needs, wants, interests, etc.

Figure 4:
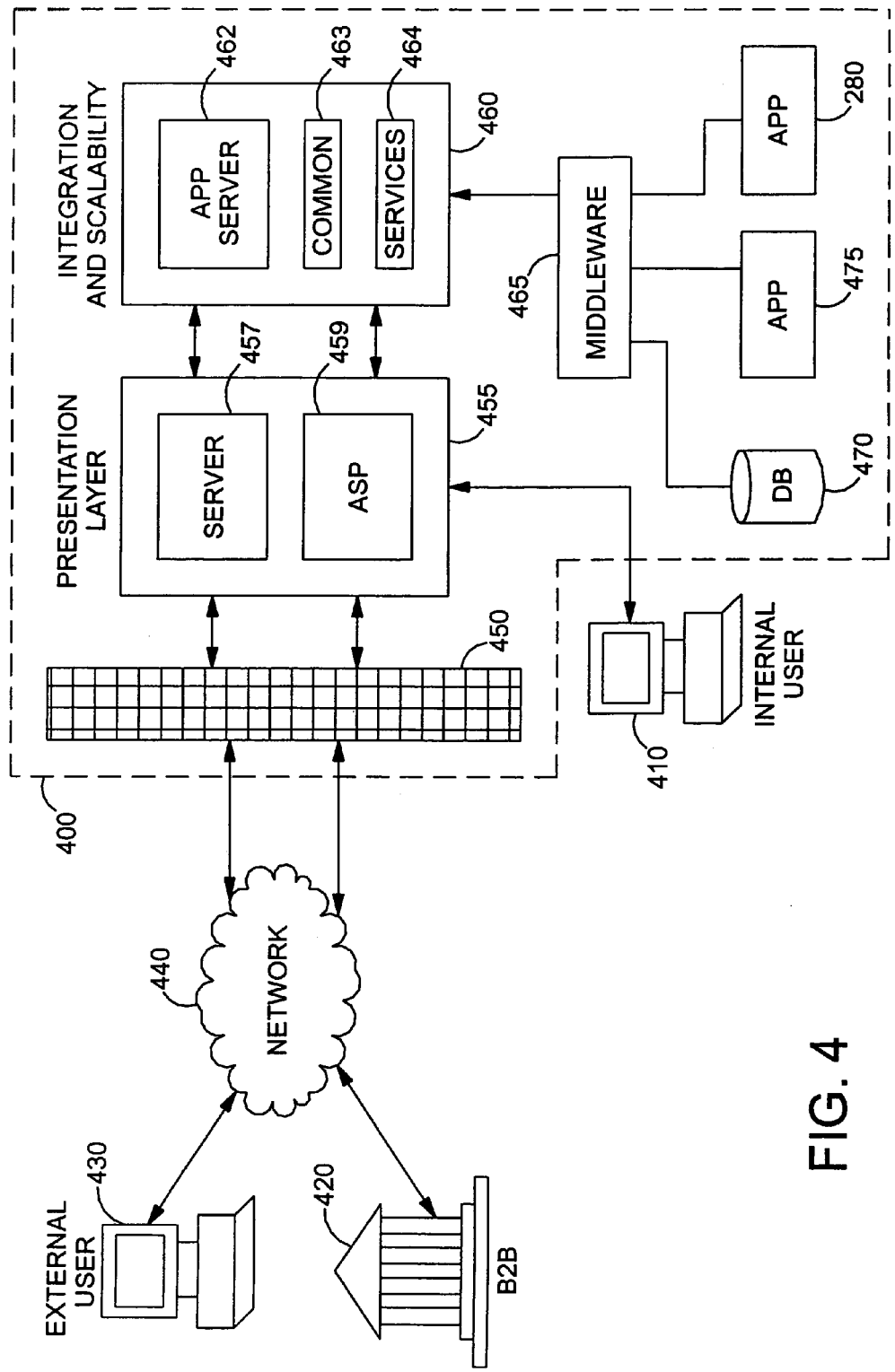
FIG. 4 is a general diagrammatical representation of an application infrastructure for an exemplary embodiment of the transaction management and financial services system illustrated in FIG. 1.

FIG. 4 illustrates an exemplary embodiment of an application infrastructure 400 for system 100. Infrastructure 400 is configured to communicate with an internal user 410 and with external users, such as, a business-to-business (B2B) company 420 or an external user 430 via a network 440. Infrastructure 400 can include a firewall 450, a presentation layer 455, an integration and scalability tier 460, middleware 465, a database 470, application software package 475, and an application software package 480.

Firewall 450 is any software, hardware, or combination of hardware and software that attempts to prevent unauthorized users from gaining access to a computer network or that monitors transfer of information to and from the network. Presentation layer 455 may include a number of components that provide user interface functions as well as business to business middleware services. In one embodiment, presentation layer 455 includes a server 457 and application specific programs (ASPs) 459. Tier 460 provides integration and scalability. In one embodiment, tier 460 includes an application server 462 and common services 463 and 464. Tier 460 provides a common interface to application packages and database, or the "back end".

Middleware 465 is any software that mediates between an application program and a network, managing the interaction between disparate applications across heterogeneous computing platforms. For example, Object Request Broker (ORB) is middleware that manages communication between objects. Middleware 465 communicates with a database 470, application package 475, and application package 480.

The application infrastructure described with reference to FIG. 4 has the advantage of allowing external user 430 and business to business site 420 to communicate with system 100 over network 440. By allowing communication over network 440, participants can access the information and functionality offered by system 100 from anywhere.

Figure 5:
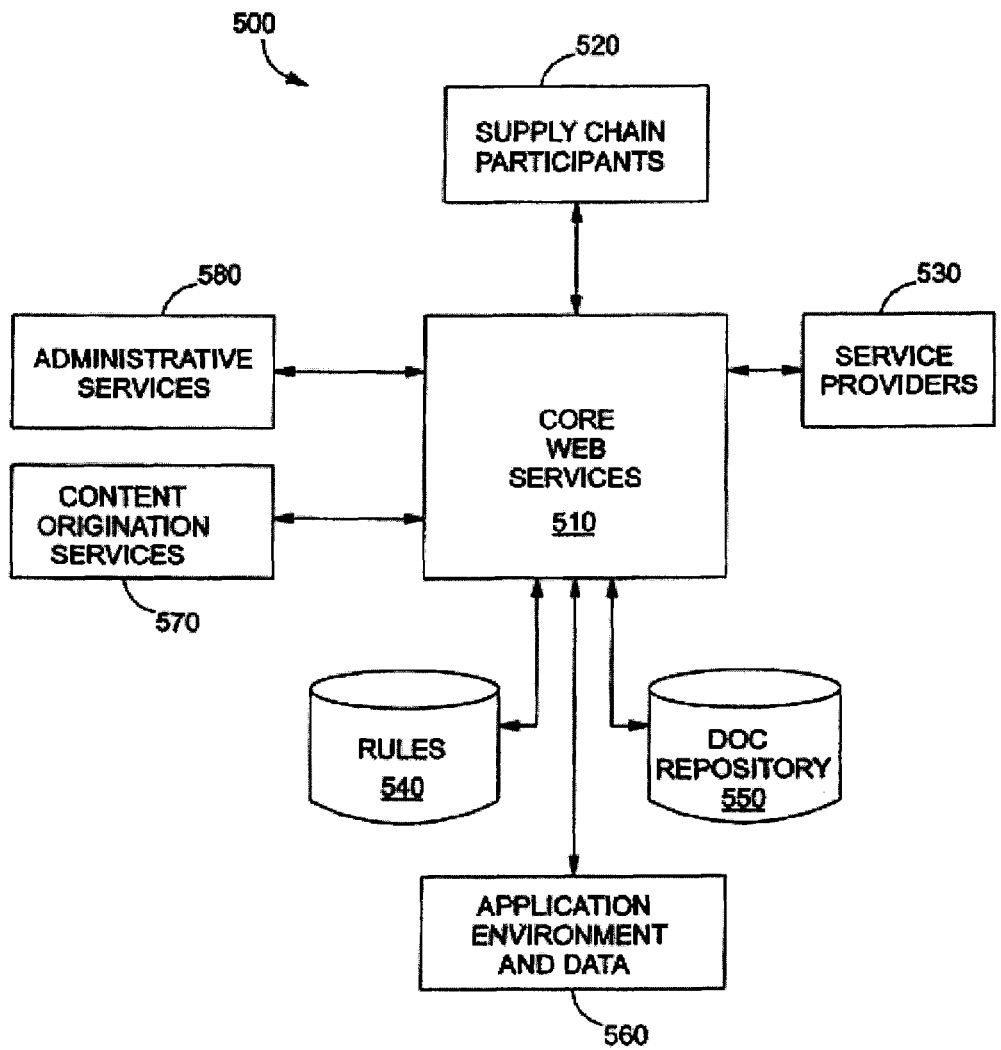
FIG. 5 is a general diagrammatical representation of an electronic commerce architecture used by an exemplary embodiment of the transaction management and financial services system illustrated in FIG. 1.

FIG. 5 illustrates an electronic commerce architecture 500 used by an exemplary embodiment of system 100. Architecture 500 can include a set of core web services 510 that can be accessed by supply chain participants 520 and service providers 530. Core web services 510 can include any of a variety of services, such as, on-line payment, Internet searching, personalization, and any other activity possible with a network of computer networks. Supply chain participants 520 can include financial institutions, B2B e-commerce marketplaces, buyers, sellers, and others involved in the supply chain. Web services 510 use data such as business rules 540 and a document repository 550. Web services 510 also interacts with an application environment and data module 560. Content origination services 570 and administrative services 580 also provide information to web services 510.

Electronic commerce architecture 500 has the advantage of allowing participants, such as, supply chain participants 520, service providers 530, administrative services 580, and content origination services 570 to have access to core web services 510. The system is scalable and flexible to allow for growth, varied technologies among participants, future technology changes, varied interface methodologies, and future changes in interface methodologies.

Figure 6:
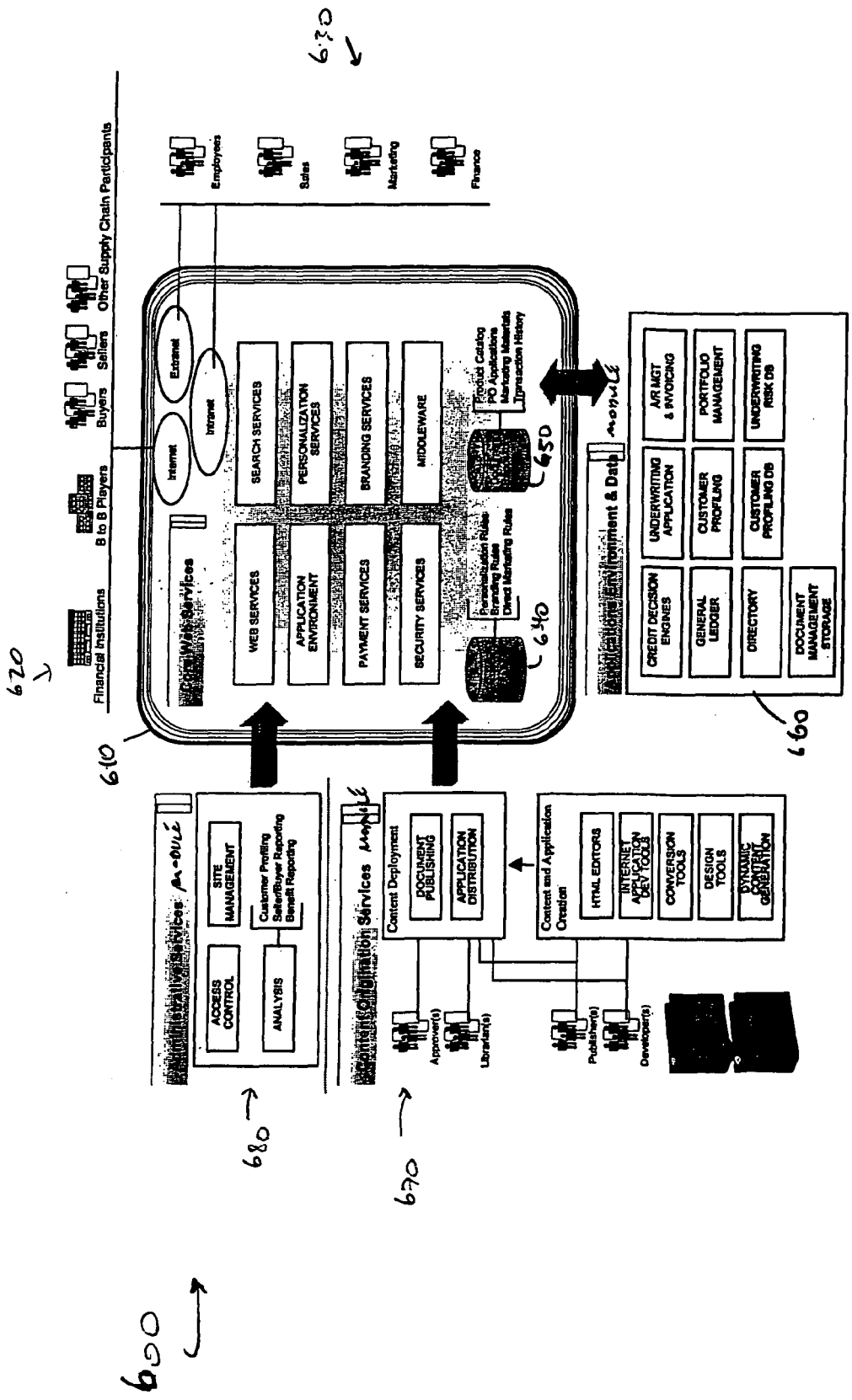
FIG. 6 is a diagrammatical representation of an exemplary embodiment of an e-commerce architecture used in the transaction management and financial services system illustrated in FIG. 1.

FIG. 6 illustrates an electronic commerce architecture 600 used by an exemplary embodiment of system 100. Architecture 600 includes a core of web services 610. The core of web services 610 includes web services, application environment, payment services, security services, search services, personalization services, branding services, and middleware. Web services 610 can be accessed and activated by participants 620, such as, financial institutions, B2B players, buyers, sellers, or any other supply chain participant. Additionally, participants 630, such as, employees, sales, marketing, and finance personnel can communicate with web services 610 to access and participate in the services contained therein. Web services 610 also includes business rules 640 and a document repository 650. Business rules 640 may include personalization rules, branding rules, and direct marketing rules used in providing the various web services of web services 610. Document repository 650 may include a product catalog, purchase order applications, marketing materials, and transaction history records and images to assist in the carrying out of the services provided by web services 610.

In addition to participants 620 and participants 630, various modules are in communication with web services 610 to augment services to participants 620 and 630. For example, an applications environment and data module 660 may be in communication with web services 610 to provide a variety of operations, such as, credit decision engines, a general ledger, a directory, document management storage, an underwriting application, customer profiling, customer profiling database, A/R management and invoicing, portfolio management, and underlying risk database. Also in communication with web services 610 can be a content origination services module 670. Content origination services module 670 may include content deployment, such as, document publishing and application distribution from approvers, librarians, publishers, or developers, as well as content and application creation by HTML editors, internet application development tools, conversion tools, design tools, and dynamic content generation.

Also in communication with web services 610 is an administrative services module 680, including access control, site management, and analysis, such as, customer profiling, seller/buyer reporting, and benefit reporting. Applications environment and data module 660, content origination services module 670, and administrative services module 680 can be provided in software, hardware, or a combination of software and hardware.

Advantageously, electronic commerce architecture 600 provides financial and transaction management services to participants 620, as described in greater detail with reference to FIGS. 7-32. Participants 620 are provided with the opportunity to obtain financing; to facilitate revenue growth; to manage, maintain, modify, and conclude off-line and on-line commercial transactions utilizing electronic commerce architecture 600. Electronic commerce architecture 600 also provides financial institutions with an opportunity to redirect declined credit applications, and other entities with a destination for finance referrals.

Figure 7A:
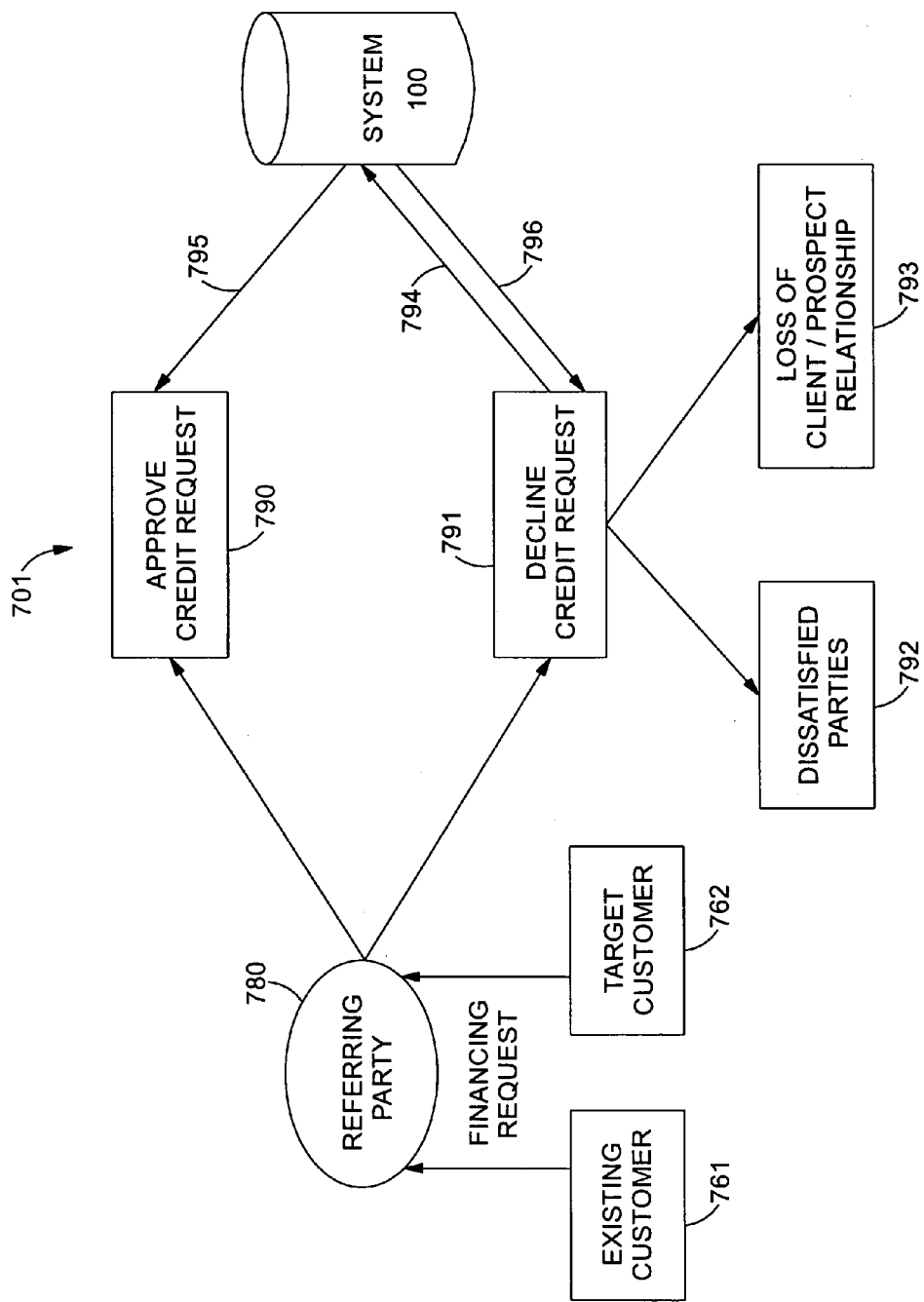
FIG. 7A is a flow diagram illustrating an exemplary process of alternative financing arrangements provided in partnership with a referring party in the transaction management and financial services system illustrated in FIG. 1.

FIG. 7A illustrates a flow diagram 701 of an exemplary process of alternative financing arrangements provided in partnership with a referring party. In diagram 701, an existing customer 761 and target customer 762 of referring party 780, submit applications to referring party 780. Following the submission of an application, referring party 780 can either approve the application, in a step 790, or decline the application, in a step 791. If the referring party declines the application, in step 791, there are two likely outcomes, either the financing seeking party remains with the referring party, but is dissatisfied, in a step 792, or the financing seeking party severs its relationship with the referring party, in a step 793. In an exemplary embodiment, the referring party seeks to maintain its relationship and brand exposure with/to financing seeking parties 761 and 762.

In one embodiment, if the financing request of financing seeking party 761 or 762 is declined, referring party 780 forwards the application for financing, in a step 794, to transaction management and financial services system 100 for review and approval. Transaction management and financial services system 100 then seeks to meet the financing need as further described with reference to FIG. 7B. Two outcomes are possible—first, transaction management and financial services system 100 approves the financing request, in a step 795, in which case referring party 780 is able to offer an alternative solution to financing seeking parties 761 and 762, or—second—transaction management and financial services system 100 declines the financing request, in a step 796, in which case no harm has been done.

Figure 7B:
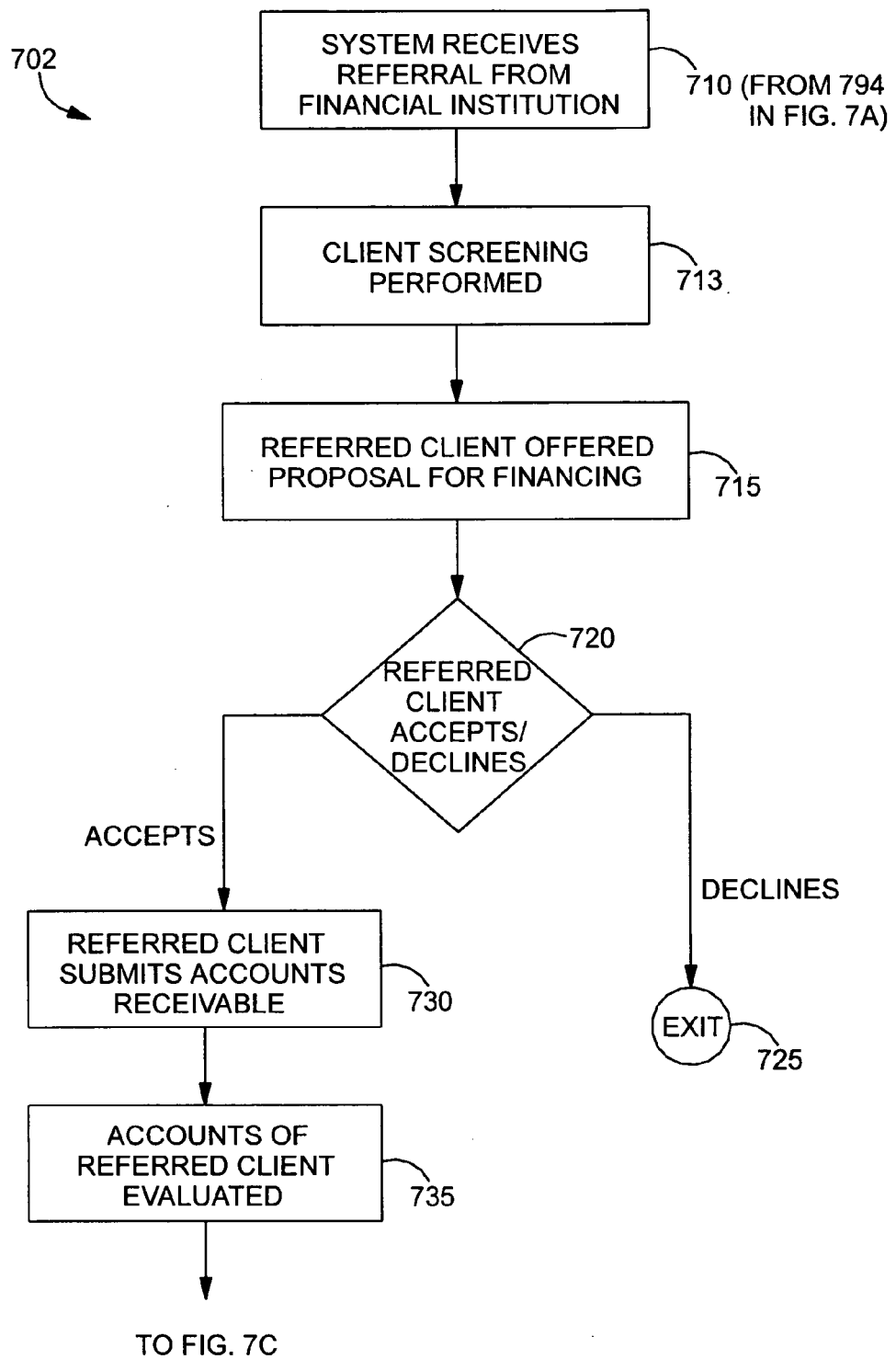
FIG. 7B is a flow diagram illustrating an exemplary method for meeting financing needs in the transaction management and financial services system illustrated in FIG. 1.

In an exemplary embodiment, all steps described with reference to FIG. 7A can be completed using the Internet. FIG. 7B illustrates a flow diagram 702 of an exemplary process of alternative financing arrangements in transaction management and financial services system 100. The exemplary process follows the declination referral model described above with reference to FIG. 7A, in which financing seeking parties are referred to transaction management and financial services system 100 by a referring party and are provided with alternative financing arrangements in lieu of a standard decline in financing from the referring party. In another embodiment, a referral is received from a referring party where no decline has been made, as described further with reference to FIG. 13D.

In a step 710 (which follows from step 794 in FIG. 7A), a referring party refers a financing seeking party to transaction management and financial service system 100. In an exemplary embodiment, the referring party is a bank, an independent lender, or any other financial institution offering financing. After step 710, a step 713 is performed in which a client screening process is performed to determine whether the referred client is a satisfactory client. One embodiment of a client screening process is described below with reference to FIGS. 16B and 16C.

After step 713, a step 715 is performed in which the financing seeking party is offered a proposal for financing by transaction management and financial service system 100. In an exemplary embodiment, this proposal for financing is made in the name of the referring party, on behalf of the referring party, in connection with the referring party or as the result of a relationship with the referring party by transaction management and financial service system 100 via a web interface. In another exemplary embodiment, the screen display at a remote device accessing transaction management and financial service system 100 is customized to further the brand exposure of the referring party. A representative of transaction management and financial service system 100 can make this proposal for financing in person, by mail, by telephone, over the Internet, or by any other communication method. Following step 715, a step 720 is performed in which the financing seeking party either accepts or declines the proposal for financing. If the referred client declines proposal for financing, a gracious exit procedure 725 is performed.

Figure 7C:
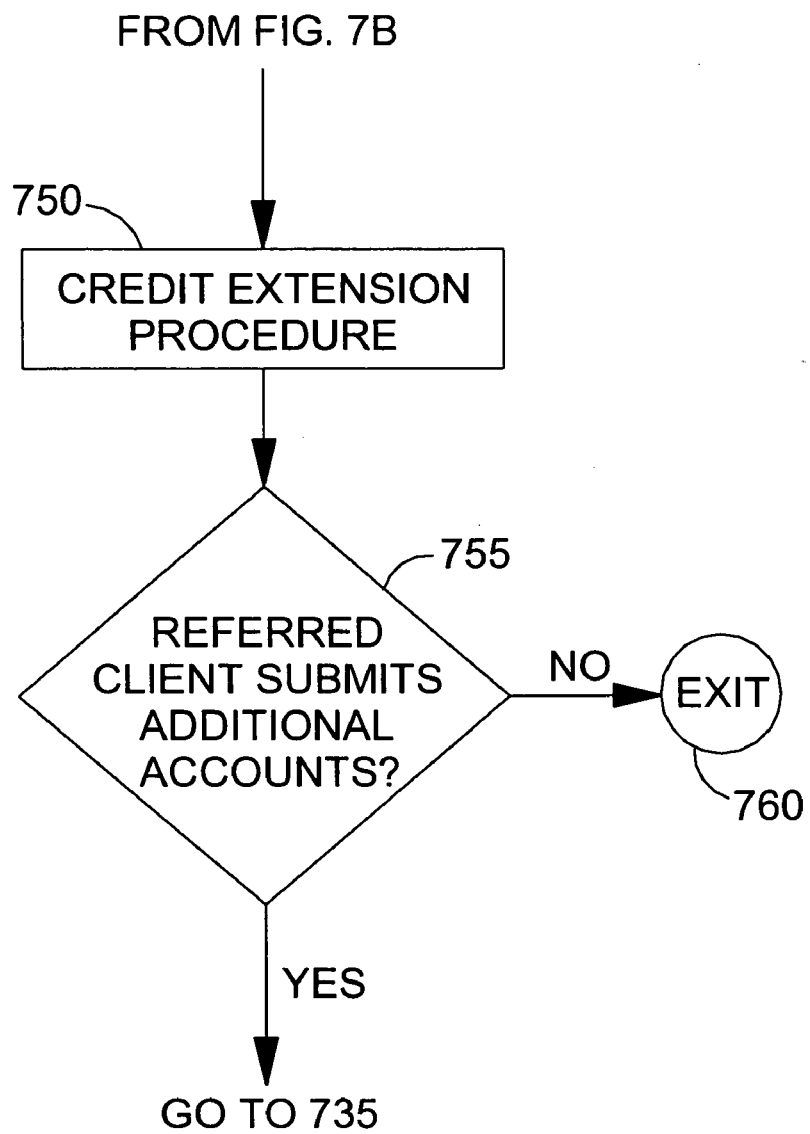
FIG. 7C is a flow diagram illustrating an exemplary method for meeting financing needs in the transaction management and financial services system illustrated in FIG. 1.

If the referred client chooses to accept the proposal for financing in step 720 a credit extension procedure is performed in step 750 (FIG. 7C). In an exemplary embodiment, this proposal for financing comprises an offer for receivables based financing. In this embodiment, a step 730 is performed. In step 730, the financing seeking party submits accounts receivable to transaction management and financial service system 100. In one embodiment, the financing seeking party meets with financial personnel of transaction management and financial service system 100 to arrange for transaction management and financial service system 100 to provide accounts receivable financing. Alternatively, the arrangement for transaction management and financial service system 100 to provide accounts receivable financing can be conducted completely over the Internet, or any other method of communication. In yet another embodiment, the submission and financing of the accounts receivable can be conducting completely over the Internet, or any other method in which transaction management and financial service system 100 obtains referrals. Advantageously, the expertise, economies of scale, and unique methods of transaction management and financial service system 100 make it much less expensive and time consuming for transaction management and financial service system 100 to make a proposal to and provide financing for the financing seeking party.

Following submission of the accounts receivable in step 730, a step 735 is performed in which the transaction management and financial service system 100 uses internal standards to evaluate the accounts of the referred client. In an exemplary embodiment, transaction management and financial service system 100 extends credit based on the value of the account receivable. Based on the review in step 735 by transaction management and financial service system 100, a credit extension procedure, step 750 is performed. In an exemplary embodiment, an account is set up for the financing seeking party in marketplace 201 (described with reference to FIG. 3). In another embodiment, marketplace 201 is accessed by the financing seeking party via the Internet. In yet another embodiment, the financing seeking party accesses and manages the financing provided by transaction management and financial service system 100, or an alternative financing provider, via marketplace 201. Advantageously, marketplace 201 allows the referring party to maintain access to and brand exposure with declined financing seeking parties. In addition, marketplace 201 allows the referring party to gain access to and develop brand exposure with the buying community of financing seeking parties. In an exemplary embodiment, each participant in the marketplace has a buying community.

Following step 750, a step 755 is performed in which the financing seeking party has the option of submitting additional accounts receivable to transaction management and financial service system 100. If the financing seeking party chooses to submit additional accounts, the financing seeking party is cycled back to the account evaluation step 735. Alternatively, if the financing seeking party does not submit additional accounts, transaction management and financial service system 100 assists in, or facilitates the management, maintenance, modification and conclusion of the transactions.

According to an exemplary embodiment, all of the steps in flow diagram 700 can be performed via the Internet. Web pages and e-mail messages can be used to exchange the necessary information between transaction management and financial service system 100 and financing seeking parties and referring parties.

Figure 8A:
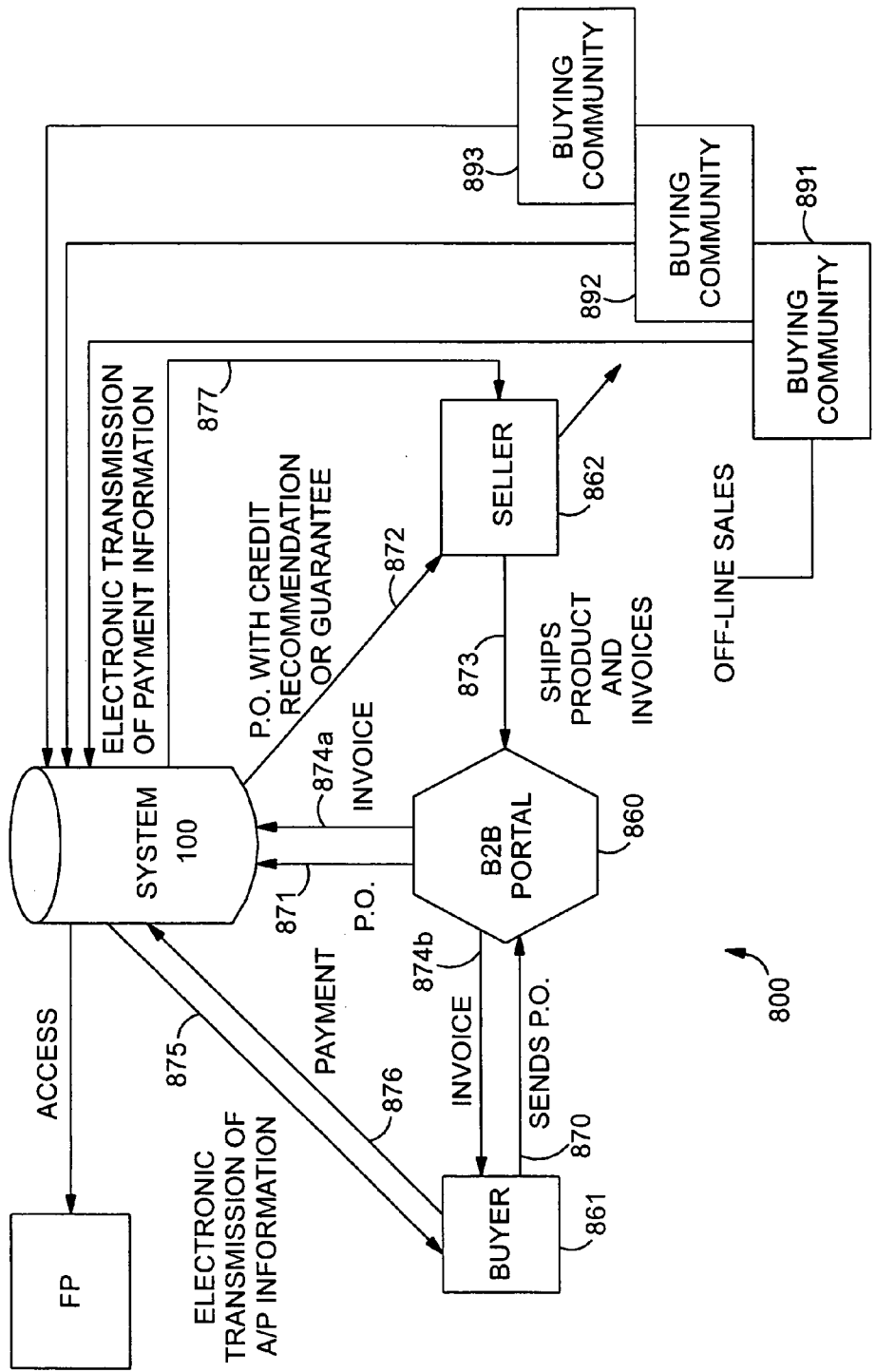
FIG. 8A is a diagrammatical representation of an exemplary embodiment of transaction management and financial services system 100 configured to interact with a business to business (B2B) portal to provide trade credit underwriting and commercial transaction management services to B2B portal participants.

FIG. 8A illustrates a diagram 800 showing how an exemplary embodiment of transaction management and financial services system 100 can be configured to interact with a business to business (B2B) portal 860 to provide trade credit underwriting and commercial transaction management services to participants of B2B portal 860. In diagram 800, a buyer 861 wants to purchase product from a seller 862, utilizing the technological resources of B2B portal 860 to market and conduct commercial transaction over the Internet. In one embodiment, buyer 861 may not be able to purchase product using credit cards. For various reasons, ranging from insufficient credit card availability to lack of approval from a procurement department for non-standard purchasing terms, buyer seeks to establish credit terms with seller for the purchase of goods and services through B2B portal 860. Seller 862, a small business with limited credit staff and history selling to firms over the Internet, has opted to participate in the trade credit analysis and commercial transaction management services offered by B2B portal 860, through transaction management and financial services system 100.

In an exemplary embodiment, in a step 870, a purchase order (P.O.) is issued by buyer 861 and sent through B2B portal 860, in step 871 to system 100 (described further with reference to FIG. 14 below). In another embodiment, the P.O. is issued and mailed directly to Seller 862. In still another embodiment, the P.O. is sent, electronically or via paper based P.O., to transaction management and financial services system 100. Were it not for the exemplary embodiment of transaction management and financial services system 100 converting the commercial transaction documentation to electronic format, including images (described with reference to FIG. 14), the commercial transactions would be moved off-line.

Transaction management and financial services system 100 analyzes buyer 861, and, in a step 872, forwards the P.O. and recommendation/guarantee on to seller (described with reference to FIG. 18 and FIGS. 8C-D). Seller 862, if approving of the recommendation or accepting of the guarantee, ships its product or provides its services to buyer 861. In a step 873, Seller 862 forwards an electronic invoice for payment to B2B portal 860. The invoice is further forwarded to transaction management and financial services system 100 in a step 874a and then on to buyer 861, in a step 874b. In an exemplary embodiment, the invoice is forwarded electronically, through B2B portal 860 to system 100. In another embodiment, a paper based invoice is created by Seller 862 and forwarded to System 100 and/or Buyer 861. Transaction management and financial services system 100 converts the commercial transaction documentation to electronic format, including images (described below with reference to FIG. 14), thereby avoiding the creation and forwarding of paper-based invoices and the moving of the commercial transaction off-line.

In another embodiment, Buyer 861, in step 876, pays transaction management and financial services system 100 directly. In an exemplary embodiment, payment can be made via electronic transmission or paper based payment. If payment is made via electronic transmission, System 100 applies the payment based on the electronic remittance advice and makes all information available to Buyer 861 and Seller 862 for the management, maintenance, modification and conclusion of the commercial transaction. If a paper based payment is received, system 100 applies the payment based on the paper based remittance advice, converts the paper based payment information and remittance advice to electronic format, including images (described with reference to FIG. 14), and makes all information available to Buyer 861 and Seller 862 for the management, maintenance, modification and conclusion of the commercial transaction.

Advantageously, system 100, in partnership with B2B Portal 860, provides liquidity to the marketplace by providing Seller 862 with a mechanism to identify and analyze, at the time of inquiry by Buyer 861, the ability of Buyer 861, located through B2B portal 860, to repay its commercial obligations. In addition, the partnership of B2B Portal 860 and system 100 ensures that any commercial transaction initiated online, can be managed online, regardless of whether subsequent commercial transaction steps performed by Buyer 861 or Seller 862, are performed online or via more traditional paper based methods. Another advantage is that B2B Portal 860 does not lose access to Buyer 861 and Seller 862 as they otherwise move their online transactions offline. A further advantage is the ability of system 100 to migrate commercial transactions, initiated offline, with buying communities 891, 892 and 893, online, and to provide B2B Portal 860 with access, brand exposure and targeted content, service and product delivery to these communities.

Figure 8B:
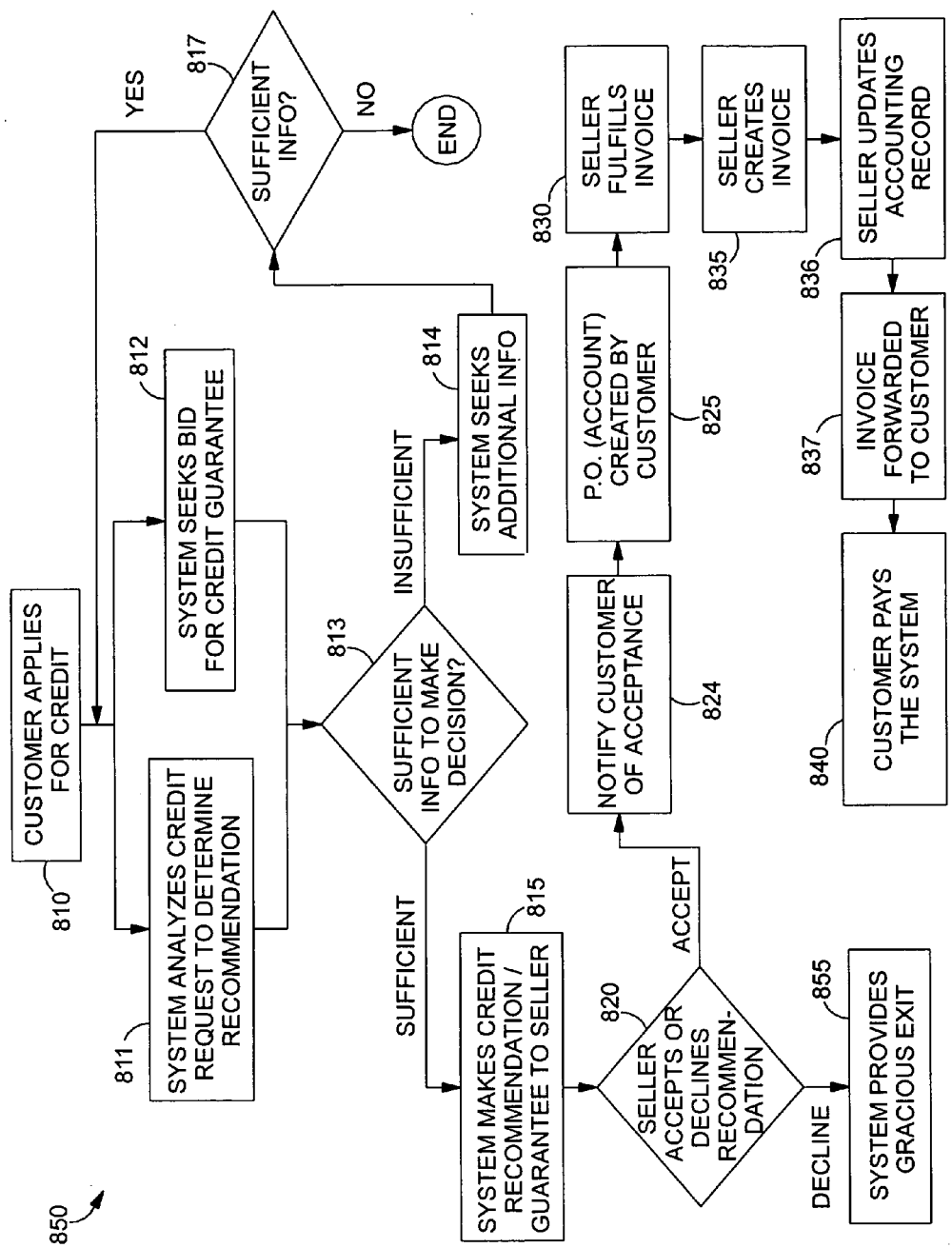
FIG. 8B is a flow diagram illustrating an exemplary process of trade credit underwriting in an exemplary embodiment of the transaction management and financial services illustrated in FIG. 1.

FIG. 8B illustrates a flow diagram 850 of an exemplary process of trade credit (e.g. net 30, net 60) underwriting in one embodiment of transaction management and financial services system 100. In particular, flow diagram 850 illustrates a transaction between a buyer and a seller in a marketplace. The buyer seeks to receive standard credit terms relating to the payment for a product or service intended to be purchased from a seller that is a participant in transaction management and financial services system 100.

In a step 810, a customer's application for trade credit is received by transaction management and financial services system 100 from any one of: an account the buyer maintains with transaction management and financial services system 100; the seller, through an account the seller maintains with transaction management and financial services system 100; a link from a business to business e-commerce marketplace; a link from a referring party web site; or from any other source. After step 810, a step 811 is performed in which transaction management and financial services system 100 analyzes the credit request in an attempt to provide a recommendation concerning the Buyer's ability to pay. Alternatively, transaction management and financial services system 100 analyzes the credit request in an attempt to provide information which can be used by the Seller to make a decision concerning the Buyer's ability to pay. Alternatively, transaction management and financial services system 100 could analyze the request for purposes of guaranteeing the customer's ability to pay. In another alternative, a step 812 is performed, in which transaction management and financial services system 100 seeks bids, from external sources, for guarantees of the customer's ability to pay. After step 811 or step 812, a decision is made in step 813 as to whether there is sufficient information to make a decision as to the recommendation (step 311) or the guarantee (step 812). If there is sufficient information, a step 815 is performed. If there is not sufficient information, a step 814 is performed in which additional information is sought. After step 814, a step 817 is performed in which a determination is made as to whether there is sufficient information. If there is still not enough information, there is a gracious exit to the process. If there is now sufficient information, step 811 or step 812 is performed.

In step 815, transaction management and financial services system 100 transmits a credit recommendation and/or guarantee to a seller. In an exemplary embodiment, the recommendation and/or guarantee is communicated to seller via the Internet. In another embodiment, transaction management and financial services system 100 transmits the application for trade credit to external entities that provide credit guarantees. After step 815 is performed, a step 820 is performed in which the seller accepts or rejects the credit recommendation or guarantee made by transaction management and financial services system 100. In another embodiment, seller does not notify transaction management and financial services system 100 of its acceptance or rejection. If seller communicates to system 100 an "accept", a step 824 is performed in which the buyer is notified of the acceptance of the trade credit approval. In an exemplary embodiment, an account is created for the buyer in transaction management and financial services system 100. Upon notification of the approval of the buyer's request for trade credit, a step 825 is performed in which a purchase order (PO) is created by the buyer's accounting system and transmitted to the transaction management and financial services system 100.

In an exemplary embodiment, the PO is forwarded to transaction management and financial services system 100 using the Internet. In another embodiment, a paper based PO is forwarded to transaction management and financial services system 100 and transaction management and financial services system 100 converts the PO to electronic format, electronic format including images. In another embodiment, the purchase order is transmitted buy the buyer directly to the seller. In an exemplary embodiment, the purchase order is created in transaction management and financial services system 100. In another embodiment, a purchase order is created using the capabilities of a business to business e-commerce marketplace, and transmitted to either the seller, to transaction management and financial services system 100, or both. In all cases, the receipt of a purchase order by transaction management and financial services system 100 from a buyer, a business to business e-commerce marketplace, or any other source, other than from the seller, triggers transaction management and financial services system 100 to forward the purchase order to the seller. In an exemplary embodiment, transaction management and financial services system 100 transmits the purchase order to the seller using the Internet.

After step 825, a step 830 is performed in which the seller fulfills the terms of the purchase order. After step 830, a step 835 is performed in which the seller creates an invoice for the product or service created or performed in fulfillment of the purchase order. In an exemplary embodiment, the invoice can be created using transaction management and financial services system 100. In this case, transaction management and financial services system 100 provides a step 836 in which seller initiates a transmission from transaction management and financial services system 100 which is formatted by transaction management and financial services system 100 to allow seller to electronically update its accounting system located at a remote device. After step 836, a step 837 is performed in which transaction management and financial services system 100 forwards the invoice to the buyer, with any additional commercial transaction information, such as shipping information. In an exemplary embodiment, the invoice and additional commercial transaction information is forwarded to the buyer using the Internet. In another embodiment the invoice is created using the functionality of a business to business e-commerce marketplace, and transmitted to the buyer and transaction management and financial services system 100 using the Internet.

In yet another embodiment, the invoice is created using the functionality of a business to business e-commerce marketplace, and is sent only to the buyer. In still another embodiment, the invoice is created using the accounting system of seller and the seller forwards the invoice and other commercial transaction information, such as shipping information, to the buyer. In still another embodiment, the invoice is created using the accounting system of seller and the seller forwards the invoice and other commercial transaction information to the buyer and to transaction management and financial services system 100. In an exemplary embodiment, the seller forwards the invoice and additional commercial transaction information to transaction management and financial services system 100 and the buyer, using the Internet.

In another embodiment, the seller forwards a paper based invoice and other commercial transaction information to transaction management and financial services system 100 and transaction management and financial services system 100 converts the paper-based invoice and other commercial transaction information to electronic format, electronic format including images. After step 837, a step 840 is performed in which the customer pays transaction management and financial services system 100. In an exemplary embodiment, the customer pays transaction management and financial services system 100 electronically. Alternatively, the customer pays system 100 using a wire payment, check, credit card, cash, Internet account, or any other payment means. In one embodiment, transaction management and financial services system 100 receives an electronic payment, applies the payment to the invoices identified on the electronic remittance information and deposits the proceeds in the account of the seller. In another embodiment, a non-electronic based payment is received by transaction management and financial services system 100. In this embodiment, transaction management and financial services system 100 will deposit the proceeds to the account of the seller, apply the payment in accordance with the remittance advice, and convert all paper based payment information, including check and remittance advice to electronic format, electronic format including images. In an exemplary embodiment, all payment information, both electronic and paper based, is available through transaction management and financial services system 100.

In another embodiment, all buyers and sellers can utilize functionality within transaction management and financial services system 100 to electronically update and reconcile accounting systems located at a remote device.

Advantageously, transaction management and financial services system 100 improves liquidity in the marketplace by providing real time or near real time trade credit underwriting services, accelerating the collection and cash application process through electronic and high volume paper based payment processing, improves transactional reporting and efficiency and reduces transaction costs by providing a central electronic repository and electronic transaction management functionality for online and off-line commercial transaction information generated during interactions between buyers and sellers. Regardless of how trade credit requests are created and received, purchase orders are created and received, invoices are created and received, payments are created and received, transaction management and financial services system 100, converts to electronic format, including images, commercial transaction documentation, applies all payments, closes all invoices and allows buyers and sellers to access all transaction information via the Internet, phone, or any other communication devices and vehicles. Also, because buyers and sellers can utilize functionality within transaction management and financial services system 100 to electronically update and reconcile accounting systems located at remote devices, data entry and human error can be avoided, and buyers and sellers can be freed to focus on their core competencies.

If seller communicates to system 100 a "decline" of the trade credit recommendation in step 820, a step 855 is performed in which transaction management and financial services system 100 provides a gracious notice that an extension of trade credit is unavailable at the time. In another embodiment, further described below with reference to FIG. 19, if insufficient information is available to transaction management and financial services system 100, at the time of a trade credit request, to provide an approval or guarantee of the trade credit request, transaction management and financial services system 100 initiates steps to acquire additional information. In an exemplary embodiment, additional information is acquired using the Internet.

According to an exemplary embodiment, all of the steps in flow diagram 850 described with reference to FIG. 8B can be performed via the Internet. Web pages and e-mail messages can be used to exchange the necessary information between system 100 and buyers, sellers, financial institutions, business to business e-commerce marketplaces and other participants.

Figure 8C:
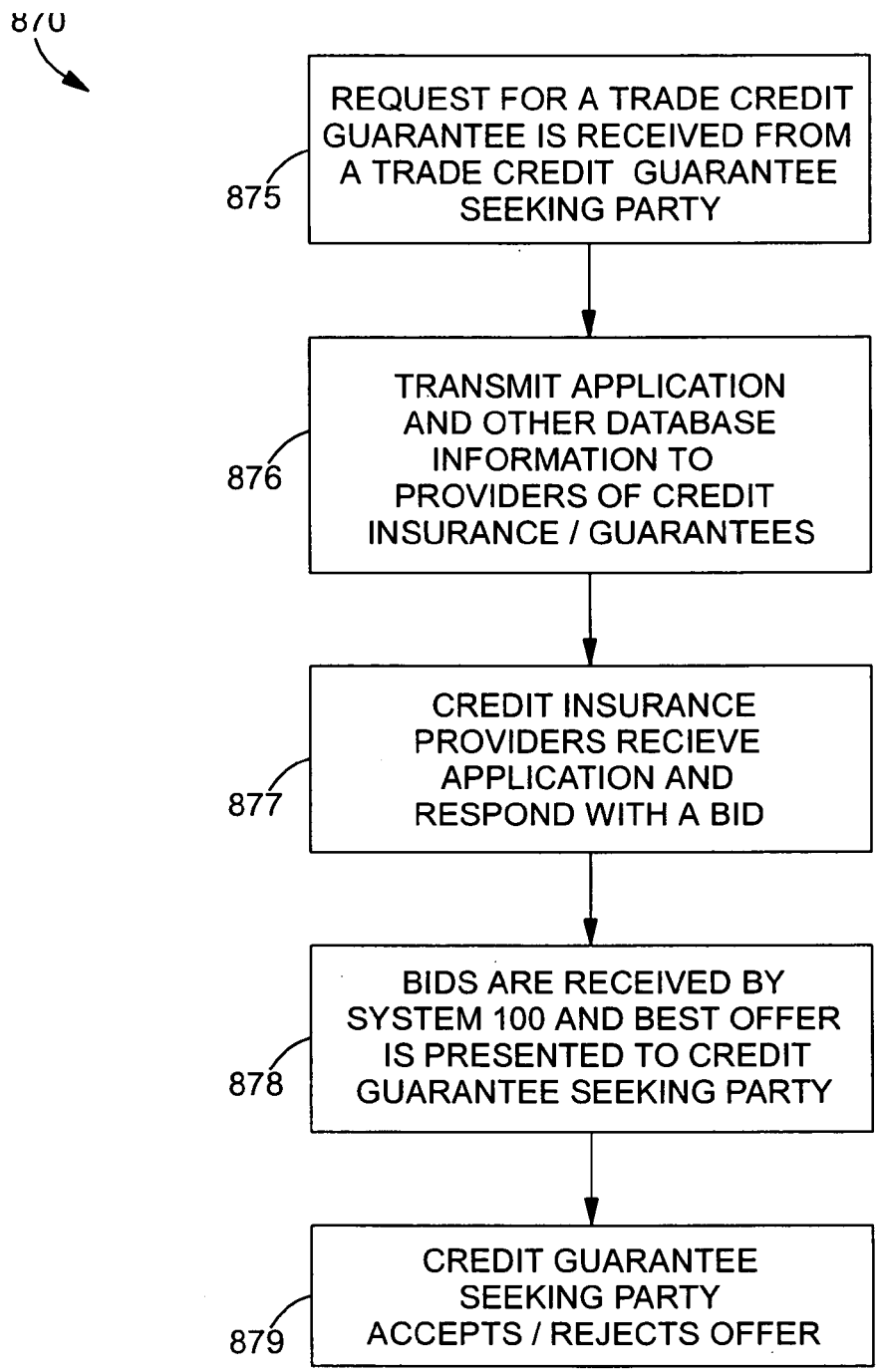
FIG. 8C is a flow diagram illustrating an exemplary process of obtaining credit insurance/guaranty in the transaction management and financial services system illustrated in FIG. 1.

FIG. 8C illustrates a flow diagram 870 of an exemplary process for obtaining credit insurance/guarantee in transaction management and financial services system 100. In the process, a step 875 is performed in which a request for a trade credit guarantee is received from a trade credit guarantee seeking party. After step 875, a step 876 is performed, in which transaction management and financial services system 100 transmits the request for a credit guaranty to providers of credit insurance/guarantees, seeking bids from the providers of credit insurance/guaranties to provide a guaranty on the submitted account. In a step 877, the providers of credit insurance/guaranties respond to transaction management and financial services system 100 with bids. In a step 878, transaction management and financial services system 100 transmits the most attractive bid to the credit guarantee seeking party. In a step 879, corresponding to step 820 (FIG. 8B) the credit guarantee seeking party accepts or rejects the offer.

Figure 8D:
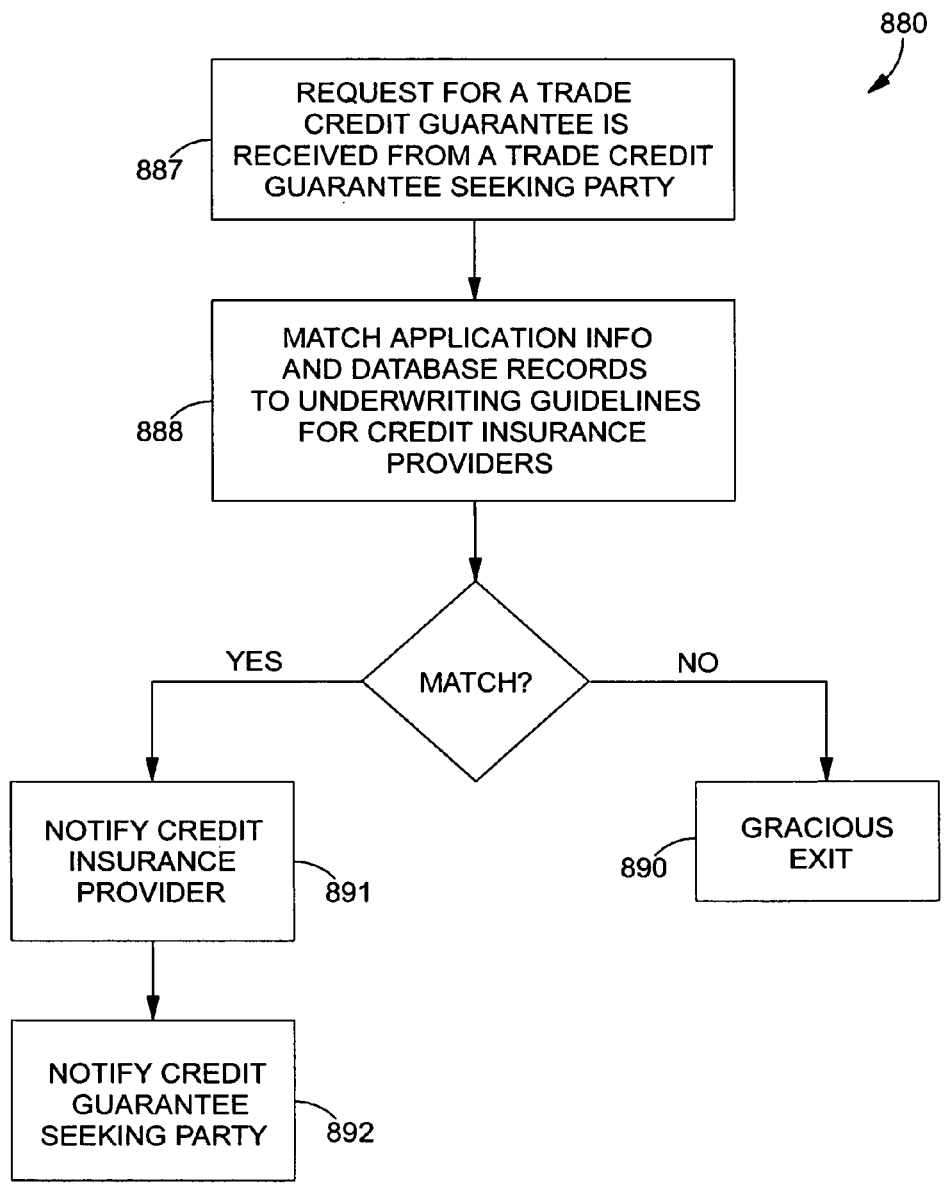
FIG. 8D is a flow diagram illustrating an exemplary process of receiving and processing a request for a credit guarantee in the transaction management and financial services system illustrated in FIG. 1.

FIG. 8D illustrates a flow diagram 880 of an exemplary process of receiving and processing a request for a credit guarantee in transaction management and financial services system 100. In this process, transaction management and financial services system 100 receives a request for trade credit guarantee from a trade credit guarantee seeking party in a step 887. In a step 888, system 100 matches the application information and any information residing in electronic storage devices of transaction management and financial services system 100, and feeds the data into an expert system designed to match the risk profile of the buyer against the underwriting guidelines of a plurality of providers of credit insurance/guaranties. If there is no match, a step 890 is performed, where transaction management and financial services system 100 graciously declines the guaranty request. If, on the other hand, a match is found, steps 891 and 892 are performed, where transaction management and financial services system 100 notifies the matched provider of credit insurance/guaranties and the seller, that the request has been approved.

Figure 9:
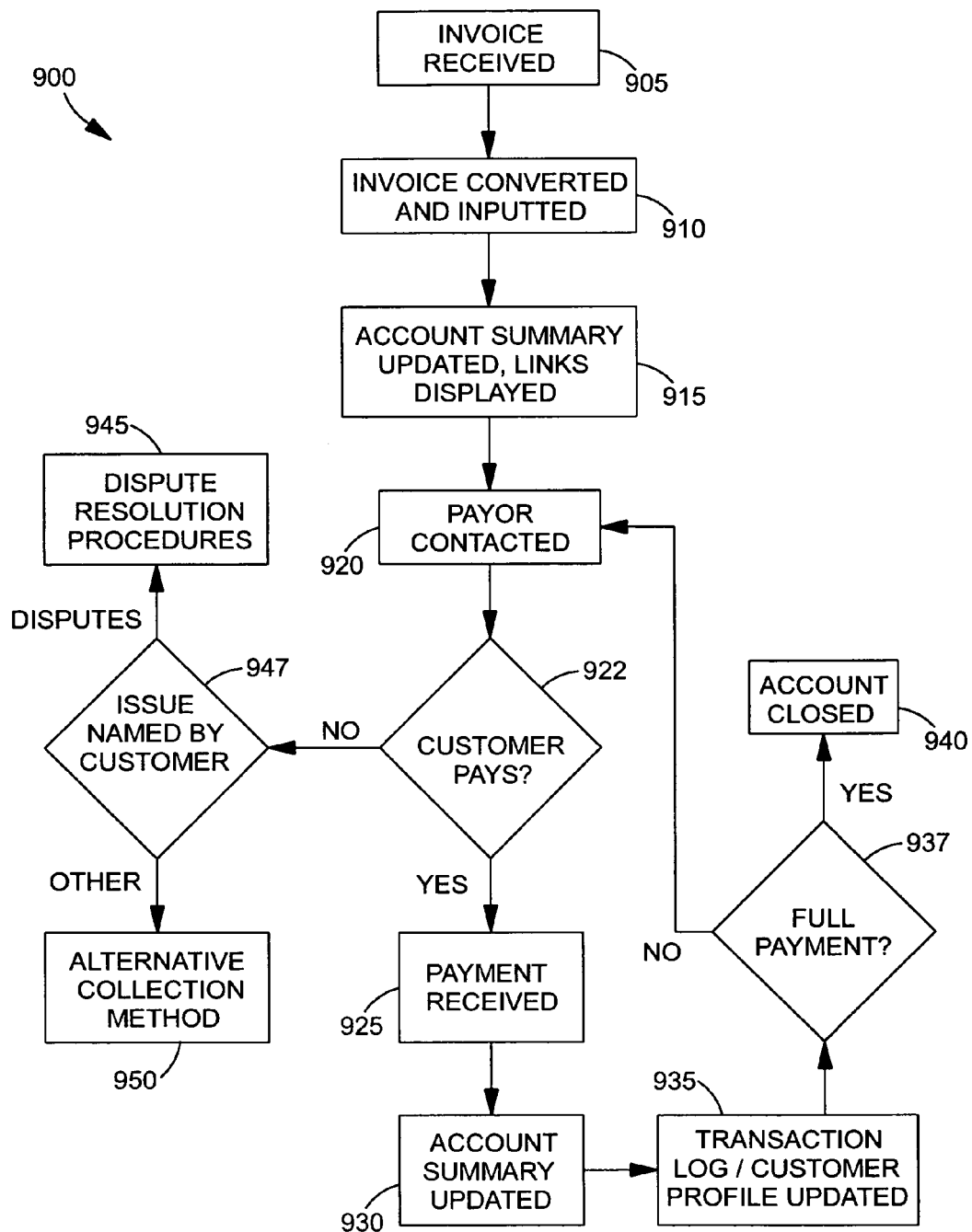
FIG. 9 is a flow diagram illustrating an exemplary method used in an accounts receivable management system implemented in the transaction management and financial services system illustrated in FIG. 1.

FIG. 9 illustrates a flow diagram 900 of an exemplary process for commercial transaction management in transaction management and financial services system 100. In a step 905, transaction management and financial services system 100 receives an invoice and additional commercial transaction information, such as shipping information and purchase orders, from a seller for management within transaction management and financial services system 100. In one embodiment invoices and additional commercial transaction information can be received directly from a seller, via fax, email, direct input into transaction management and financial services system 100 or other delivery methods. In another embodiment, invoices and other commercial transaction documentation can be received from a business to business e-commerce marketplace or other electronic market. Following receipt of an invoice, a step 910 is performed in which the invoice (if not in an electronic format) is converted to an electronic format and stored in transaction management and financial services system 100.

In a step 915, links, such as, hypermedia links to the electronic document are made available to both the buyer and seller in the transaction via the Internet. An account summary for each participant is also updated to display the new invoice and provide links to information relevant to the invoice. In one embodiment, the account summary for a buyer includes all outstanding invoices owed, including all commercial transaction information for the invoices. In another embodiment, the account summary for a seller includes an aged list of all invoices outstanding, the payee, and all commercial transaction information concerning the invoices. Advantageously, as transaction management and financial services system 100 receives additional commercial transaction information, such as credit memos, payments, dispute notices, shipping information, etc., transaction participants can have instant and convenient access to all of the information for any given transaction via the Internet. In an exemplary embodiment, system 100 uses a web page to display the account summary and hypermedia links to other information related to the account.

Following the update of the account summary and display of links in step 915, a step 920 is performed in which the payor on the invoice is notified of the new remittance address and the online capability which is available through transaction management and financial services system 100. In an exemplary embodiment, notice is sent via the Internet. In another embodiment, notice is sent via mail, fax or other paper based formats. In another embodiment, the payor is emailed an electronic statement of their account, with hypermedia links to other information related to the account, as well hypermedia links to their account page within transaction management and financial services system 100. In an exemplary embodiment, the electronic statement of account contains electronic payment selectivity on an invoice specific basis. In another embodiment, the electronic statement of account contains hypermedia links to corporate bank account aggregation functionality. In an exemplary embodiment, this account aggregation functionality allows the payor to select the account to pay from, retrieve real time or near real time bank account information, and perform all online banking tasks from within transaction management and financial services system 100. In another embodiment, this account aggregation functionality allows the payor to select the account to pay from, as well as to utilize hypermedia links to selected online bank accounts.

In another embodiment, when a payor has "clicked" on a hypermedia link to an online bank account, transaction management and financial services system 100 communicates appropriate security codes and certificates to the financial institution and directly accesses, from within the financial institution's web site, online bank account information with "one click" of a mouse. In another embodiment, the electronic statement of account contains electronic dispute selectivity on an invoice specific basis. In an exemplary embodiment, the payor can click on any invoice and begin dispute resolution procedures. Dispute resolution is described further below with reference to FIG. 28. In another embodiment, transaction management and financial services system 100 mails and faxes a paper based account statement. In another embodiment, payor is sent paper based invoice information. In an exemplary embodiment, invoice information can be sent via email, fax, mail or any other method. Following this contact, a step 922 is performed in which the payor either submits payment or not. If the payor submits payment, a step 925 is performed in which the payment is received by transaction management and financial services system 100. In an exemplary embodiment, payment is received electronically via wire, ACH, electronic check, or some other electronic payment mechanism. In another embodiment, payment is received via mail and consists of a paper check, or some other paper based payment mechanism. Next, a step 930 is performed in which the account summary is updated to reflect the payment of the account.

In an exemplary embodiment, the electronic payment is accompanied by an electronic remittance advice and the payment is applied electronically. In another embodiment, a paper based payment and remittance advice is received, and is applied directly into transaction management and financial services system 100. In an exemplary embodiment, the information displayed on the web pages for both the payee and the payor are automatically updated to reflect payment information, including images. Advantageously, displaying the information in an easy to use format allows the parties involved in the transaction to have current and matching records for all transactions.

In a step 935, transaction management and financial services system 100 stores the transaction in an electronic storage device. All information relevant to the transaction enhances participant profiles. For example, the profile would include whether the payor paid on time, paid in full, disputed the invoice, etc. The profile would also include whether the payee shipped the goods on time, shipped a complete order, etc. Advantageously, by storing this information, a customer profile can be used to analyze the payee or payor for future transactions or financing decisions, or to customize marketing campaigns, content, screen display, etc.

If the payment made is determined to be a full payment of an invoice in a step 937, a step 940 is performed in which the invoice is closed and the invoice summary is updated to reflect the invoice as paid in full. If the payment is not a full payment, step 920 is repeated in which the payor is contacted to identify the reason for the short payment. Based on the feedback from the payor, either step 945, dispute resolution, or step 950, alternative collection method, are initiated. In one embodiment, the remittance advice received in step 925 may identify the reason for the short payment, and either step 945, dispute resolution, or step 950, alternative collection method, are initiated. If the payor does not pay the account in step 922, after being contacted in step 920, and initiating dispute resolution step 945, transaction management and financial services system 100 and the payee determine if necessary to initiate alternative collection method 950. In an exemplary embodiment, all steps in flow diagram 900 can be performed via the Internet. Alternatively, phone, fax, mail and other conventional methods of communication may also be utilized.

Figure 11:
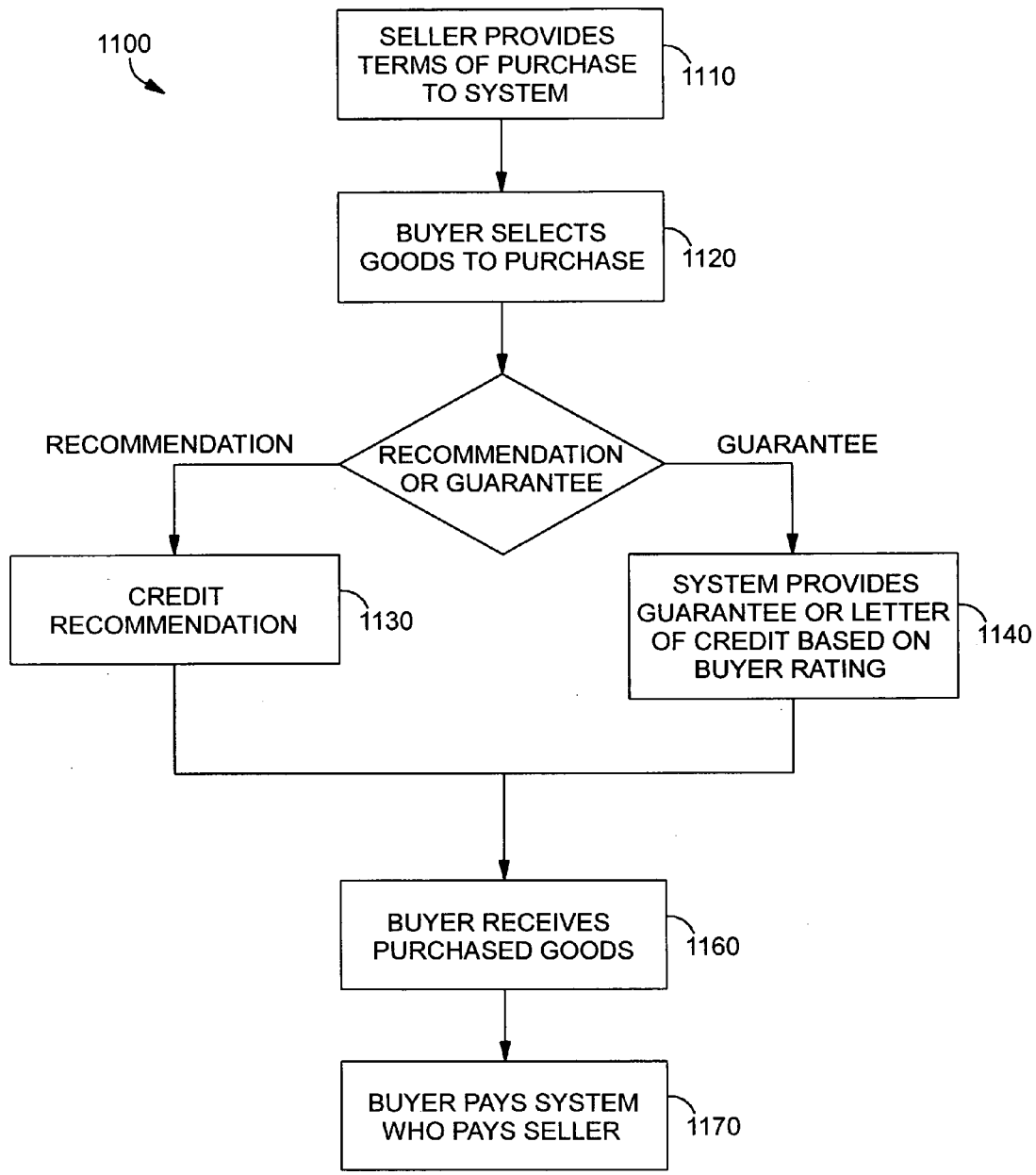
FIG. 11 is a flow diagram illustrating an exemplary method for providing an on-line letter of credit used in the transaction management and financial services system illustrated in FIG. 1.

FIG. 11 illustrates a flow diagram 1100 of an exemplary process of providing trade credit recommendations and guarantees over the Internet through transaction management and financial services system 100. In a step 1110, a seller provides its standard selling terms and credit history, including credit guidelines and goals to transaction management and financial services system 100. After step 1110, a step 1120 is performed in which a buyer selects goods to purchase from seller. In an exemplary embodiment, the buyer selects goods via web pages on the Internet. After step 1120, a step 1125 is performed in which system 100 determines whether a recommendation or guarantee has been required by the Seller. If a recommendation has been required by Seller, a step 1130 is performed in which system 100 evaluates the buyer and provides a recommendation of trade credit for the buyer, based on the custom credit engine of transaction management and financial services system 100, which incorporates the credit goals and guidelines established by the seller. Alternatively, the Seller may not specify credit guidelines and goals, but rather the Seller may rely entirely on system 100 for it credit strategy.

Alternatively, if a guarantee is required by Seller, a step 1140 is performed in which transaction management and financial services system 100 can guarantee the buyer's ability to pay its obligation to seller, described further with reference to FIGS. 8C-D. In an exemplary embodiment, digital certificate, P1 or other verification technology is used to confirm the identity of the buyer.

After step 1130 or 1140, a step 1160 is performed in which the buyer receives the purchased goods or services. After step 1160, a step 1170 is performed in which the buyer pays transaction management and financial services system 100 and transaction management and financial services system 100 pays the seller. In an exemplary embodiment, payment by the buyer to transaction management and financial services system 100 and payment by transaction management and financial services system 100 to the seller is done electronically. In an alternative embodiment, either the payment of the buyer to transaction management and financial services system 100 or the payment of transaction management and financial services system 100 to seller is done in a non-electronic fashion.

The exemplary method described with reference to FIG. 11 has the advantage of automating and making instantaneous the process of obtaining trade credit recommendations and guarantees. It also has the advantage of providing automated trade credit analysis in a user-friendly format over the Internet. The credit recommendation can be instantaneously generated. Credit analysis is handled entirely by transaction management and financial services system 100. Conventionally, a buyer seeking a trade credit approval goes through a time consuming process to obtain approval. A buyer in the conventional process has to submit credit information to the seller, and wait for a response from the seller. Responses can often take hours and days. The seller also faces delays and risks in the conventional process. Sellers, who often have little credit experience, are forced to receive and analyze credit information from buyers. In addition, given the limited amount of information which is available to many sellers, references are often checked. The process of requesting and reviewing trade references can often take several days. In addition, it often lacks value, as buyers only provide their best references. The time delay and limited credit skills of many sellers creates inefficiency, friction and risk in the marketplace which is eroded by the introduction of transaction management and financial services system 100.

Advantageously, in transaction management and financial services system 100, the credit recommendation or guarantee is generated, in part, based on stored customer data including both external information and an internal transaction history. This information used in transaction management and financial services system 100's credit engine to determine if buyers qualify for trade credit. As the recommendation or guarantee can be instantaneously communicated to the buyer/seller via the Internet, liquidity in the marketplace improves. In addition, risk is reduced as transaction management and financial services system 100 brings expert knowledge and leadership, and possibly credit guarantees, to trade credit analysis.

Figure 12:
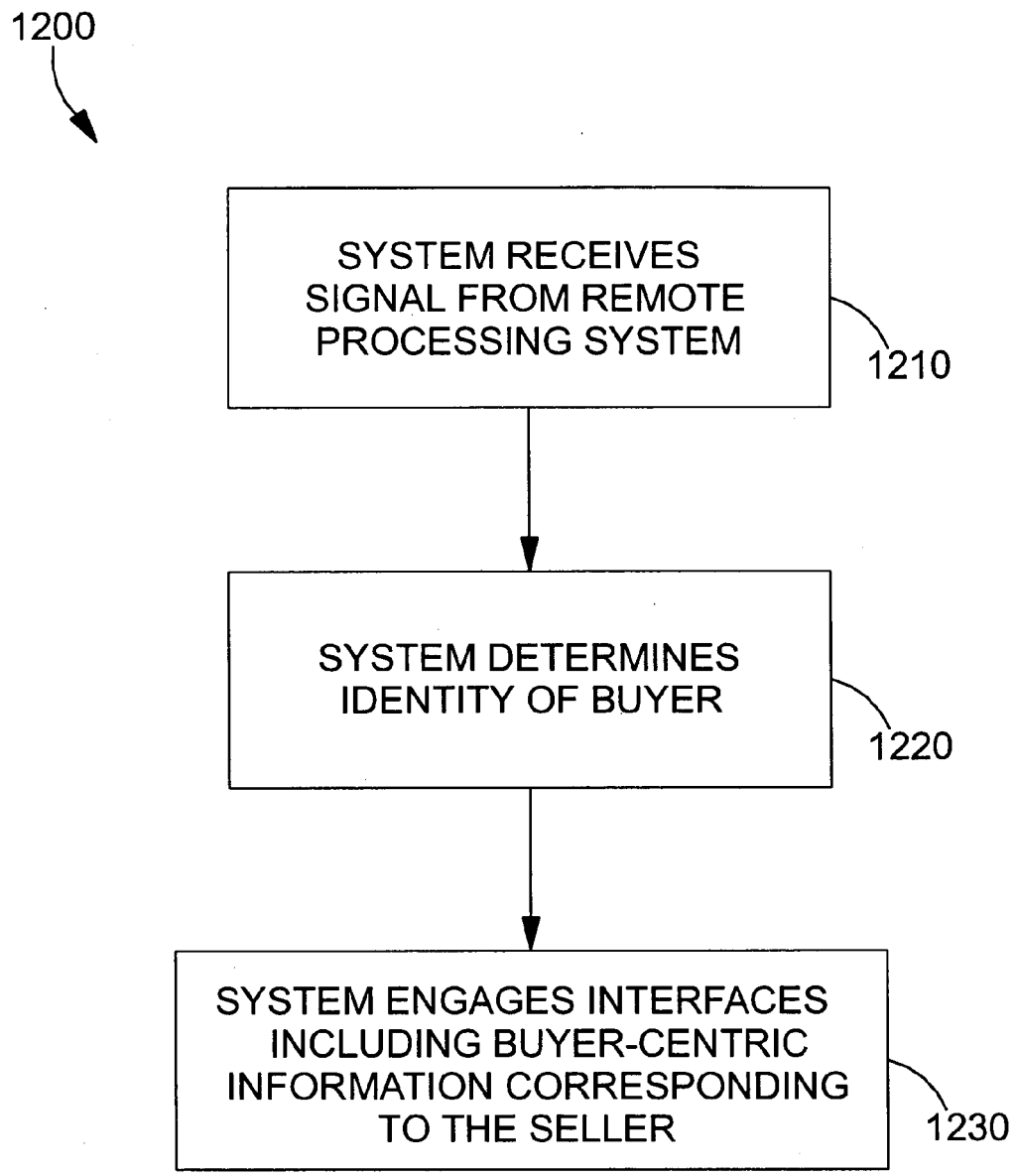
FIG. 12 is a flow diagram illustrating an exemplary method used in the customization process of the transaction management and financial services system illustrated in FIG. 1.

FIG. 12 illustrates a flow diagram 1200 of an exemplary process for customizing the appearance and content of a web page using transaction management and financial services system 100. In a step 1210, system 1200 receives a signal from a remote processing device. In an exemplary embodiment, the signal can come from the personal computer or mobile phone of a buyer, seller or other participant in transaction management and financial services system 100. After step 1210, a step 1220 is performed in which transaction management and financial services system 100 determines the identity of a buyer and the method of access to transaction management and financial services system 100.

After step 1220, a step 1230 is performed in which transaction management and financial services system 100 initiates personalization services in conjunction with profiling module 303, described with reference to FIG. 3. In an exemplary embodiment, step 1230 will retrieve a profile of the identified buyer from profiling module 303. The profile can either be specific to the company participant, or an individual user within the company. The profile, among other identifiers, includes information concerning any relationships in any way linked to the participant. In one embodiment, a linked relationship includes the referring party that referred the participant. In an exemplary embodiment, the appearance and content is customized based on the retrieved profile, and is displayed via a web page. In another embodiment, the content displayed on a remote processing device is customized based on the identification of the type of remote processing device which is accessing transaction management and financial services system 100. Advantageously, transaction management and financial services system 100 delivers real time customized and targeted content, advertisements and marketing campaigns to all participants in transaction management and financial services system 100 based on the profile established for each participant.

Figure 13A:
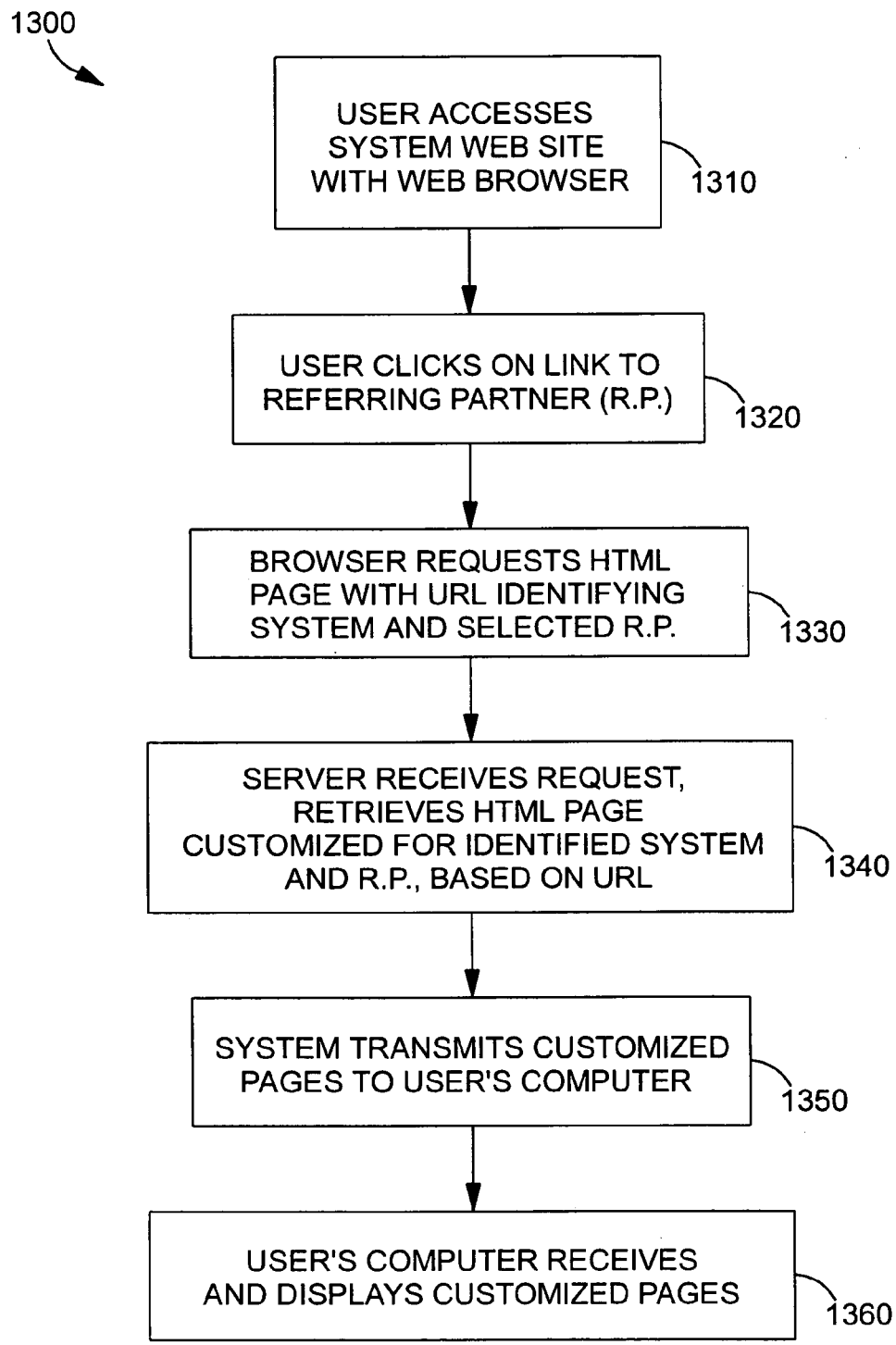
FIGS. 13A-C are flow diagrams illustrating exemplary processes of participant access to the transaction management and financial services system illustrated in FIG. 1.

FIG. 13A illustrates a flow diagram 1300 of an exemplary process of participant access to transaction management and financial services system 100. In a step 1310, a new participant accesses system 100 via a website using a web browser. After step 1310, in one embodiment, a step 1320 is performed in which the new participant clicks on a link to a referring party of system 100. A referring party can be bank, an independent lender, an insurance company, a leasing company, a governmental group (e.g., local, state, federal, international), a business to business web portal or e-commerce marketplace or any party that may benefit from the transaction management and financial services provided by system 100, or that has entered into a marketing relationship with transaction management and financial services system 100. In another embodiment, the new participant does not click on a link. In an exemplary embodiment, such a link is hypermedia text of images.

After step 1320, a step 1330 is performed in which the web browser requests an HTML page with a uniform resource locator (URL) identifying transaction management and financial services system 100 and the selected referring party. After step 1330, a step 1340 is performed in which transaction management and financial services system 100 receives the browser request, retrieves an HTML page customized for the identified transaction management and financial services system 100 and referring party based on the received signal. After step 1340, a step 1350 is performed in which transaction management and financial services system 100 transmits customized pages to the participant's remote access device. After step 1350, a step 1360 is performed in which user's remote access device receives and displays customized pages. In an exemplary embodiment, a new participant can access transaction management and financial services system 100 using any remote access device. In another embodiment, transaction management and financial services system 100 identifies the type of device being used to access transaction management and financial services system 100, or the screen display capability of the remote access device, and transaction management and financial services system 100 modifies the type and format of information transmitted to the remote device to enable universal access to transaction management and financial services system 100.

Figure 13B:
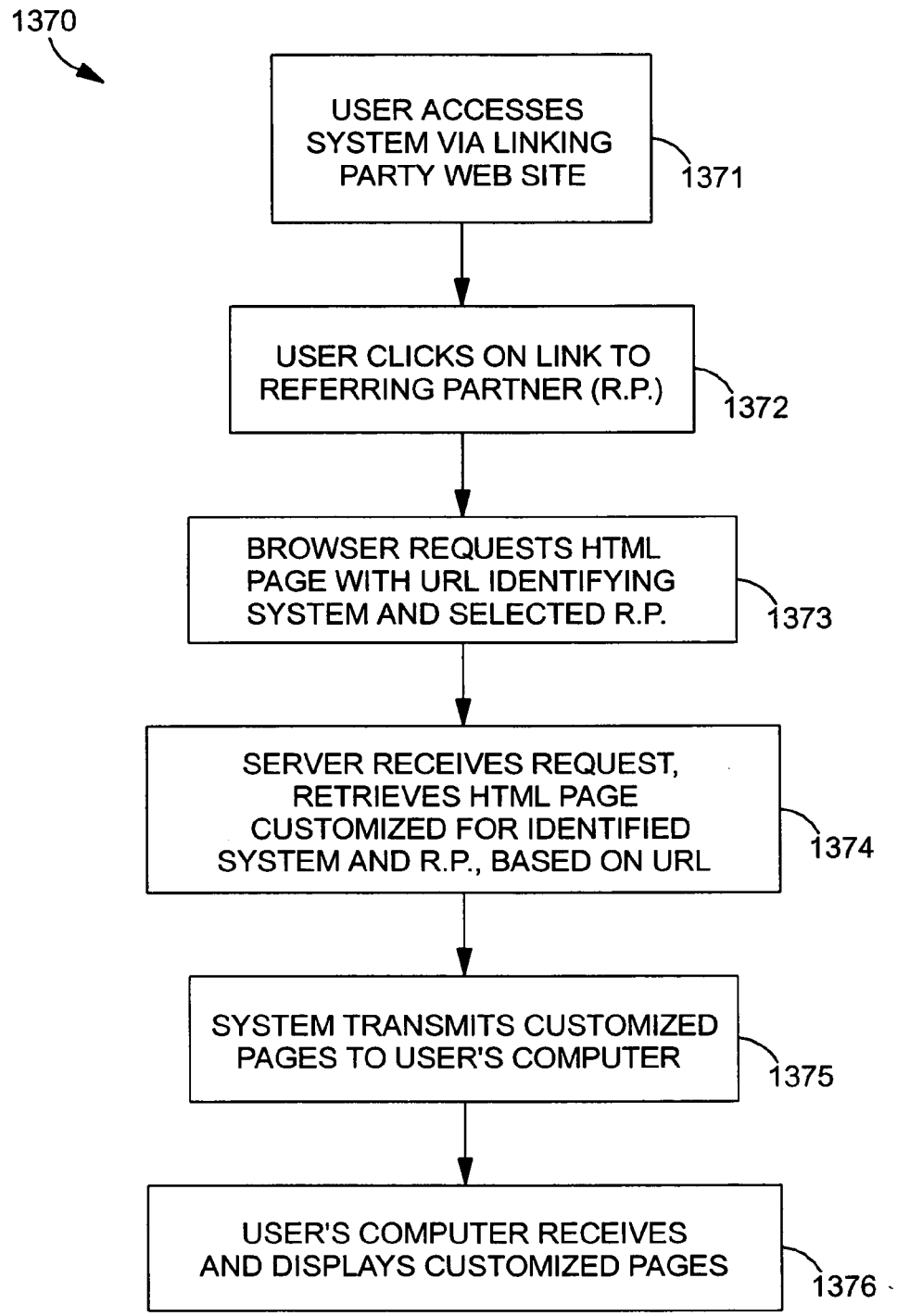

FIG. 13B illustrates a flow diagram 1370 of an exemplary process of participant access to transaction management and financial services system 100. In a step 1371, a new participant accesses system 100 via a link on the web site of any party (linking party) seeking to offer any one of the service offerings of transaction management and financial services provided by system 100, on a private label basis, or otherwise. After step 1371, in one embodiment, a step 1372 is performed in which the new participant clicks on a link to a referring party of system 100. Alternatively, the linking party may choose to offer the products and services of system 100 without offering links to referring parties. In this embodiment, the linking party is the referring party. A referring party can be bank, an independent lender, an insurance company, a leasing company, a governmental group (e.g., local, state, federal, international), a business to business web portal or e-commerce marketplace or any party that may benefit from the transaction management and financial services provided by system 100, or that has entered into a marketing relationship with transaction management and financial services system 100. In an exemplary embodiment, such a link is hypermedia text of images.

In an exemplary embodiment, the referring party can be a party which directly provides similar products and services similar to those provided by system 100. Advantageously, a user accessing system 100 via a linking party has access to a plurality of providers of commercial transaction management services, trade credit analysis services, credit guaranteeing services, and financing services. This access to a plurality of providers of these services creates competition in the marketplace, increases scale, improves marketplace efficiency, reduces transaction costs, and allows the linking party to maintain a service affiliation with users.

After step 1372, a step 1373 is performed in which the web browser requests an HTML page with a uniform resource locator (URL) identifying transaction management and financial services system 100 and the selected referring party. After step 1373, a step 1374 is performed in which transaction management and financial services system 100 receives the browser request, retrieves an HTML page customized for the identified transaction management and financial services system 100, the referring party and the linking party, based on the received signal. After step 1374, a step 1375 is performed in which transaction management and financial services system 100 transmits customized pages to the participant's remote access device. After step 1375, a step 1376 is performed in which user's remote access device receives and displays customized pages. In an exemplary embodiment, a new participant can access transaction management and financial services system 100 using any remote access device. In another embodiment, transaction management and financial services system 100 identifies the type of device being used to access transaction management and financial services system 100, or the screen display capability of the remote access device, and transaction management and financial services system 100 modifies the type and format of information transmitted to the remote device to enable universal access to transaction management and financial services system 100.

Advantageously, the method described with reference to FIG. 13B allows the linking party to offer the product and service offerings of transaction management and financial services system 100, while maintaining a customer service affiliation with its participants, by offering its participants a choice of firms, in step 1372, offering the products and service offered by transaction management and financial services system 100. In one embodiment, all referring parties utilize transaction management and financial services system 100 on a private label basis. In another embodiment, the referring parties offer the services in affiliation with transaction management and financial services system 100. In yet another embodiment, the referring parties include firms that offer their own proprietary products and service offerings, these offerings being similar in nature and competing with any one of the product and service offerings of transaction management and financial services system 100. In an exemplary embodiment, transaction management and financial services system 100 acts as an aggregator of financing services, trade credit underwriting and analysis services, credit guaranty services and commercial transaction management services. Commercial transaction management can include any step involved in the billing, payment, settlement, reconciliation, modification, maintenance and conclusion of commercial transactions. Aggregation can include the identification of providers of financing, trade credit underwriting and analysis, commercial transaction management, credit guarantees, and the delivery of access to these providers through an accessible medium, such as the Internet.

Advantageously, this allows e-commerce marketplaces to offer trading participants, including buyers and sellers, a choice of providers of services which are critical to any one of; the facilitation of commercial transactions (trade credit analysis and guarantees), the management of commercial transactions, the maintenance of commercial transactions, the modification of commercial transactions, and the conclusion of commercial transactions, while maintaining an affiliation with trading participants. Maintaining an affiliation with trading participants, as opposed to third party vendors—which may help facilitate trade—is important to the acceptance of most e-commerce marketplaces, especially, where the vendors that help facilitate trade are offering services which are transactional in nature, or where subjective vendor analysis criteria are used in vendor selection, such as; the geographic location off the vendor, the perceived service quality of the vendor, the perceived stability of the vendor, or whether the participant has an existing relationship with the vendor. In addition, the above described aggregation promotes competition, which in turn drives down costs, may increase efficiency and ultimately, further reduce transaction costs. The outcomes of this competition are better service, lower costs and improved liquidity, all, deepening value to e-commerce marketplace participants.

Figure 13C:
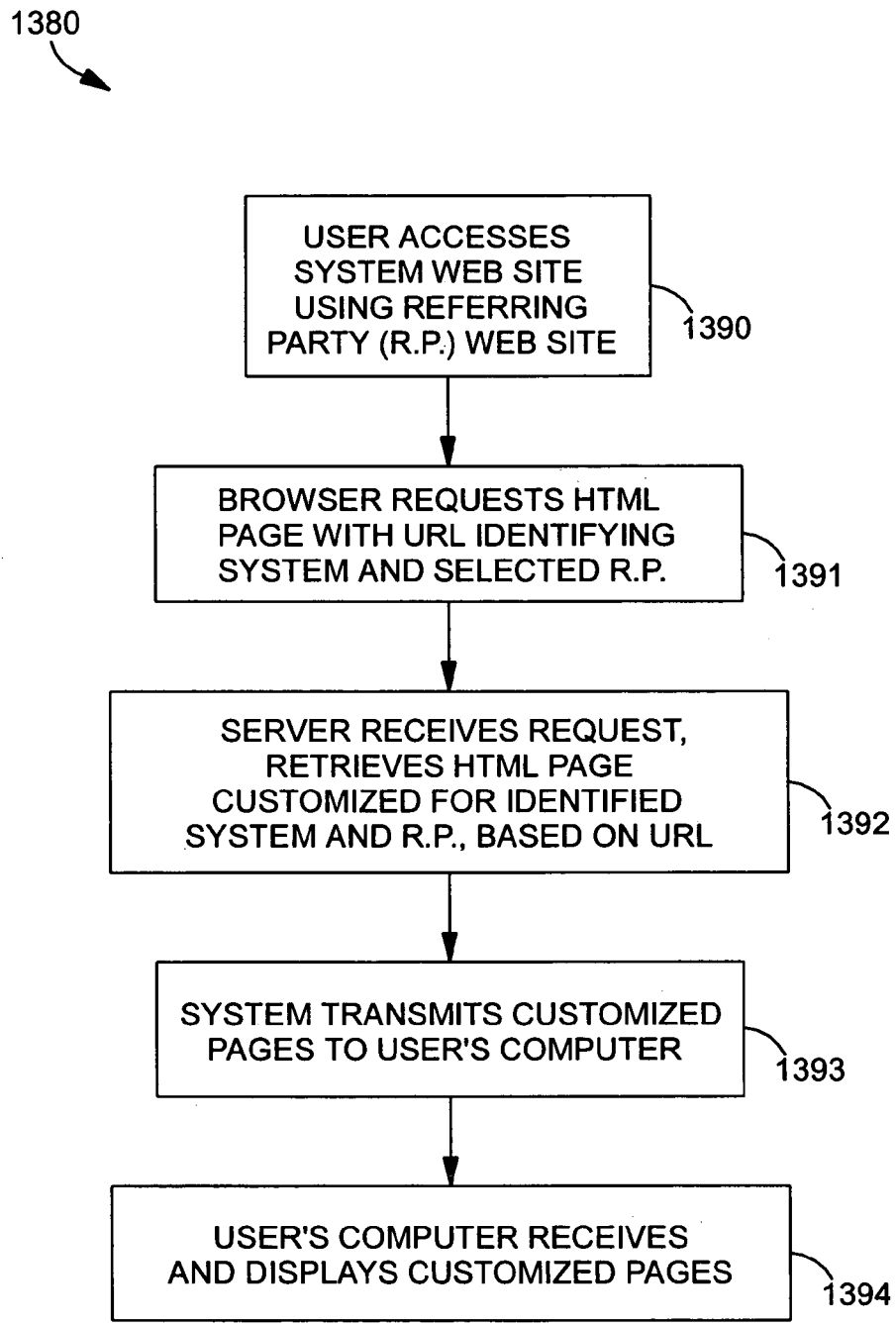

FIG. 13C illustrates a flow diagram 1380 of an exemplary process of participant access to transaction management and financial services system 100. In a step 1390, a new participant accesses system 100 via a referring party's web site. In an exemplary embodiment, such a link is hypermedia text of images. After step 1390, a step 1391 is performed in which the web browser requests an HTML page with a uniform resource locator (URL) identifying transaction management and financial services system 100 and the referring party. After step 1391, a step 1392 is performed in which transaction management and financial services system 100 receives the browser request, retrieves an HTML page customized for the identified transaction management and financial services system 100 and referring party based on the received signal. After step 1392, a step 1393 is performed in which transaction management and financial services system 100 transmits customized pages to the participant's remote access device. After step 1393, a step 1394 is performed in which user's remote access device receives and displays customized pages. In an exemplary embodiment, a new participant can access transaction management and financial services system 100 using any remote access device. In another embodiment, transaction management and financial services system 100 will identify the type of device being used to access transaction management and financial services system 100, or the screen display capability of the remote access device, and transaction management and financial services system 100 will modify the type and format of information transmitted to the remote device to enable universal access to transaction management and financial services system 100.

Advantageously, the processes described with reference to FIGS. 13A-13C allow the web page to be customized to feature the brand of the referring party or the linking party. This customization allows the referring party and/or the linking party to maintain brand exposure with referred parties and parties targeted/identified by transaction management and financial services system 100 independent of linking and referring parties. In an exemplary embodiment, the web page includes only the source indication of the referring party or the linking party. In another exemplary embodiment, the web page includes an indication of the source of transaction management and financial services system 100 in addition to the referring party, or the linking party. In another embodiment, multiple partners are able to offer the operational capabilities of transaction management and financial services system 100.

This multi-partner marketplace model, described further with reference to FIG. 2, begets additional embodiments. In another embodiment, transaction management and financial services system 100 partners with electronic portals seeking to offer transaction management and financial services system 100's operational solutions to their participants. Electronic portals are any one of B2B e-commerce marketplaces, destinations on the Web that deliver content through web pages or any other Web destination that delivers content. In this embodiment, the portals' participants have a plurality of choice of service providers to choose from that offer the operational functionality of transaction management and financial services system 100. Advantageously, the portal maintains an affiliation with its participants, rather than a single service provider, while transaction management and financial services system 100 partners gain the benefit of an additional distribution channel.

Figure 13D:
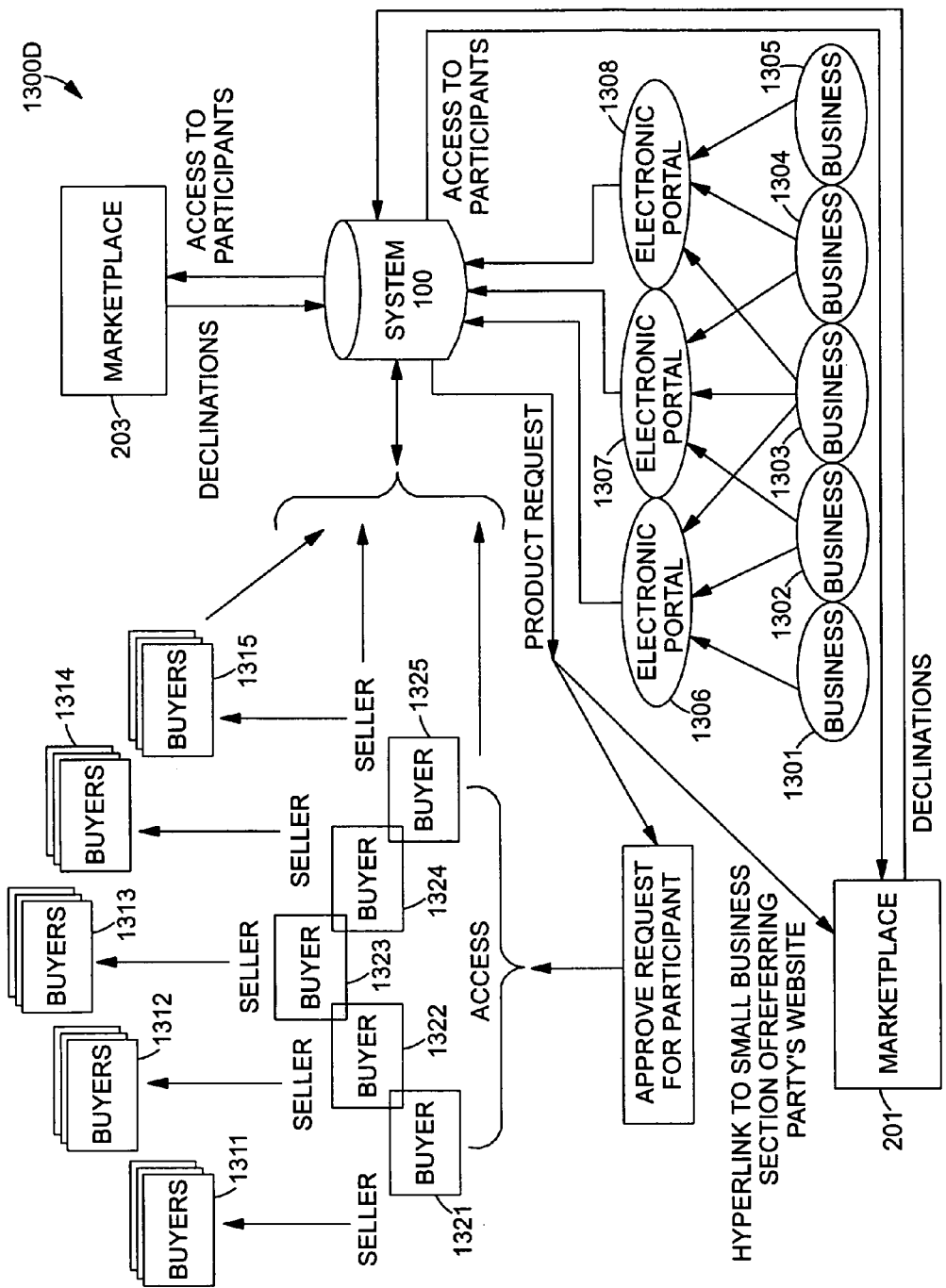
FIG. 13D is a flow diagram illustrating operational aspects of an exemplary embodiment of the transaction management and financial services system illustrated in FIG. 1 in partnership with electronic portals.

FIG. 13D is a flow diagram 1300D illustrating operational aspects of an exemplary embodiment of transaction management and financial services system 100 in partnership with electronic portals. In one embodiment, business entities have established electronic portals 1306, 1307, and 1308. These electronic portals have business customers 1301, 1302, 1303, 1304, and 1305. In one embodiment, electronic portals 1306, 1307, and 1308 seek to provide commercial transaction management services to customers 1301, 1302, 1303, 1304, and 1305. Not wanting to invest in the development of the commercial transaction management services, electronic portals 1306, 1307, and 1308 partner with transaction management and financial services system 100, to provide the commercial transaction management services. In one embodiment customers 1301, 1302, 1303, 1304, and 1305, of electronic portals 1306, 1307, and 1308, seeking the commercial transaction management services provided by transaction management and financial services system 100 click on a link to transaction management and financial services system 100 on the electronic portals' web site. In an exemplary embodiment, such a link is hypermedia text of images. In another embodiment, a new participant can access transaction management and financial services system 100 using any remote access device. In another embodiment, transaction management and financial services system 100 identifies the type of device being used to access transaction management and financial services system 100, or the screen display capability of the remote access device, and transaction management and financial services system 100 modifies the type and format of information transmitted to the remote device to enable universal access to transaction management and financial services system 100. In another embodiment, the customized pages transmitted to customers 1301, 1302, 1303, 1304, and 1305 include links to marketplace 201 and 203 (described with reference to FIG. 2), associated with financial institution 231 and 232 (described with reference to FIG. 2).

In an exemplary embodiment, customers 1301, 1302, 1303, 1304, and 1305 may choose to use the commercial transaction management services of marketplace 201 or 203, associated with financial institution 231 and 232, described with reference to FIG. 2. In another embodiment, marketplace 201 and 203 would also be affiliated with electronic portal 1306, 1307, or 1308. In yet another embodiment, the only affiliation is with electronic portal 1306, 1307, or 1308.

Advantageously, by offering customer 1301, 1302, 1303, 1304, and 1305 a choice of operational service providers, electronic portals 1306, 1307, and 1308 foster the perception of affiliation with customers 1301, 1302, 1303, 1304, and 1305. In addition, partners of transaction management and financial services system 100, in this case financial institutions 231, 232 gain access and brand exposure to new prospects. Further, commercial transaction management services of transaction management and financial services system 100 provide the additional benefit of delivering access and brand exposure to buying communities 1321, 1322, 1323, 1324, and 1325 of businesses 1301, 1302, 1303, 1304, and 1305. Advantageously, buying communities 1321, 1322, 1323, 1324, and 1325 are likely to include many new prospects with whom financial institution 231, 232 and electronic portal 1306, 1307, and 1308 may not have otherwise had access. Advantageously, the customization and profiling which are part of transaction management and financial services system 100 allow the delivery of highly customized and targeted information. As such, the services and tools allow branding and targeted marketing to enhance prospect penetration, as discussed above. Another advantage is that the relationship between system 100 and buying communities 1321-1325 can result in relationships with buying communities 1311-1315 further deepening brand access, exposure, and market penetration for electronic portals 1306-1308 and/or financial institution 231 or 232.

Figure 14:
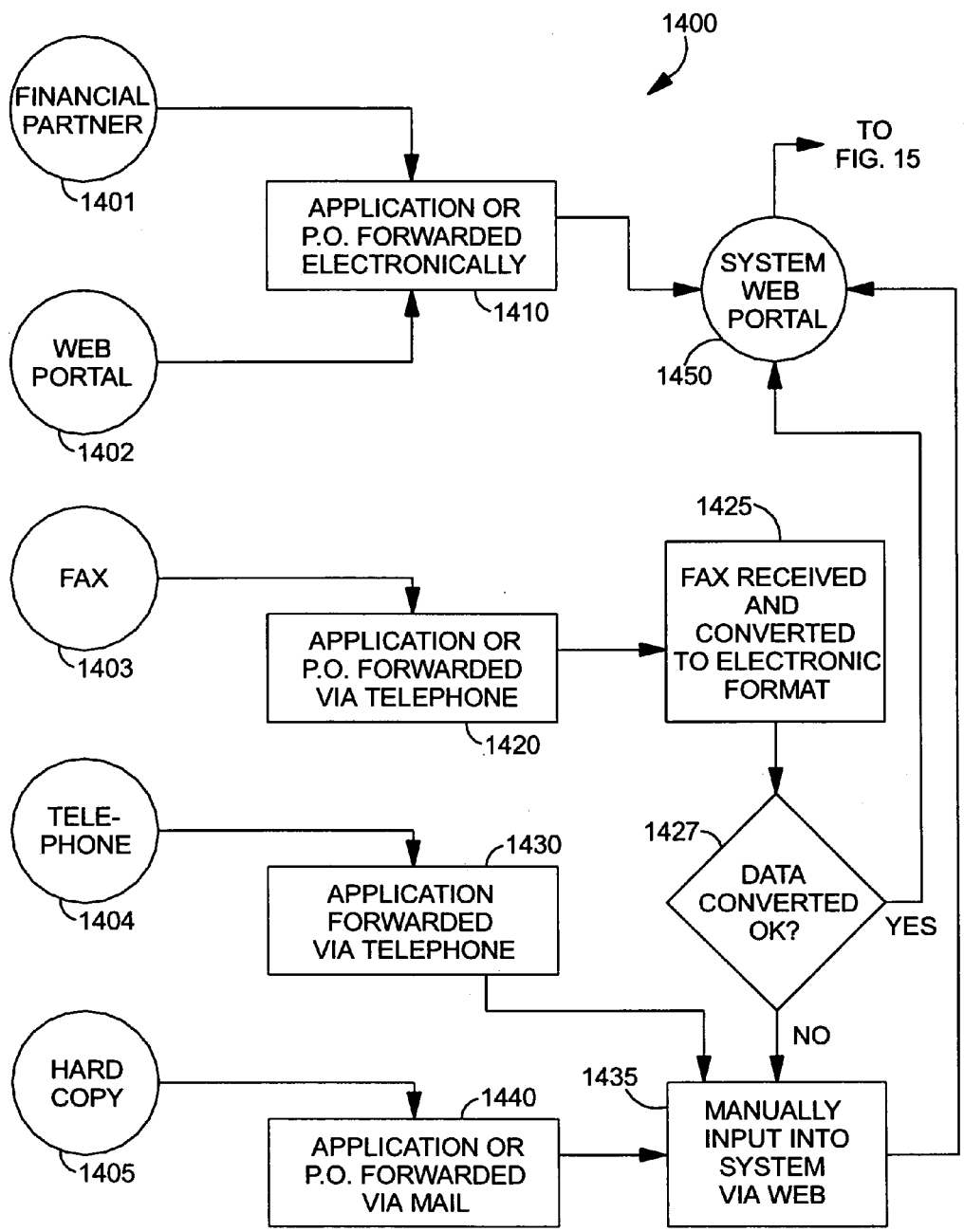
FIG. 14 is a flow diagram illustrating an exemplary method for providing a front end system to handle information submitted to the transaction management and financial services system illustrated in FIG. 1.

FIG. 14 illustrates a flow diagram 1400 of a front-end system for transaction management and financial services system 100. The front-end system receives and translates into usable form all applications for trade credit or financing, invoices, purchase orders or other commercial transaction information or ancillary commercial transaction information. In an exemplary embodiment, an application for financing and trade credit approval can arrive from participant 1401, via e-mail through web portal 1402, a fax 1403, a telephone 1404 or from a hard copy 1405. If the application is forwarded to transaction management and financial services system 100 in an electronic format in a step 1410, it is forwarded automatically to a web portal in a step 1450. If the application is received by fax in a step 1420, the fax is converted to electronic format in a step 1425. Following conversion, a step 1427 is performed in which the data is checked to see if the conversion was successful. If the conversion is satisfactory, the application which is now in electronic format is then forwarded to web portal in step 1450. If the conversion is not satisfactory, then the application is forwarded to a step 1435 wherein it is manually entered into system 100. If the application is received by telephone in a step 1430 or by mail in a step 1440, the application is forwarded to step 1435 in which it is manually entered into system 100. This electronic document is then forwarded to the web portal in step 1450.

Figure 15:
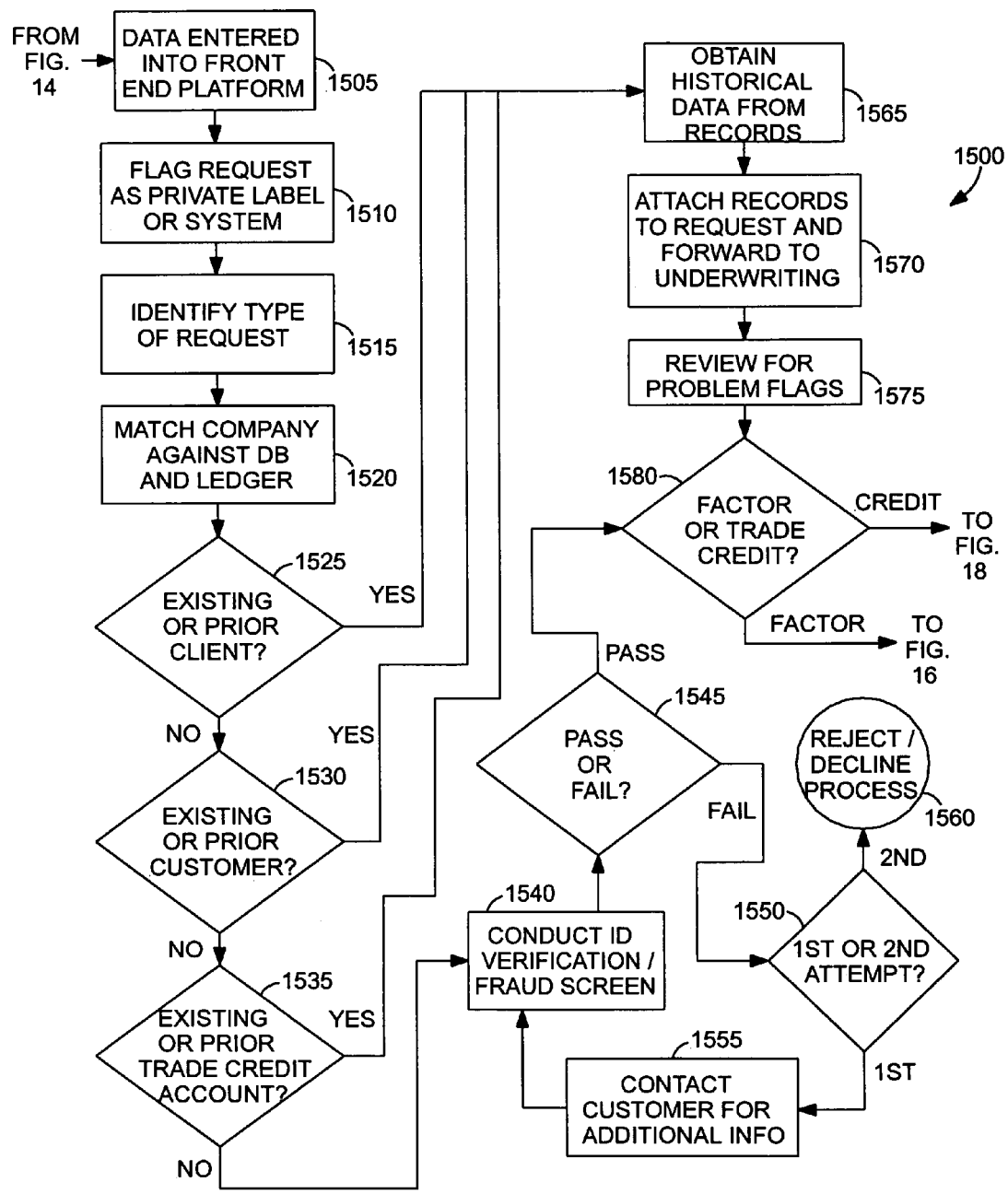
FIG. 15 is a flow diagram illustrating an exemplary method for processing and analyzing applications submitted to the exemplary front end system shown in FIG. 14.

FIG. 15 illustrates a flow diagram 1500 of an exemplary process for front end processing of the application received in the steps described with reference to FIG. 14. Front end processing flow chart 1500 receives information from web portal (FIG. 14). An example of the information transferred in an application can include financial statements, prior completed applications, trade references, or any other information on the applicant. In a step 1505, data received from web portal (FIG. 14) is entered into a front-end platform. Next, in a step 1510, the application request is flagged as being received directly; without a referral; from a referring party seeking continued brand exposure to referrals; or from a referring party seeking to offer services on a private label basis from transaction management and financial services system 100. Following step 1510, a step 1515 is performed in which the application received is flagged as either an application for financing, an application for trade credit, or any other type of application.

Next, in a step 1520, the company making the request is analyzed to determine whether the company has already been analyzed by or participated in transaction management and financial services system 100. In a step 1525, a determination is made as to whether this is an existing or prior client, a client being a participant utilizing financing operations of transaction management and financial services system 100. If the applicant is not a prior client, a step 1530 is performed where it is determined if the applicant is an existing or prior customer (buyer). If the applicant is not an existing or prior customer, a step 1535 is performed in which it is determined whether the applicant is an existing or prior trade credit account.

If the customer making the request is not an existing or prior trade credit account, a step 1540 is performed. In step 1540, an identification verification and fraud screen is performed based on the information in the request and an analysis of the company. In a step 1545, the company either passes or fails the identification and fraud screen. If the company fails the screen, a determination is made in a step 1550 whether this screening is the first or second attempt. If this screening is the first attempt, a step 1555 is performed where the customer is contacted for additional information. Following the submission of additional information, the identification verification and fraud screen at step 1540 is repeated. If step 1550 shows that the identification verification and fraud screen in step 1540 was failed in a second attempt, a step 1560 is performed in which the customer is rejected or declined. If the identification verification and fraud screen in step 1540 is passed in step 1545, a step 1580 is performed where the system forwards the application through the appropriate process, based on the type of application. In one embodiment, the process is identical through this point, but will differ from this point on, based on the type of application received (trade credit request, financing request, etc.). In another embodiment, if the request is a request for factoring services, the request is forwarded to steps illustrated in a flowchart 1600 described below with reference to FIG. 16A. If the request is a request for trade credit, the request is forwarded to steps illustrated in a flowchart 1800 described with reference to FIG. 18.

If any of the determinations made in steps 1525, 1530 or 1535 are affirmative, such that the system already has information on the customer, a step 1565 is performed in which transaction management and financial services system 100 obtains historical data from the electronic storage facility, including existing records for applicant. Next, a step 1570 is performed in which the records obtained in step 1565 are attached to the application. Following this attachment, a step 1575 is performed in which the obtained records and application are reviewed for problem flags. In one embodiment, problem flags are potential problem areas identified by transaction management and financial services system 100 with existing participants. In another embodiment, problem flags may exist for new applicants based on industry, company size or other identifiers delineated by transaction management and financial services system 100. Following this review, a step 1580 is performed where the system forwards the application through the appropriate process, based on the type of application.

In one embodiment, if the request is a request for factoring services, the request is forwarded to flowchart 1600 described with reference to FIG. 16A. If the request is a request for trade credit, the request is forwarded to flowchart 1800 described below with reference to FIG. 18. Advantageously, additional information can be automatically obtained in step 1565, thereby eliminating a large time burden associated with manual application processes. In another embodiment, the applicant is a financing seeking party, referred by a referring party, and the application forwarded is, in whole or in part, the application completed by applicant, for referring party. Advantageously, applicant is not required to complete another application.

Figure 16A:
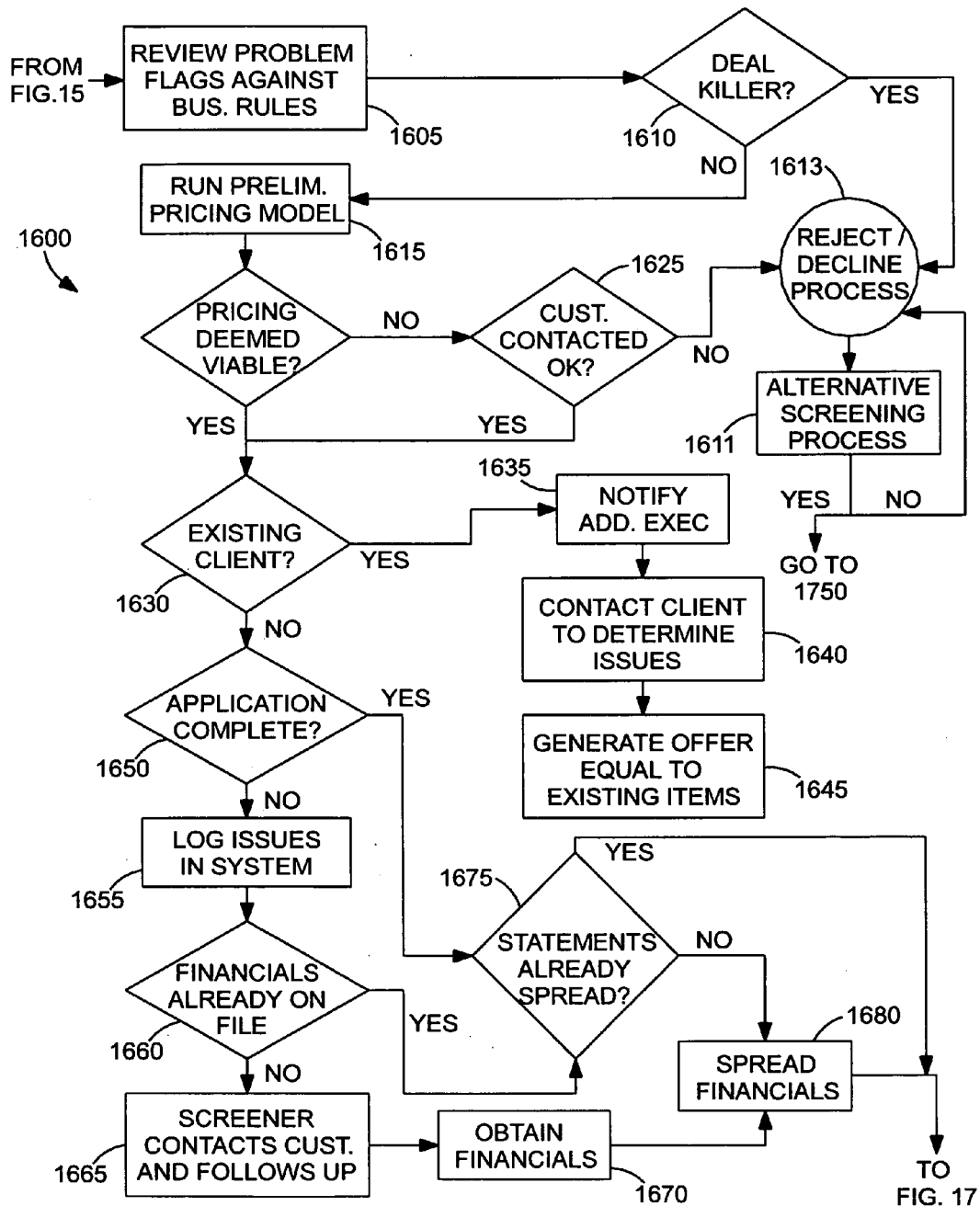
FIG. 16A is a flow diagram illustrating exemplary steps in a factor underwriting process in the transaction management and financial services system illustrated in FIG. 1.

FIG. 16A illustrates a flow diagram 1600 of exemplary steps in a factor underwriting process in transaction management and financial services system 100. A request containing attached records and problem flags is received from step 1580 in flowchart 1500 (FIG. 15). Upon receipt of the request, a step 1605 is performed in which the problem flags are reviewed in a step 1610 and compared to business rules to determine whether or not the problem flags are a "deal killer". If the problem flags are a "deal killer", step 611, alternative screening process takes place, in which an alternative solution is reviewed (described with reference to FIG. 16B).

Figure 16B:
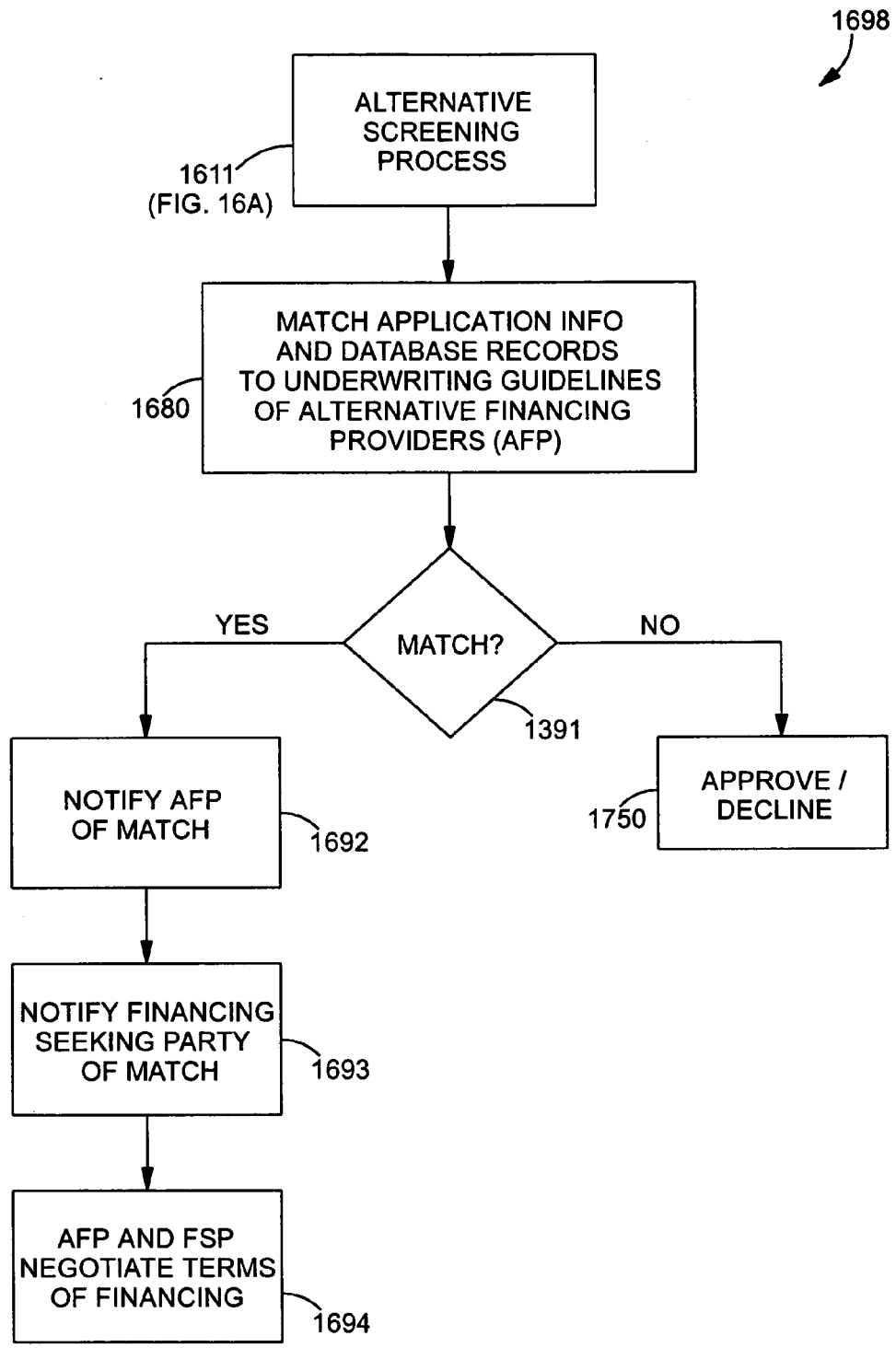
FIGS. 16B-C are flow diagrams illustrating an exemplary alternative screening process for finding alternative funding sources in the transaction management and financial services system illustrated in FIG. 1.

FIGS. 16B and C illustrate a flow diagram 1698 and 1699 of exemplary steps in exemplary alternative screening processes for finding funding sources. In FIG. 16B, step 1680, transaction management and financial services system 100 has already determined that the application for financing does not meet the credit profile of transaction management and financial services system 100. In this step, transaction management and financial services system 100 matches the application data to the underwriting guidelines of a plurality of alternative financing providers. In a step 1391, system 100 determines whether one or more matches exist. After step 1391, steps 1692 and 1693 are performed where system 100 notifies the alternative financing party and the financing seeking party of the match. The alternative financing party (AFP) and the financing seeking party (FSP) then negotiate terms of financing and conclude their financing arrangement in step 1694. In one embodiment, the approval is provided on a private label basis, reflecting the brand of transaction management and financial services system 100 and the referring party. In another embodiment, the financing is managed through transaction management and financial services system 100, but is provided by the alternative financing provider in affiliation with transaction management and financial services system 100.

Figure 16C:
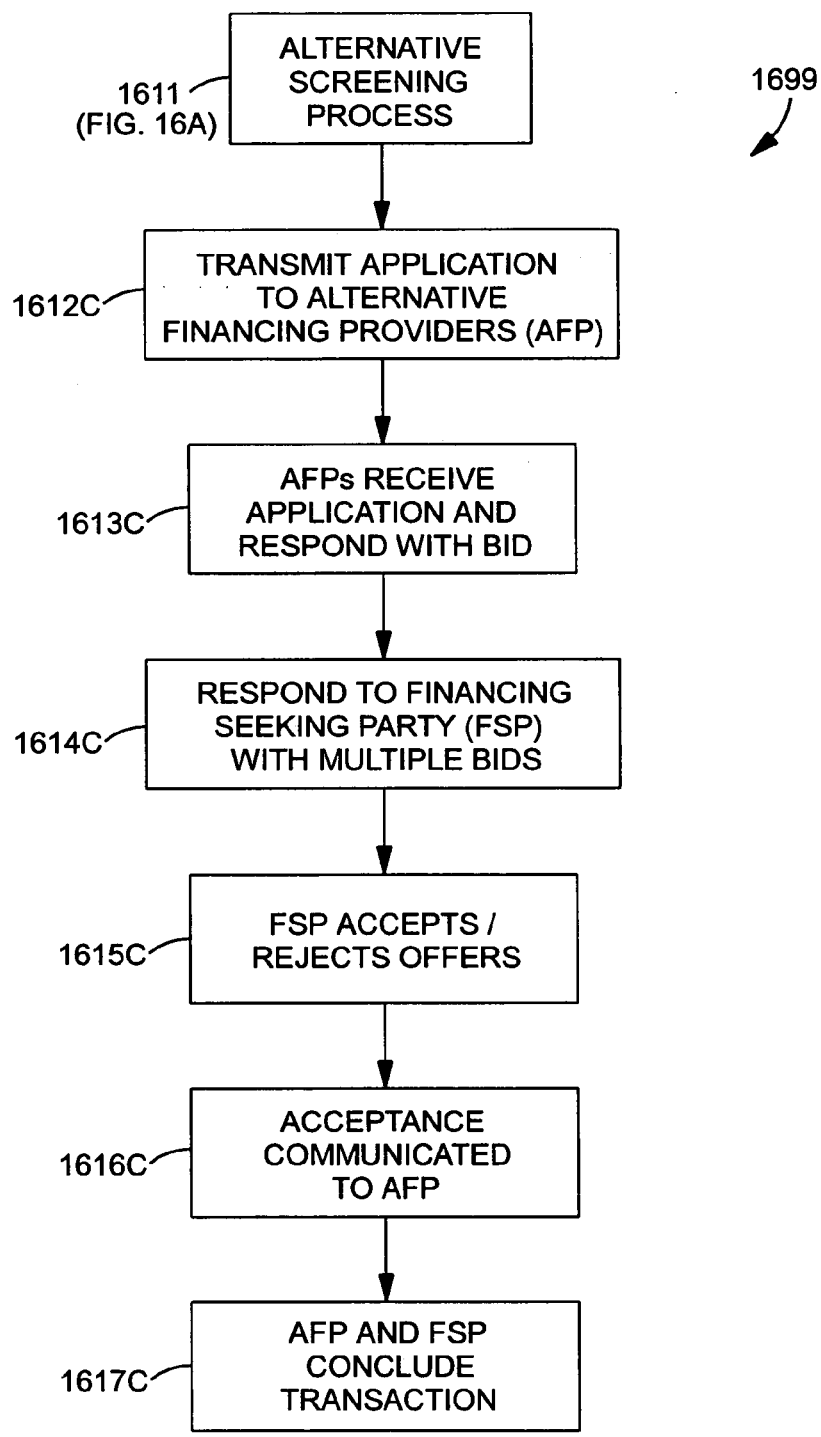

In FIG. 16C, a step 1612C is performed in which transaction management and financial services system 100 transmits the application information to a plurality of alternative financing providers (AFP) for review and analysis. In a step 1613C, the alternative financing providers receive and process the application for approval. In a step 1614C, transaction management and financial services system 100 receives the bids for financing and transmits the bids to the financing seeking party. In a step 1615C, the financing seeking party (FSP) selects the bid it would like to accept. In a step 1616C, the acceptance is communicated to the alternative financing provider, and in a step 1617C, the financing seeking party and the alternative financing provider conclude their transaction. Advantageously, by offering a brokering engine for transactions which are not suitable for system credit exposure, transaction management and financial services system 100 can further maximize it's the value to its referral sources.

Figure 17:
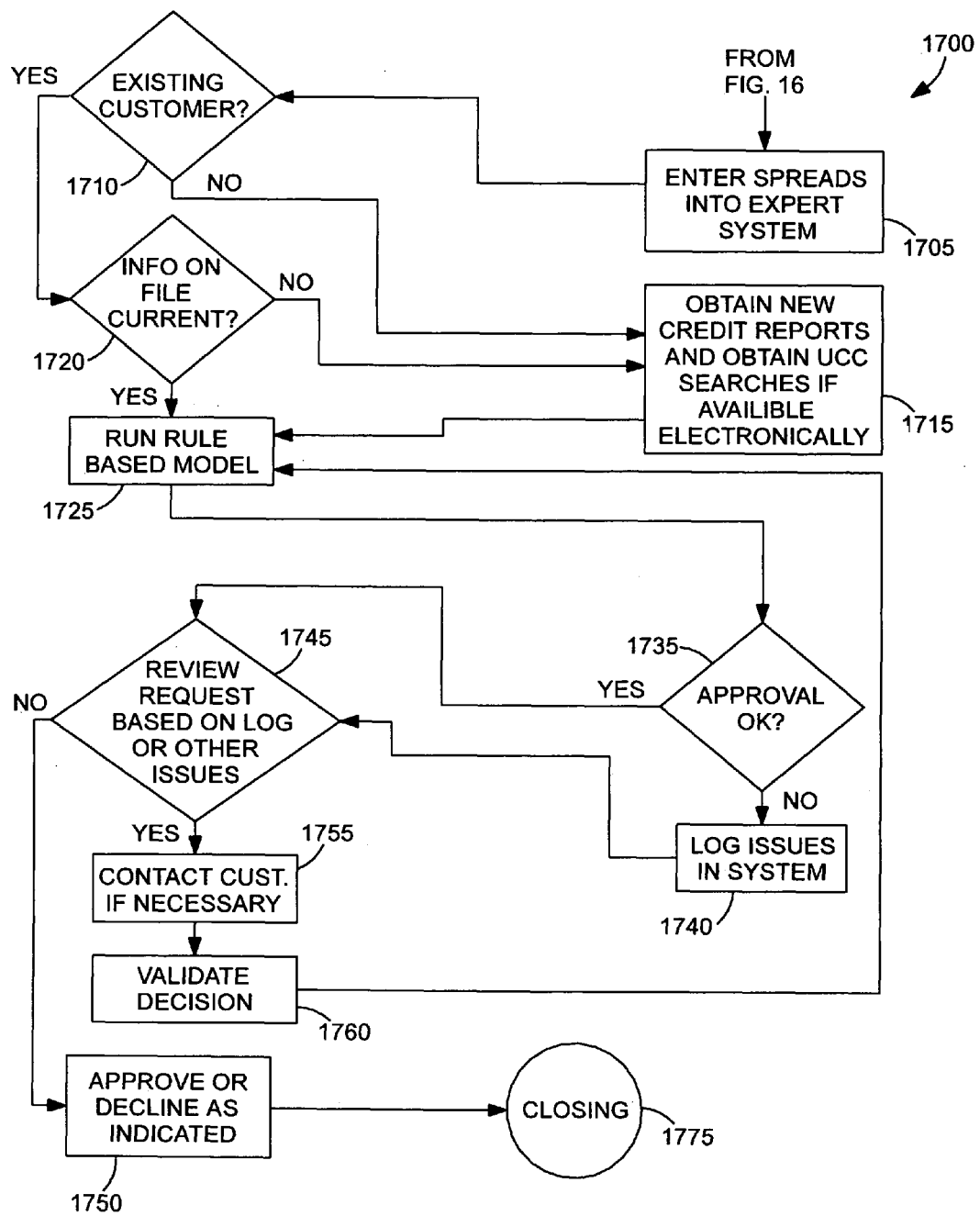
FIG. 17 is a flow diagram illustrating exemplary steps in a factor underwriting process in the transaction management and financial services system illustrated in FIG. 1.

Referring now again to FIG. 16A, after step 1611 is performed, if an alternative is found, step 1750, with reference to FIG. 17 is performed. If no alternative solution can be found, a step 1613 is performed in which the applicant moves through the reject or decline process 1613. If the problem flags are not a deal killer, a step 1615 is performed where a pricing model is run, where sufficient information exists to feed the pricing model, to determine the viability of the applicant based on profitability and cost to the applicant. If the pricing is determined not to be viable, applicant is subjected to reject or decline process 1613. If the pricing is deemed viable, then the applicant is forwarded through different processes, based on whether it is an existing financing participant. An existing financing participant is a participant in transaction management and financial services system 100 that is obtaining financing from or through transaction management and financial services system 100. If the applicant is an existing participant, a step 1635 is performed in which the account executive is notified of the existence of the request. This may occur when an existing participant, utilizing financing operations of transaction management and financial services system 100 seeks financing from a third party. If transaction management and financial services system 100 has a relationship with the third party, and the third party is offering the services of transaction management and financial services system 100 on a private label basis, transaction management and financial services system 100 can be requested to provide services to a participant already receiving those services from transaction management and financial services system 100. Following notification, a step 1640 is performed in which the account executive contacts the customer. If appropriate, the account executive generates an offer based on the new circumstances. Simultaneously, applicant may receive an offer utilizing the brand of the referring party.

If the client is not an existing client, the application is examined in a step 1650 to determine if it is complete. If it is not complete, a step 1655 is performed in which any issues are logged into the system. Following step 1655, a determination is made in a step 1660 whether complete financial information for that applicant is already on file. If transaction management and financial services system 100 does not have complete financial information for the applicant, the screening agent contacts the applicant in a step 1665. Following the contact, the applicant may submit complete financial information in a step 1670. If the application is determined to be complete in step 1650 or the financial information is determined to be on file in step 1660, a determination is made in a step 1675 whether the financial statements have been "spread". Spreading the financial information involves transferring discrete information into an electronic format and organizing it into useful categories. If the financial statements have not been "spread" or the statements were obtained from the customer in step 1670, the financial information is "spread" in a step 1680.

FIG. 17 illustrates a flow diagram 1700 of exemplary steps in a factor underwriting process in transaction management and financial services system 100. Flow diagram 1700 receives financial statements that have been spread into usable form from step 1680 or step 1675 described with reference to FIG. 16A.

Following the receipt of the financial information, the information is entered into an expert system in a step 1705. If the applicant is not an existing participant, a step 1715 is performed in which transaction management and financial services system 100 requests credit reports for the applicant and makes UCC searches for any commercial filing related to that applicant. If the applicant is determined to be an existing participant in step 1710, a check is made in a step 1720 to determine whether the information on file is current. If the information is not current, step 1715 is performed for the existing participant to update the information.

System 100 then runs a rule-based model in a step 1725 using the information either obtained in step 1715 or that was already on file for the existing applicant. The purpose of this rule-based model is to approve the applicant for financing. The analysis is examined in a step 1735. If the applicant is determined not to be acceptable in either step 1720 or 1735, a step 1740 is performed in which the issues are logged into system 100, and forwarded to step 1745, for further review.

If the determination in step 1745 is that the applicant does not need to be reviewed, based on the existing customer log or external issues, a step 1750 is performed in which the request is either approved or declined based on the decision made by the expert system in step 1725 and 1735. If the review determines the request to be desirable, but further review is necessary, a step 1755 is performed in which the customer is contacted to gather additional information. After the customer is contacted, a step 1760 is performed in which additional information is gathered, entered into the system, and step 1725 is repeated. If additional information is not gathered, step 1750 is performed. Following step 1750, a step 1775 is performed in which the transaction is closed. In one embodiment, step 1775 includes a credit extension procedure, such as, the procedure described with reference to FIG. 7C and step 750.

Figure 18:
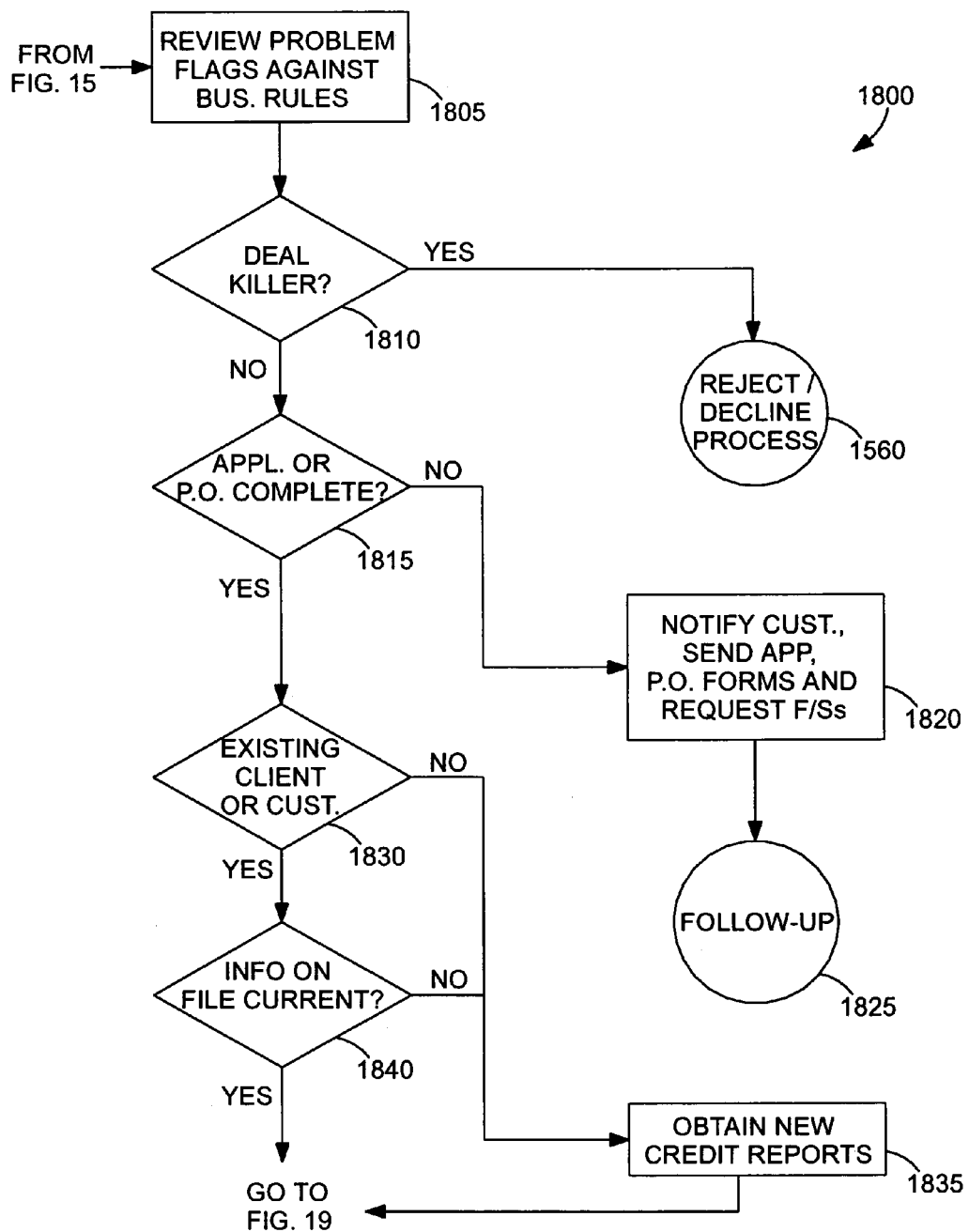
FIG. 18 is a flow diagram illustrating exemplary steps in a trade credit underwriting process in the transaction management and financial services system illustrated in FIG. 1.

FIG. 18 illustrates a flow diagram 1800 of exemplary steps in a trade credit underwriting process in transaction management and financial services system 100. In an exemplary embodiment, the trade credit underwriting process receives a request containing the body of the request and attached historical data records and problem flags from step 1580 (described with reference to FIG. 15).

Upon receipt of the request, a step 1805 is performed in which the attached problem flags are examined and compared to the business rules for system 100. The comparison is examined in a step 1810 to determine if it is a "deal killer", such that it would be uneconomical to proceed. If the examination and comparison reveal a problem that is a "deal killer", a rejection process is performed in step 1560. If the problem is not a "deal killer", an examination is made in a step 1815 to determine if the application in the body of the request is complete. If the application in the body of the request is not complete, a step 1820 is performed in which the customer is notified and allowed to update the application. Following step 1820, a step 1825 is performed in which the status of the request is determined. If the application attached to the request is complete, then a determination is made in a step 1830 whether the applicant is an existing participants.

If the applicant is not an existing participant, a step 1835 is performed in which system 100 obtains credit reports on the applicant. If the applicant is an existing participant, a determination is made in a step 1840 whether the information on file is current. If the information is not current, then step 1835 is performed and new credit reports are obtained.

Figure 19:
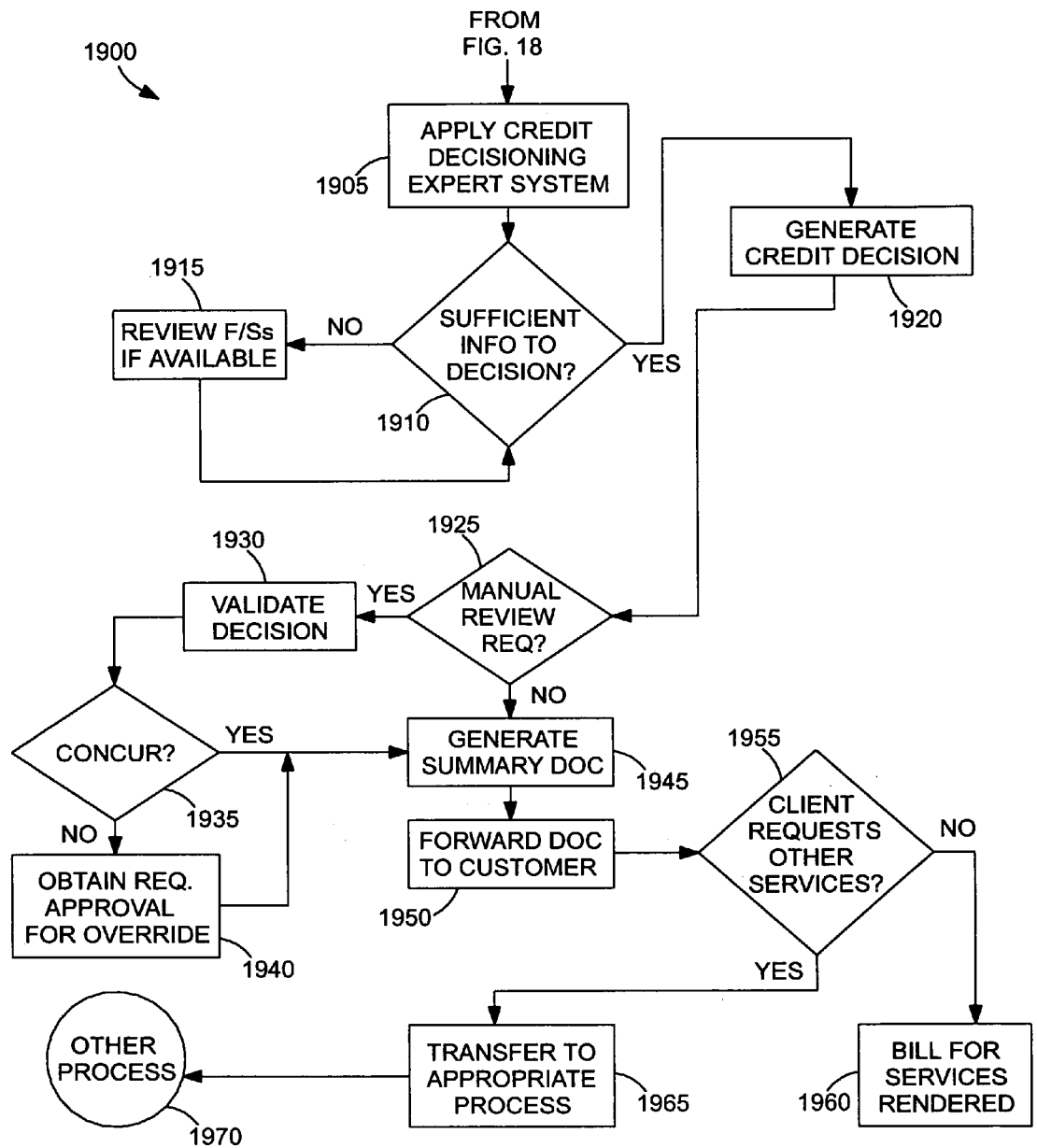
FIG. 19 is a flow diagram illustrating exemplary steps in a trade credit underwriting process in the transaction management and financial services system illustrated in FIG. 1.

FIG. 19 illustrates a flow diagram 1900 of exemplary steps in a trade credit underwriting process in transaction management and financial services system 100. Flow diagram 1900 receives an application and information regarding the application from step 1835 or step 1840 (described with reference to FIG. 18).

Upon receipt of the information on file or the information in the credit reports, a step 1905 is performed in which a determination is made in a step 1910 whether there is sufficient information to make a decision. If there is not sufficient information, a step 1915 is performed in which either the applicant is contacted for additional financial statements or the financial statements on file are examined. If there is sufficient information on file to make a decision or if sufficient information is obtained, a step 1920 is performed in which a credit decision is generated.

Following the generation of the credit decision, a determination is made in a step 1925 whether a manual review is required. If a manual review is required in step 1925, a step 1930 is performed in which the credit decision generated in step 1920 is validated. An accounts manager makes a determination in a step 1935 whether to concur with the credit decision. If the accounts manager does not concur with the credit decision, a step 1940 is performed in which a required approval for override is obtained. If a manual review is not required or the accounts manager concurs or the required approval is obtained in step 1940, a step 1945 is performed in which summary document is generated. This document is then forwarded to the applicant in a step 1950.

Following the forwarding of the document to the applicant, the applicant has the option of requesting other services in a step 1955. If the applicant does not request additional services, a step 1960 is performed in which a bill is sent for services rendered. If the client does request additional services, a step 1965 is performed in which the customer is transferred to the appropriate process for the requested service in a step 1970.

Advantageously, the processes described with reference to FIGS. 14-19 provide for a flexible system handled by expert sub-systems and by the use of documents in electronic format. System 100 can deliver the majority of its services real time, meaning there is virtually no delay between a request for a service and the product of that service. Conventionally, certain operations, such as an analysis of a credit history, take a number of people conducting a number of inquiries. Delays are inherent to such conventional systems.

Figure 20:
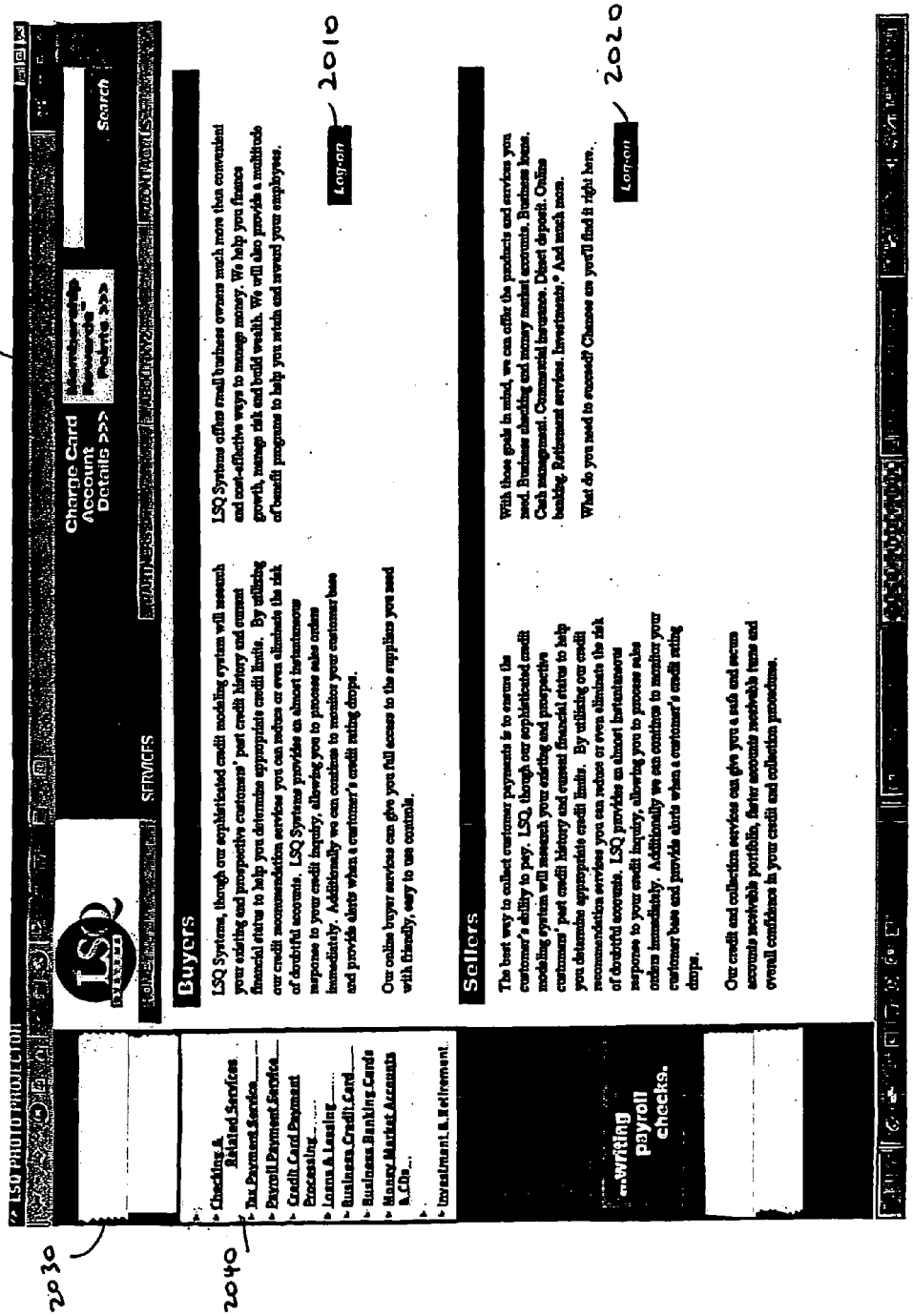
FIG. 20 is an exemplary screen display illustrating an initial welcoming screen in the transaction management and financial services system illustrated in FIG. 1.

FIG. 20 illustrates an exemplary display screen 2000 of a web page for transaction management and financial services system 100. Screen 2000 is displayed upon access of the web site from some source (e.g., a business to business web site). In an exemplary embodiment, the user has chosen Chase as a financial institution. Screen 2000 includes two hypermedia links labeled "Log-on." A hypermedia link 2010 provides access to a log-on procedure for buyers in transaction management and financial service system 100 and a hypermedia link 2020 provides access for sellers.

Exemplary display screen 2000 may display a source-indicating logo, a font, a layout and/or a color scheme designated by an associated financial institution. In an exemplary embodiment, the logo and links to services for transaction management and financial service 100 are not present on display screen 2000 and the web page content is entirely designated by the financial institution. In another embodiment, the logo and links to services for system 100 are prominently displayed. Advantageously, the financial institution has significant design input allowing the financial institution to maximize brand recognition, offer additional services, and provide targeted marketing to the participants.

FIG. 20 also illustrates a financial institution specific tool bar 2030. Tool bar 2030 contains at least one hypermedia link 2040 to products or services from an associated financial institution. Tool bar 2030 may also contain images or advertisements from the associated financial institution. The content of the tool bar may also be modified to reflect the interests of the viewer currently viewing the display.

Figure 21:
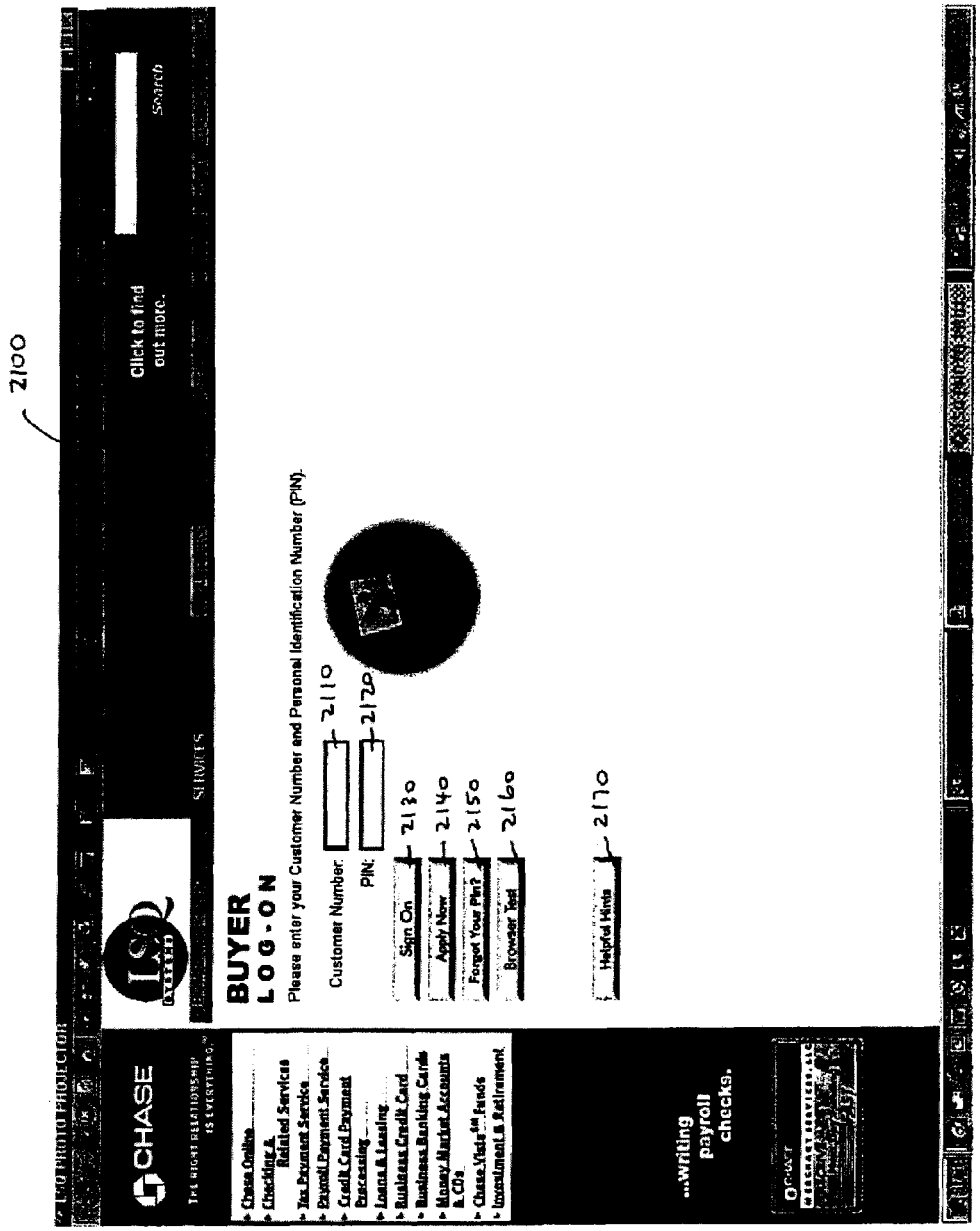
FIG. 21 is an exemplary screen display illustrating a log-in feature in the transaction management and financial services system illustrated in FIG. 1.

FIG. 21 illustrates an exemplary display screen 2100 of a web page for transaction management and financial services system 100. Screen 2100 is displayed upon activation of hypermedia link 2010 labeled "Log-on" and described with reference to FIG. 20. Screen 2100 includes an entry field 2110 labeled "Customer Number" and an entry field 2120 labeled "PIN". Screen 2100 additionally includes hypermedia links 2130, 2140, 2150, 2160, and 2170. Hypermedia link 2130 labeled "Sign On" provides access to additional website screens of system 100. Hypermedia link 2140 labeled "Apply Now" provides access to a web page allowing the user to obtain a customer number and PIN (personal identification number) and thereafter access additional website screens. Hypermedia link 2150 labeled "Forgot Your Pin?" provides access to a web page allowing access to website screens without properly filling the PIN field. Hypermedia link 2160 labeled "Browser Test" provides access to a method for testing the compatibility between the browser viewing the web page and the web pages for transaction management and financial services system 100. Hypermedia link 2170 labeled "Helpful Hints" provides access to a web page containing information about using system 100.

Figure 22:
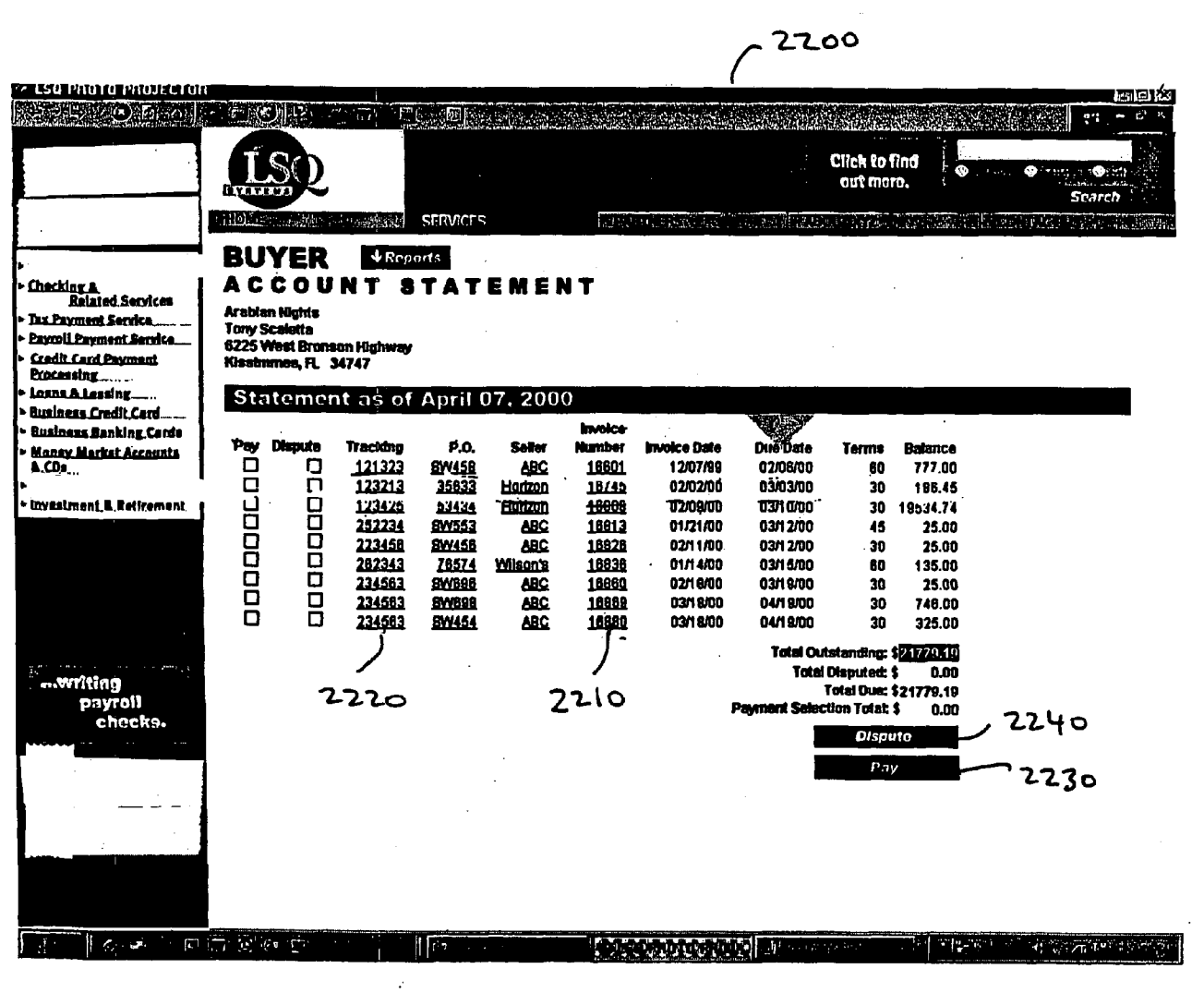

FIG. 22 illustrates an exemplary display screen 2200 of a web page for transaction management and financial services system 100. Display screen 2200 is displayed upon completion of the log-in procedure described with reference to FIG. 21. Display screen 2200 illustrates an account statement for an example user. In one embodiment, the account statement features columns containing pay selection boxes, dispute selection boxes, tracking fields, purchase order numbers, seller identities, invoice numbers, invoice dates, due dates, terms of the account, and the balance of the account. The entries in the account statement can be sorted according to the entries in any of the columns. For example, the column labeled "Invoice Number" contains a list of invoice numbers 2210 which are hypermedia links to web pages containing an electronic copy of the invoice for that account. The column labeled "Tracking" contains a list of numbers 2220 which are hypermedia links to a web page displaying tracking information for that account. At the bottom of the display screen is a button 2240 labeled "Dispute" and a button 2230 labeled "Pay".

In one embodiment, system 100 acts as a bill aggregator for a Buyer and display screen 2200 illustrates an example of the display that a Buyer can access to manage bills from a plurality of vendors. Bill information may be received directly from the vendor to system 100 either in electronic or non-electronic format. Alternatively, bills may be forwarded to system 100 from the Buyer.

Transaction management and financial services system 100 creates profiles for each customer and client that interacts with system 100. System 100 also creates a profile for each user associated with the marketplace. The profile is based in part on unique information gathered by system 100 and in part on external information. The information stored can include the size of the business, number of years in operation, the industry of the business, the nature of the business including whether it manufactures, wholesales, distributes or retails the product it sells, payment records, purchase records, banking records, credit record, and a summary of any transactions conducted in transaction management and financial services system 100.

Figure 23:
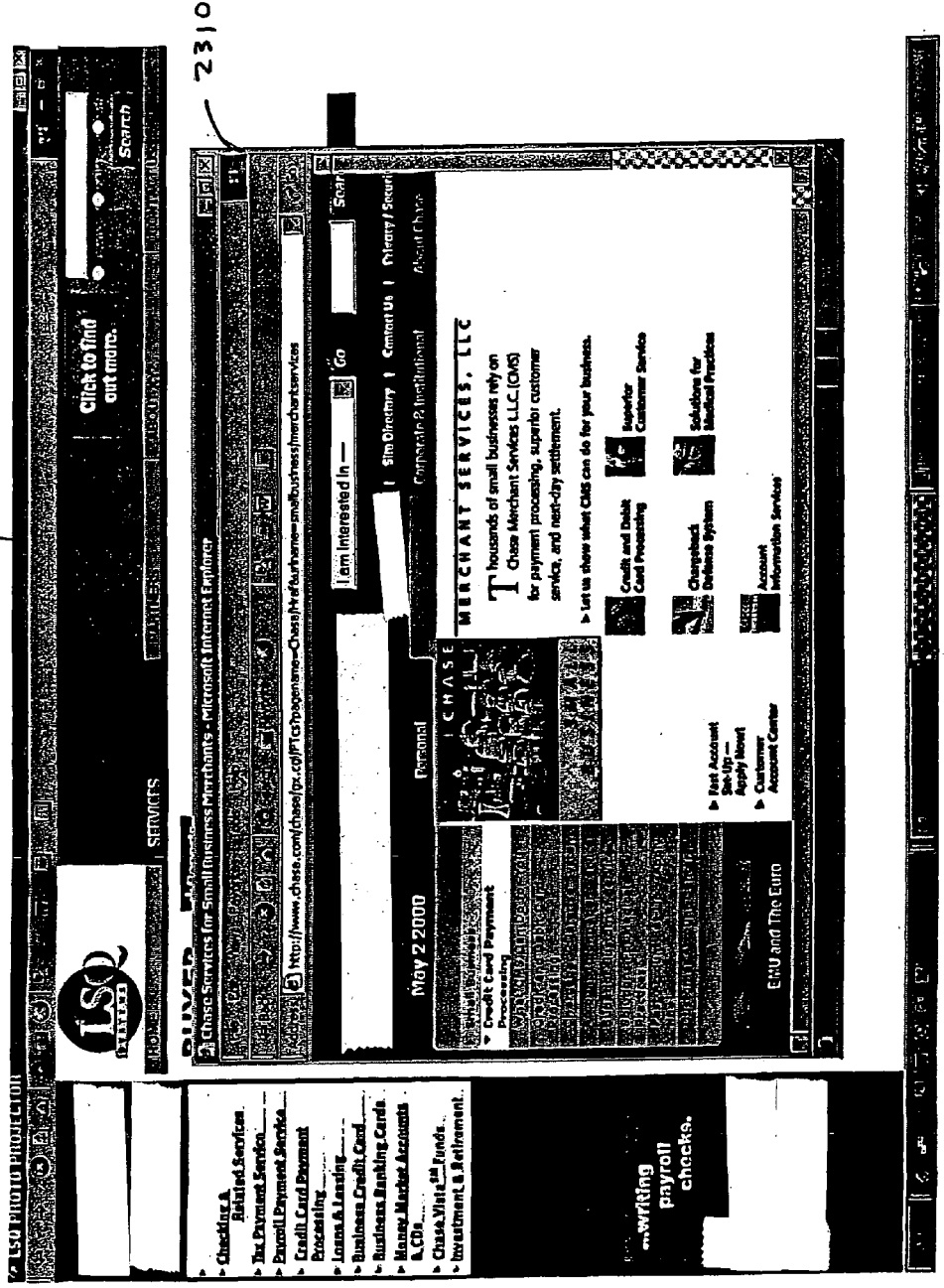
FIG. 23 is an exemplary screen display illustrating a pop up window displaying products and services associated with a financial services partner of the transaction management and financial services system illustrated in FIG. 1.

FIG. 23 illustrates an exemplary display screen 2300 of a web page for transaction management and financial services system 100. Display screen 2300 is displayed when a person viewing the web page clicks on hypermedia link 2040 in financial institution specific tool bar 2030 (described with reference to FIG. 20). Display screen 2310 is displayed in a new window and includes a web page for a specific financial institution and information corresponding to the service or product listed in the hypermedia link selected from tool bar 2030.

Figure 24:
FIG. 24 is an exemplary screen display illustrating a pop up window displaying an exemplary invoice for a customer of the transaction management and financial services system illustrated in FIG. 1.

FIG. 24 illustrates an exemplary display screen 2400 of a web page for transaction management and financial services system 100. Display screen 2400 is displayed when a person viewing display screen 2200 (FIG. 22) clicks on a hypermedia link in a list 2210 to display an electronic copy of an invoice. The opened window 2410 displays the electronic copy of the invoice 2420. Advantageously, all of the traditionally required paper copies of required documents can be accessed in a similar manner. In conventional systems, one has to place a call to the records division, have them retrieve the paper document from a file, and have them fax the document to the requesting party.

Figure 25:
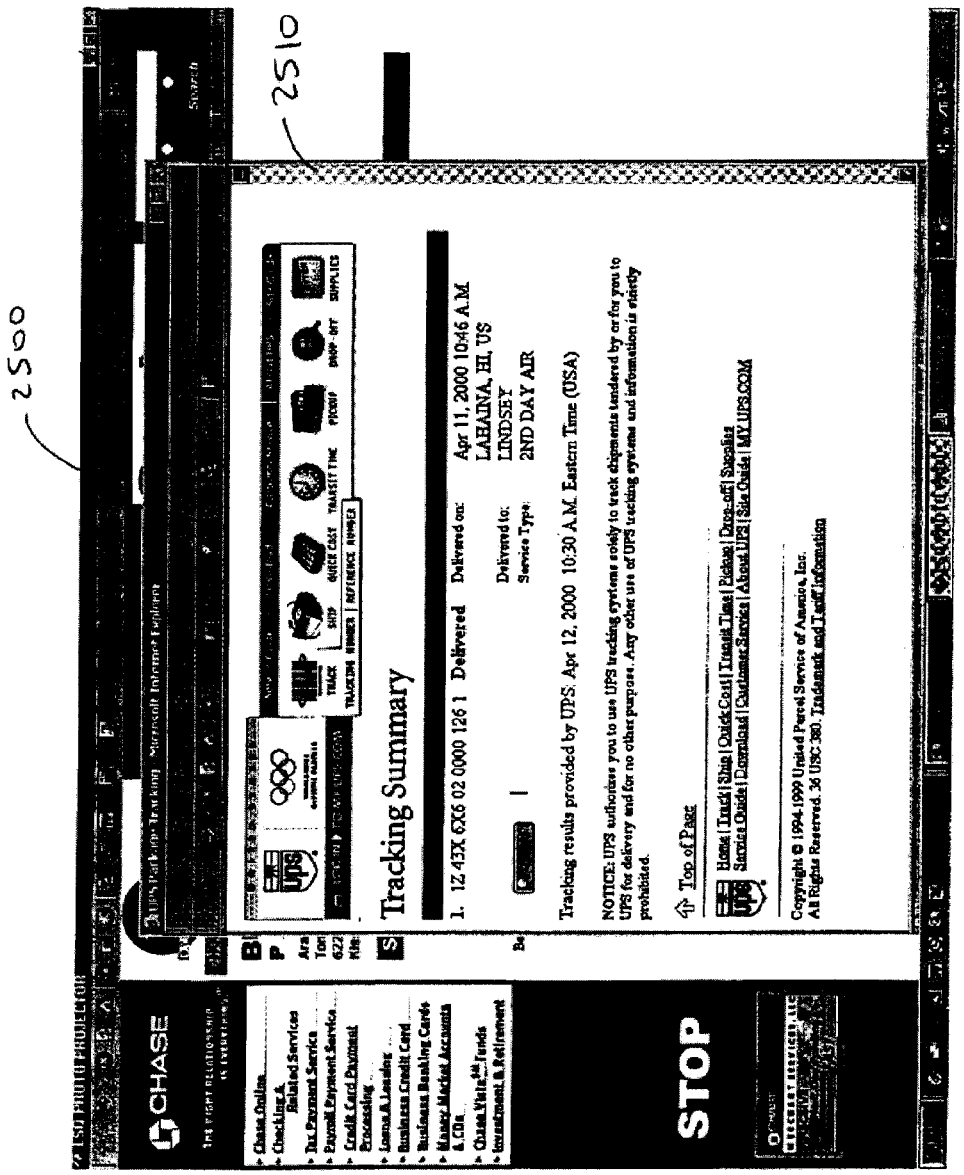
FIG. 25 is an exemplary screen display illustrating a pop up window displaying a web site for a tracking company displaying information relevant to an account in the transaction management and financial services system illustrated in FIG. 1.

FIG. 25 illustrates an exemplary display screen 2500 of a web page for transaction management and financial services system 100. Display screen 2500 is displayed when a person viewing display screen 2200 (FIG. 22) clicks on a hypermedia link in list 2220 to display tracking information for an account. System 100 interfaces with major shipping carriers that offer online tracking, by accessing their web site, filling the appropriate fields, and retrieving tracking information. The opened window 2510 displays tracking information from any major shipping carrier offering on-line tracking of shipments. The person viewing display screen 2510 can access any of the functionality in the web site of the major shipping carrier. The contents of window 2510 can be stored or printed as proof of delivery. Advantageously, this process makes it easier to obtain this information and also facilitates the process of providing proof of delivery. In conventional systems, an accounts payable has to communicate with a person in shipping, wait for that person to retrieve a bill of lading, receive the bill of lading, contact the shipping company and finally receive tracking information.

Figure 26:
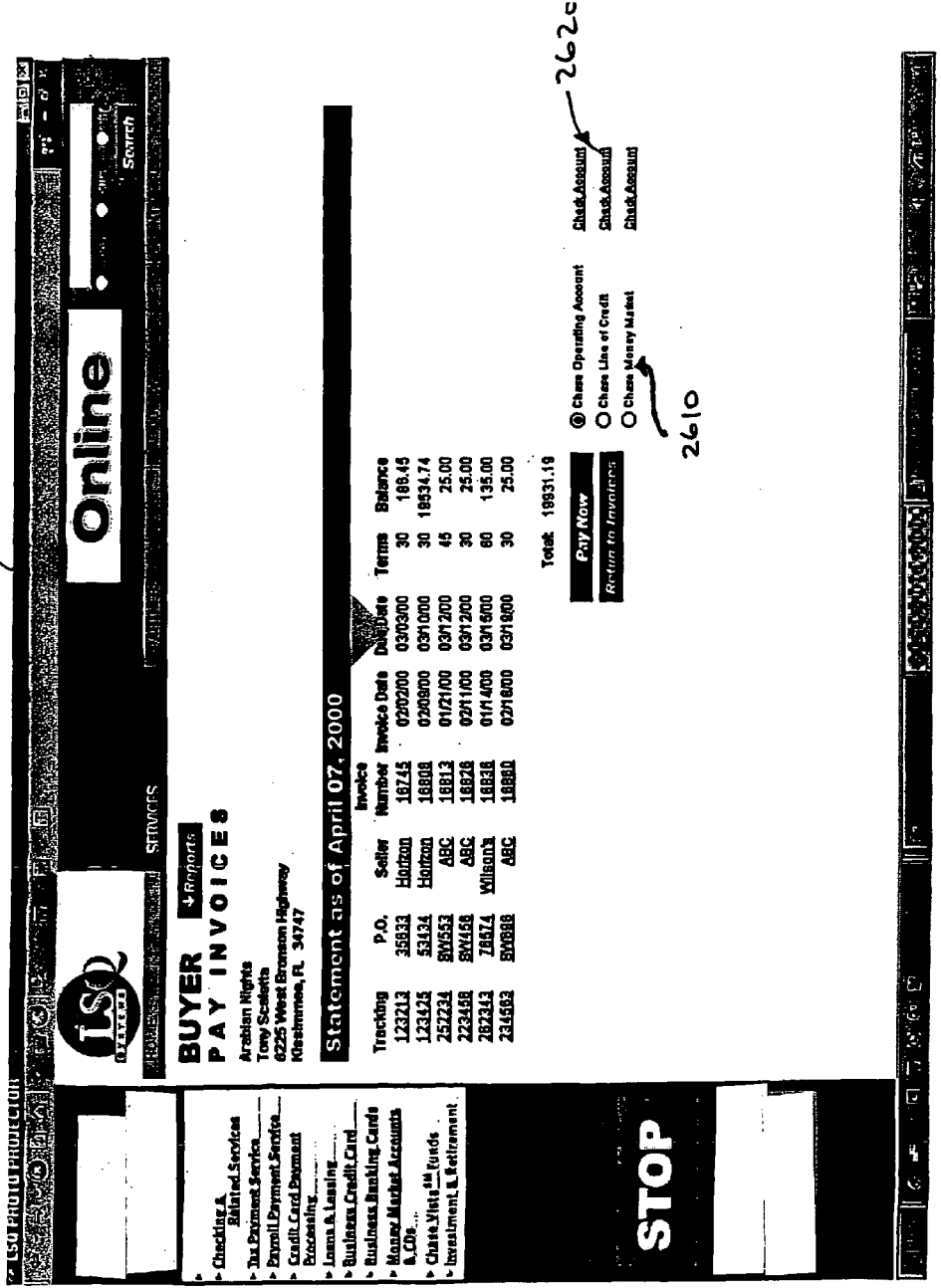
FIG. 26 is an exemplary screen display illustrating a listing of invoices for a customer of the transaction management and financial services system illustrated in FIG. 1.

FIG. 26 illustrates an exemplary display screen 2600 of a web page for transaction management and financial services 100. Display screen 2600 is accessed from display screen 2200 showing an account summary. In an exemplary embodiment, display screen 2600 is displayed when the person viewing display screen 2200 checks a box in the column labeled "Pay" and then clicks on hypermedia link 2230 labeled "Pay." Display screen 2600 lists the accounts associated with boxes selected prior to clicking on hypermedia link 2230 and the associated tracking, purchase order, seller, invoice number, invoice date, due date, terms and balance information for those accounts. Display screen 2600 also includes an accounts field 2610 allowing the user to select an account from all of the banking or credit accounts that are logged with system 100 for the current user. The user can select which banking or credit account is to be used to pay the selected invoices. The user can also activate a hypermedia link 2620 labeled "Check Account" associated with each banking or credit account. Hypermedia link 2620 allows the user to check the current balance and available funds for that account. Activating hypermedia link 2620 opens a web page displaying information about the banking or credit account. In an exemplary embodiment, this web page is hosted and maintained by a financial institution corresponding to the account. In another embodiment, the web page is hosted and maintained by a centralized accounts managing provider.

Advantageously, display screen 2600 allows a user to see what accounts have been selected for payment and the total amount due for those accounts. The user can then check the balances or move funds within all of the banking and credit accounts listed with system 100. As such, the user can manage all their accounts and payments from one easy location.

Another advantage offered by transaction management and financial services system 100 is that on-line bill payment is made more convenient. In conventional systems, users have to manually enter payment information for all vendors.

Figure 27:
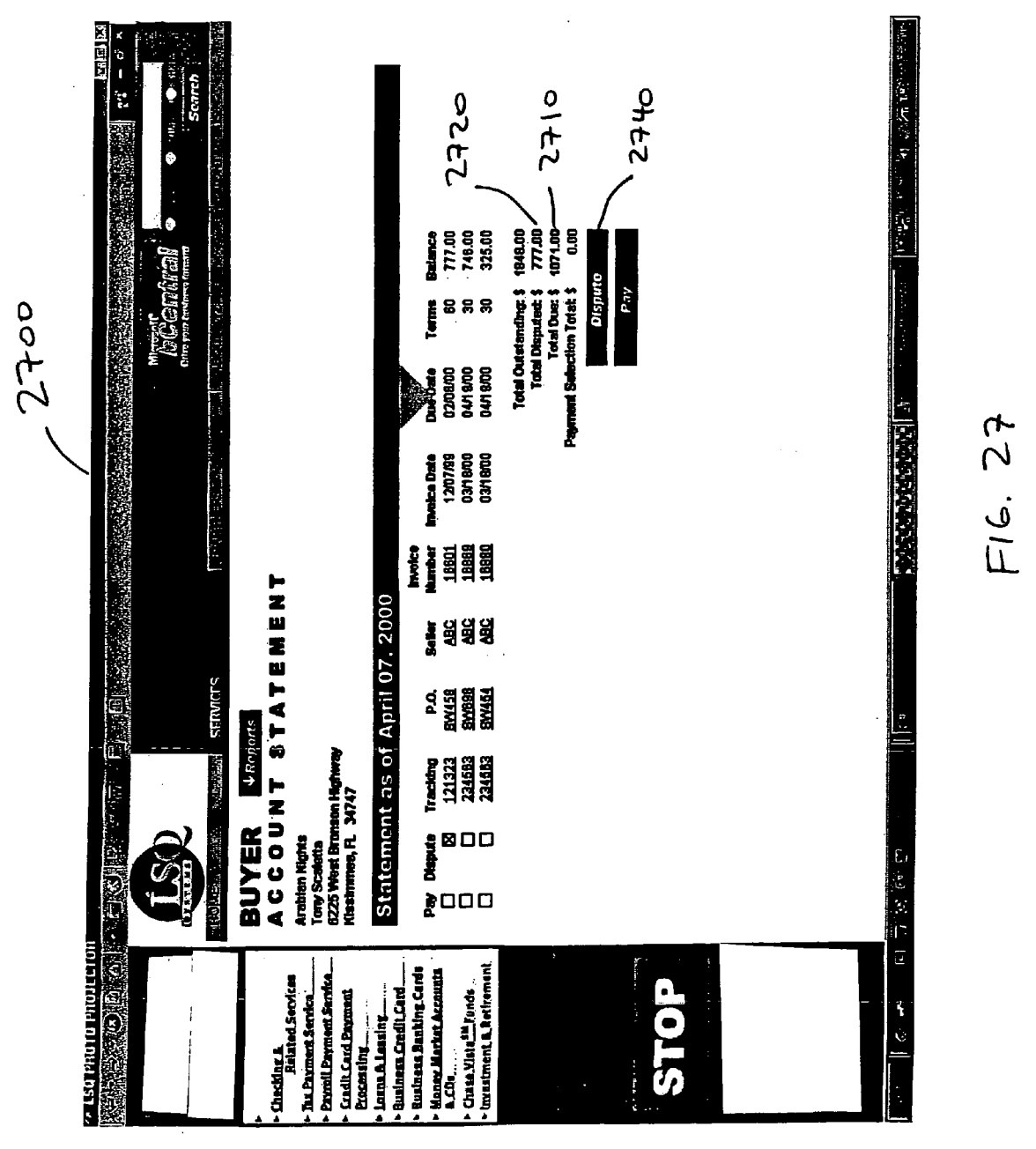

FIG. 27 illustrates an exemplary display screen 2700 of a web page for transaction management and financial services system 100. Display screen 2700 is a version of display screen 2200 showing an account statement of a buyer. Screen 2700 illustrates the dispute resolution feature in system 100 that is selectively engaged when a person viewing display screen 2200 checks a box in the column labeled "Dispute". The amount due for that account is subtracted from a numerical field 2710 labeled "Total Due" and added to a numerical field 2720 labeled "Total Disputed". The user can then click on hypermedia link 2240 labeled "Dispute" to enter the dispute.

Figure 28:
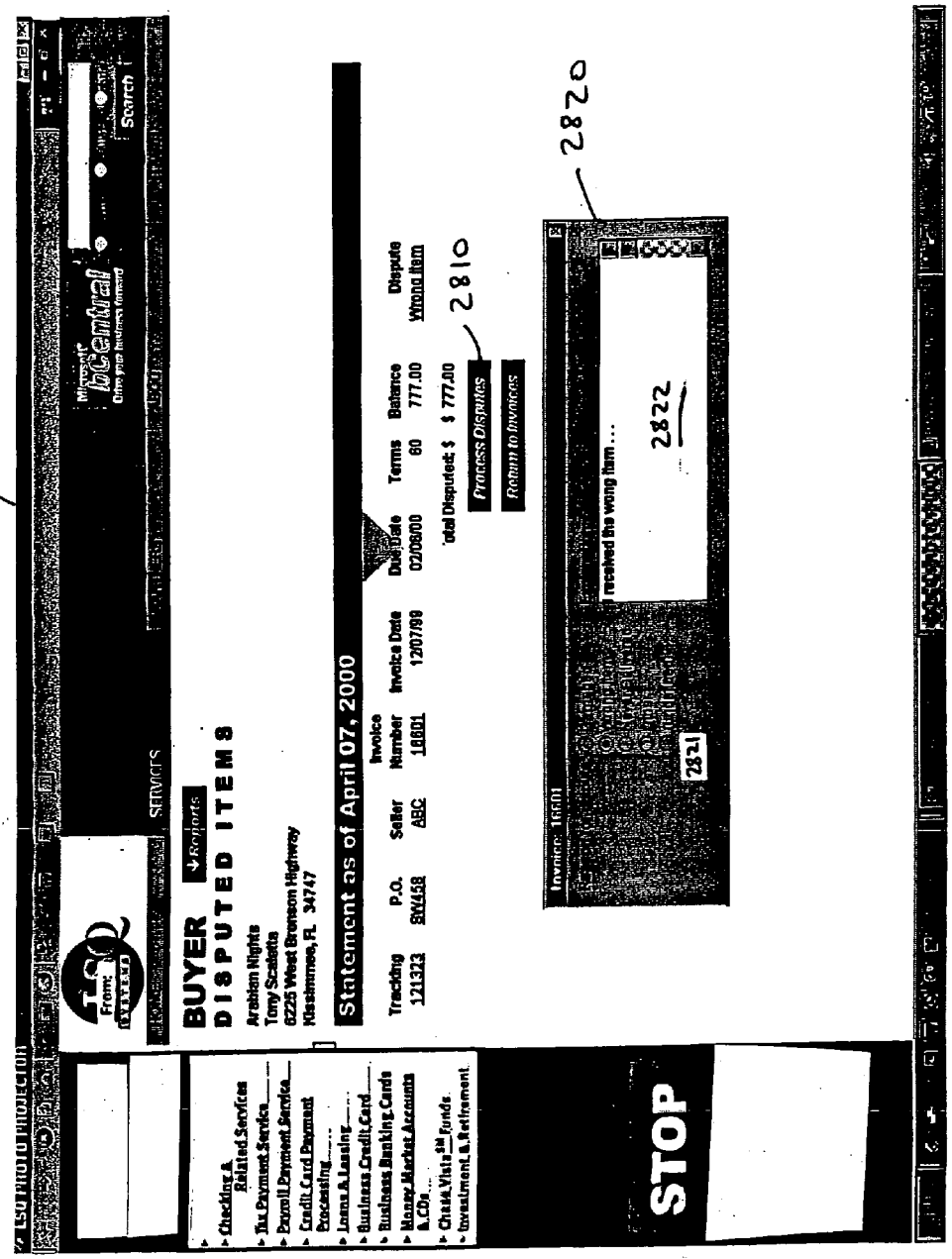
FIG. 28 is an exemplary screen display illustrating a pop up window that is created when the user enters the dispute illustrated in FIG. 27.

FIG. 28 illustrates an exemplary display screen 2800 of a web page for transaction management and financial services system 100. Display screen 2800 is accessed from display screen 2700 described with reference to FIG. 27. Display screen 2800 further illustrates the dispute resolution feature in system 100 in which the selected account to be disputed is displayed. Screen 2800 features information about the account as well as a column labeled "Dispute." The value in the "Dispute" column is originally undefined. When the user click on a hypermedia link 2810 labeled "Process Disputes," a display window 2820 is displayed.

Display window 2820 includes a selectable field 2821 labeled "Reason for Dispute:", and a text entry field 2822 labeled "Explanation:". In an exemplary embodiment, the user has the ability to select a reason for the dispute and then enter an explanation that will be communicated to the seller. After a selection is made in reason for dispute field 2821, the value in the "Dispute" column is updated to reflect this selection.

Figure 29:
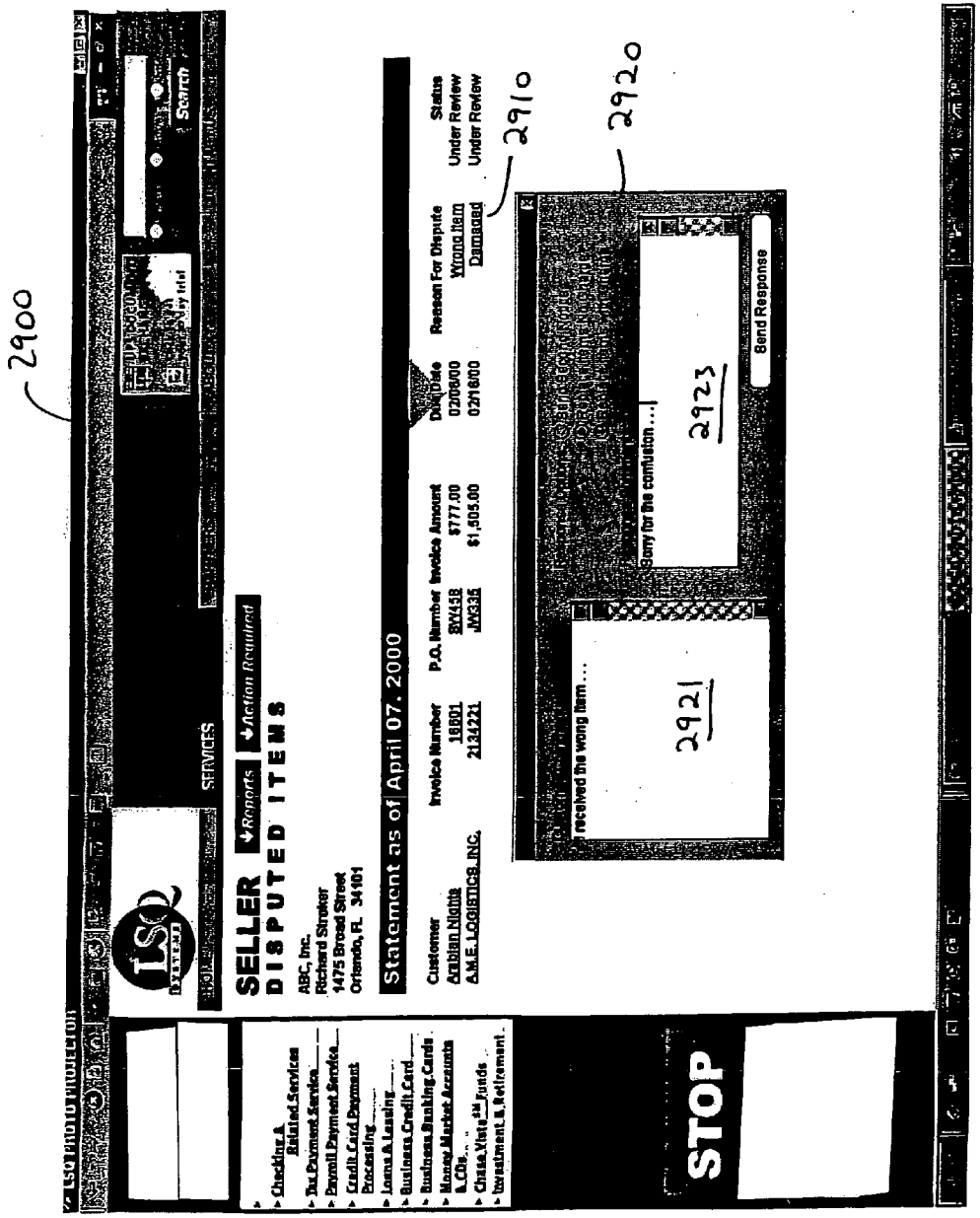
FIG. 29 is an exemplary screen display illustrating another pop up window that is created when the recipient of the dispute illustrated in FIG. 27 elects to respond to the dispute.

FIG. 29 illustrates an exemplary screen display 2900 for the dispute resolution process from the point of view of a seller. The seller accesses screen display 2900 after logging in and accessing the report on disputed items. Screen 2900 features a list of all invoices for the seller that have been disputed by a buyer. For each item in the list, information fields display the customer name, the invoice number, the P.O. number, the invoice amount, the due date, the reason for dispute, and the status of the dispute. In an exemplary embodiment, each information field includes a hypermedia link to further information. Hypermedia link 2910 in the information column labeled "Reason for Dispute" facilitates the dispute resolution process for the seller. The text field in this column displays the reason for the dispute entered by the buyer in display screen 2820 described above and is also a hypermedia link 2910. When the seller clicks on hypermedia link 2910, a display window 2920 is displayed. Display window 2920 contains a text entry field 2921 labeled "Customer Comments:", a selectable field 2922 labeled "Response Options:", and a second text entry field 2923 labeled "Response Comments:." Field 2921 displays the text entered by the seller in text entry field 2822 described above. In an exemplary embodiment, the seller has the opportunity to select a response option and include an explanation for the response. This response is then communicated to the buyer.

Advantageously, the dispute resolution system described in FIGS. 28 and 29 makes dispute resolution easier to manage for both parties involved. In conventional systems, a party wishing to dispute an invoice has to attempt to contact the issuer of the invoice directly by phone or mail or any other method to contest the invoice. Then, the issuer of the invoice has to respond using some similar method. In system 100, all communications are handled by the system, the user simply needs to log the dispute, and the issuer of the invoice simply responds using the functionality described above.

Figure 30:
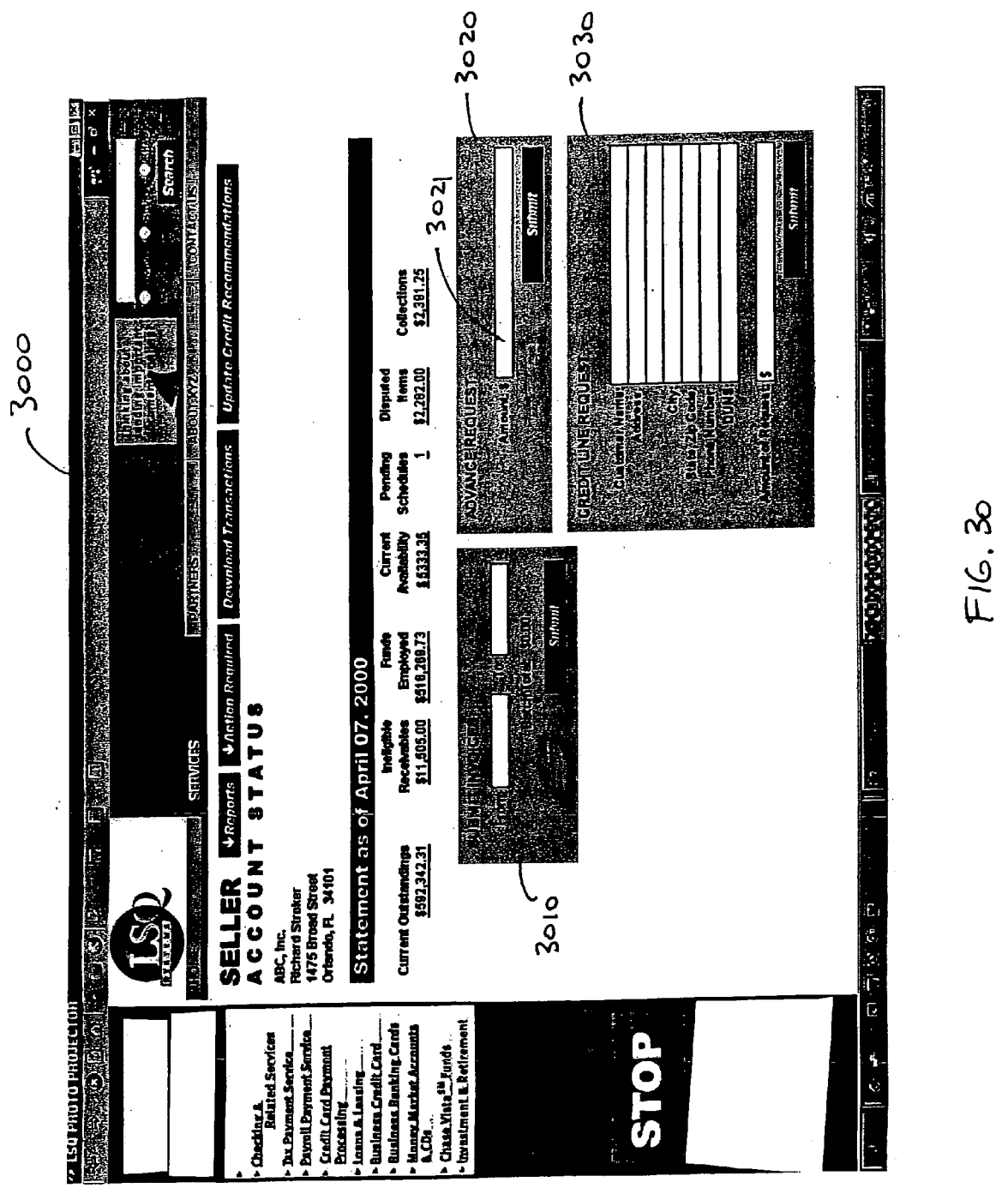

FIG. 30 illustrates an exemplary display screen 3000 displayed when the seller logs into transaction management and financial services system 100 from display screen 2000 by clicking hyperlink 2020 as described with reference to FIG. 20. Screen 3000 includes information that may be relevant to a seller of accounts. The statement includes information fields relating to the seller's account. In an exemplary embodiment, the information fields display Current Outstandings, Ineligible Receivables, Funds Employed, Current Availability, Pending Schedules, Disputed Items and Collections. Each information field may include a hypermedia link to more information regarding the information in that field.

In an exemplary embodiment, display screen 3000 also features region 3010 labeled "Submit Invoices" containing two data entry fields labeled "From:" and "To:" and a button labeled "Submit". Screen 3000 additionally features region 3020 labeled "Advance Request" which contains one data entry field 3021 labeled "Amount:" and a button labeled "Submit". Screen 3000 additionally features region 3030 labeled "Credit Line Request" containing entry fields describing the customer, an entry field labeled "Amount of Request:" and a button labeled "Submit".

Figure 31:
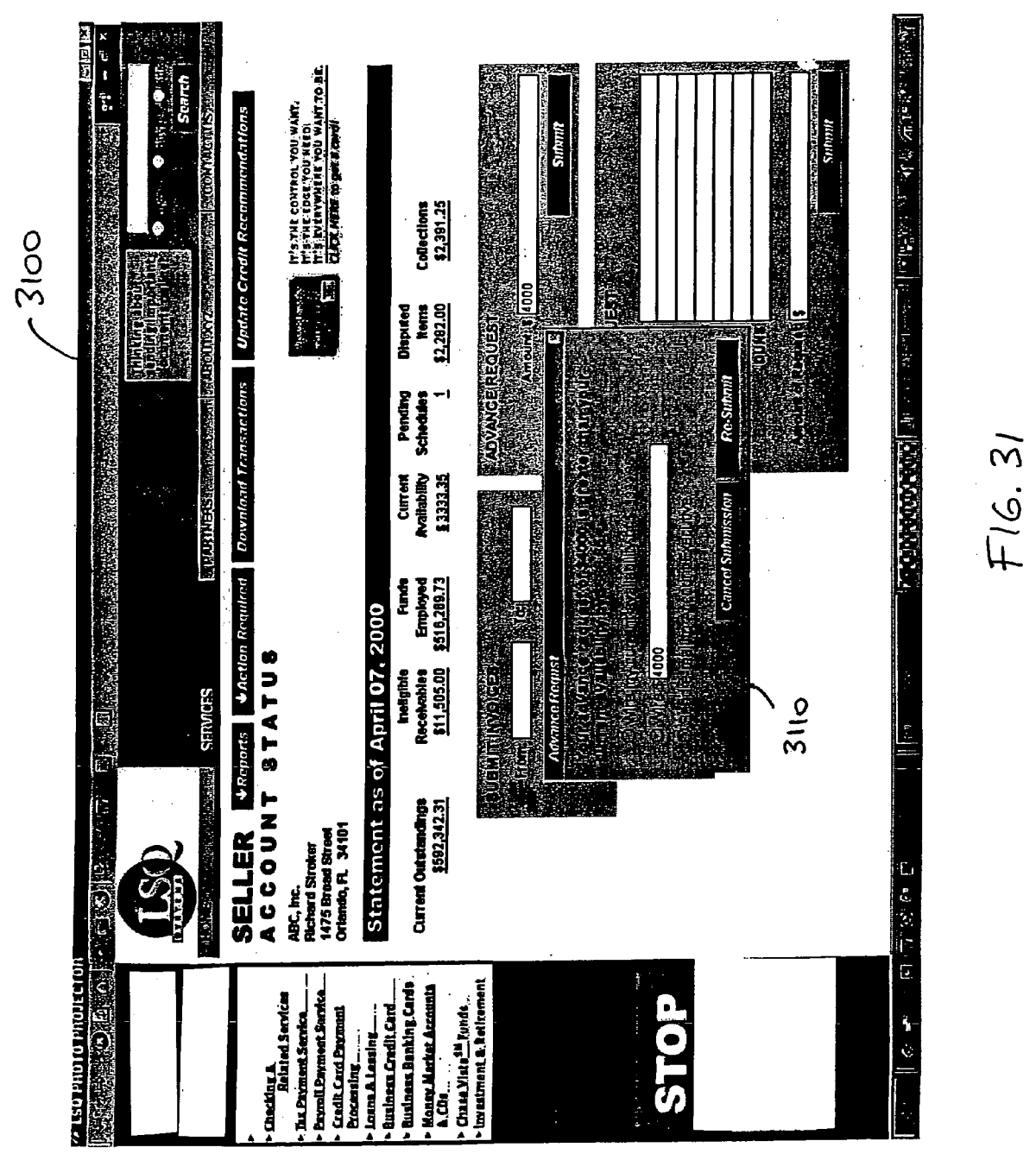

FIG. 31 illustrates an exemplary display screen 3100. Display screen 3100 features a pop up window 3110. Window 3110 is displayed when the user fills data entry field 3021 with a numerical value greater than the numerical value in the information field labeled "Current Availability" and then clicks on the submit button in region 3020. System 100 aids the user in obtaining alternative financing if the amount requested by the user is greater than the amount available. In effect, the user is making a request for financing from transaction management and financial services system 100. If the amount requested is not greater than the amount the user has currently available, the request simply is granted and the information fields would be updated to reflect this change.

However, if the amount requested is greater than the amount the user has available, window 3110 displays a selection field listing alternative financing methods that are available to the user. In an exemplary embodiment, window 3110 displays a list of selectable alternatives to the request along with a button labeled "Submit" and a button labeled "Cancel".

Figure 32:
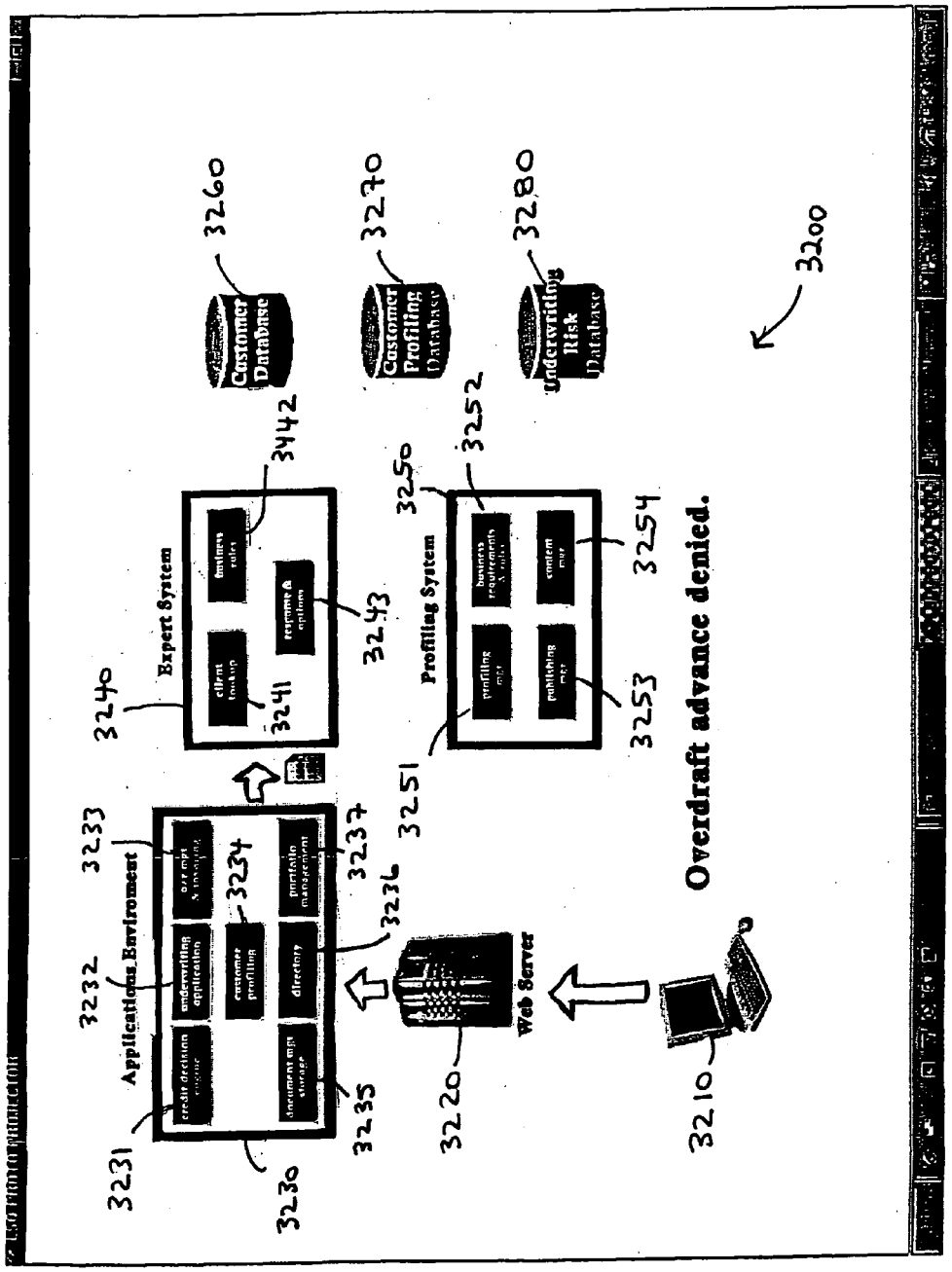
FIG. 32 is a flow diagram illustrating an exemplary method for processing the request for funding shown in FIG. 30.

FIG. 32 illustrates an exemplary system 3200 for implementing the request for an advance that is greater than available funds transaction described above with reference to FIGS. 29, 30, and 31 within transaction management and financial services system 100. System 3200 includes a client computer 3210, a web server 3220 hosting an applications environment 3230, an expert system 3240, a profiling system 3250, a customer database 3260, a customer profiling database 3270, and a underwriting risk database 3280. Application environment 3230 includes a credit design engine 3231, an underwriting application 3232, an account receivable management and invoicing engine 3233, a customer profiling engine 3234, a document management and storage engine 3235, a directory 3236, and a portfolio management engine 3237. Expert system 3240 includes a client lookup function 3241, business rules 3242, and a database of responses and options 3243. Profiling system 3250 includes a profiling manager 3251, business requirements and rules 3252, a publishing manager 3253, and a content manager 3254.

In an exemplary transaction using system 3200 illustrated in FIG. 32, the user requests an advance as described above. The request from the client is sent from client computer 3210 to web server 3220. Web server 3220 delivers the request of a client to applications environment 3230. Within applications environment 3230, the request is processed by portfolio management engine 3237. Expert system 3240 is engaged or spawned by portfolio engine 3237 to evaluate the request. Expert system 3240 indexes that client in customer database 3260, and then compares that customer's request against business rules 3242 using information in underwriting risk database 3280. An example of a business rule can be a rule that any client that has a dilution of greater than 15% or that has greater than 15% of receivables that are older than 60 days, does not get an over advance. Expert system 3240 crafts an appropriate response that is communicated to client computer 3210.

In an exemplary implementation, the response detailed above can be stored in customer database 3260 and indexed into a stored database containing all of the transaction for that particular customer. In an exemplary embodiment, additional steps can be taken following a denial for an over advance to a customer. The customer can be profiled to determine whether the financial institution for that person has any products or services that may be able to meet the needs for the customer.

If the customer requests an over advance and is denied, the customer profile is analyzed and compared to the requirements for any products and services offered by the financial institution chosen by the customer. If the requirements are met for any particular product or service, that product or service is offered to the user at the same time as the denial of the over advance request. System 100 is able to offer those services that are available to the customer at the time when they are most in need of the services.

In an exemplary embodiment, system 3200 references customer database 3260 for a particular customer. Profiling manager 3251 applies the customer information to business requirements and rules 3252 and compares the results to a set of requirements provided by the financial institution to determine which products and services are appropriate for that customer. Content manager 3254 contains banners and other information for the products and services that is delivered to publishing manager 3253. Publishing manager 3253 stores a record of the current web page and the best location for the display of the banners and other information for the products and services offered. Publishing manager 3253 also sends notice to customer database 3260 that an offer for products or services has been made. Because the customer database is continuously being updated with transactions and other information, the products and services available to the customer can change over time.

Figure 33:
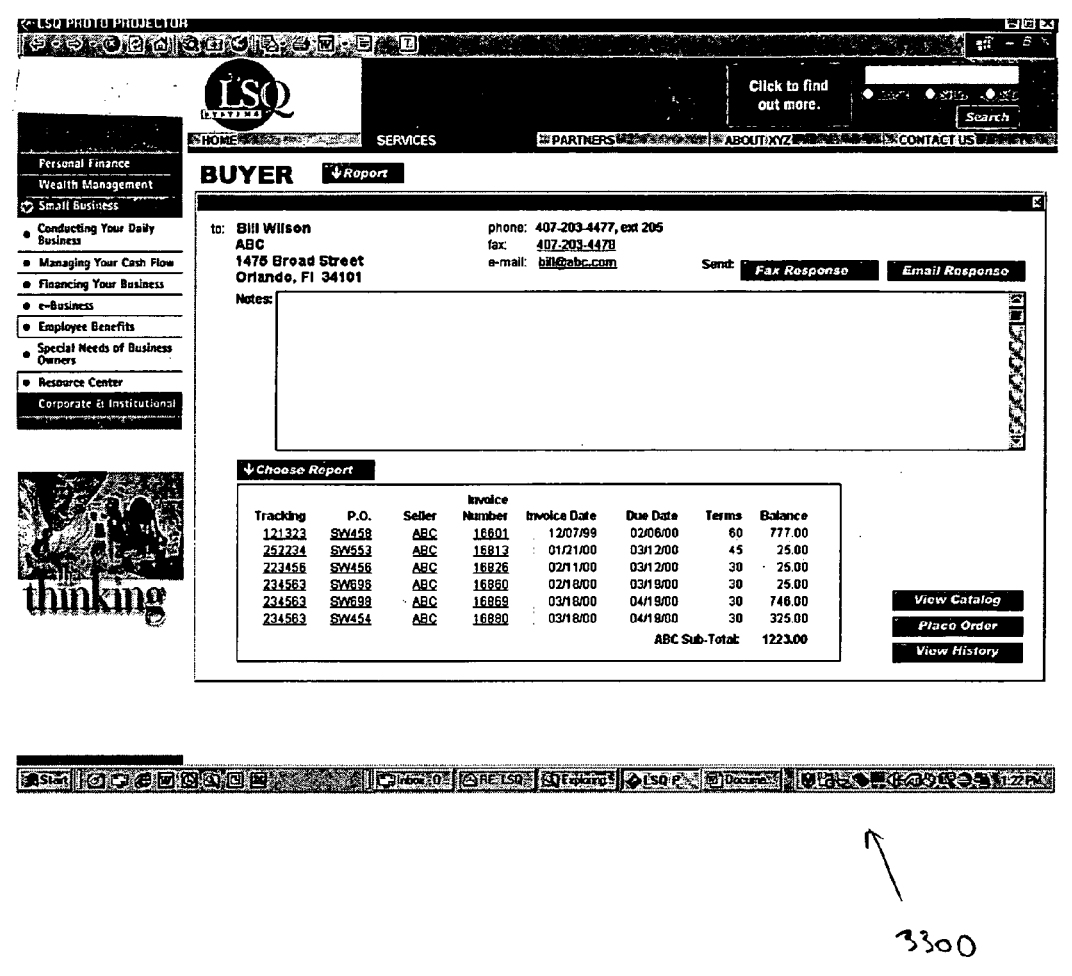

FIG. 33 illustrates an exemplary display screen 3300 displayed when the buyer selects a seller listed in an account statement, such as the account statement described with reference to FIG. 22. Display screen 3300 illustrates one example of the communication modality provided by system 100. In an exemplary embodiment, display screen 3300 includes contact information, such as e-mail address, mailing address, fax number, phone number, etc. Display screen 3300 can also include reports containing hypermedia links to commercial transaction information, such as invoices, seller information, tracking data, etc. as described previously. Advantageously, display screen 3300 illustrates that the buyer can communicate with the buyer using fax or e-mail from within system 100. Customer information does not have to be retrieved from other sources, including personal computers, black books, network servers, or other external information sources. In addition, the fax and e-mail functionality of system 100 allows information to be automatically pre-populated and transmitted. For example, in one embodiment, a report can be attached to a fax or e-mail from within system 100 by selecting the report from a menu on display screen 3300. Advantageously, when sent in e-mail format, these reports include hypermedia links to commercial transaction information. In either fax or e-mail form, communication between participants is made more efficient and effective.

Figure 34:
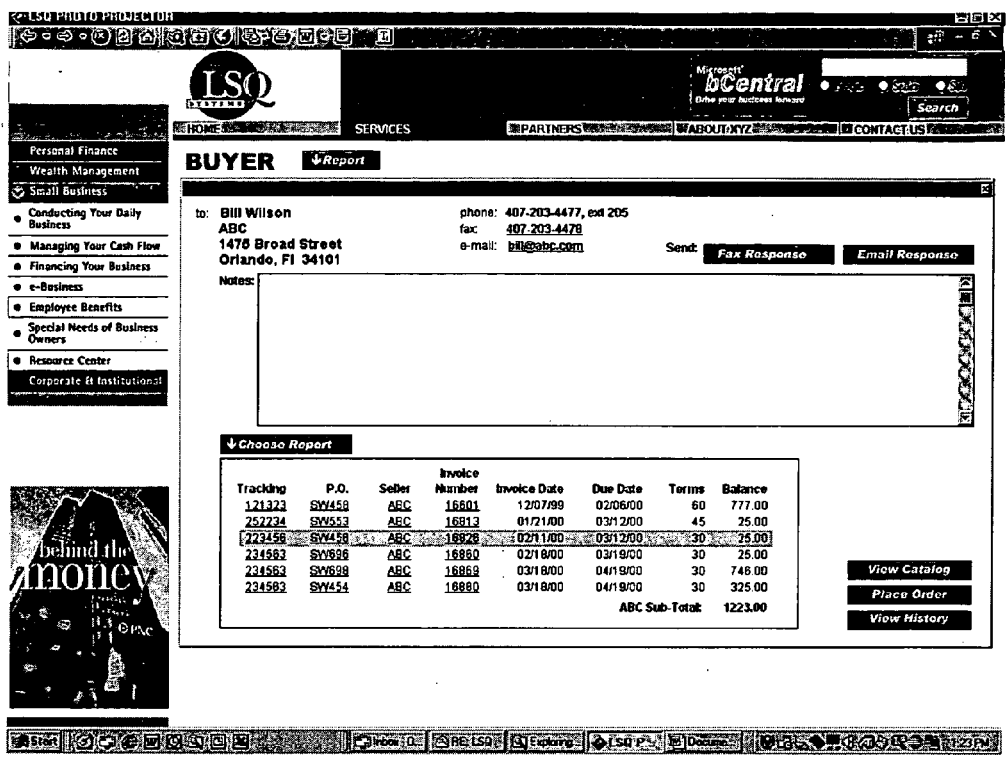
FIG. 34 is an exemplary screen display illustrating the selection of one row of information associated with an invoice that can be communicated using the communication functionality available to a buyer in the transaction management and financial services system illustrated in FIG. 1.

FIG. 34 illustrates an exemplary display screen 3400 displayed when the buyer selects commercial transaction information to attach to a communication with another participant in system 100. Advantageously, attaching information that is pertinent to the communication improves the efficiency and effectiveness of the communication. Additionally, hypermedia links contained within the attached commercial transaction information further increase the efficiency and effectiveness of the communication.

Figure 35:
FIG. 35 is an exemplary screen display illustrating a collections activity related to a seller in the transaction management and financial services system illustrated in FIG. 1.

FIG. 35 illustrates an exemplary display screen 3500 identifying collection activity for a seller over a given period of time. Specifically, display screen 3500 includes all commercial transaction information relevant to a received payment, including the invoice being paid, date of payment, date of invoice, amount of payment, the name of the debtor making the payment, check number, invoice credits, etc. In addition, images of commercial transaction information can be accessed using hypermedia links. To illustrate some of the advantages relevant to the use of display screen 3500, the following example is given. If the invoice is not paid in full, a credit appears on display screen 3500. Clicking on hypermedia link 3510 or 3520 displays the image of the check and remittance advice in which a short payment was taken. One example image is illustrated in FIG. 36.

Figure 36:
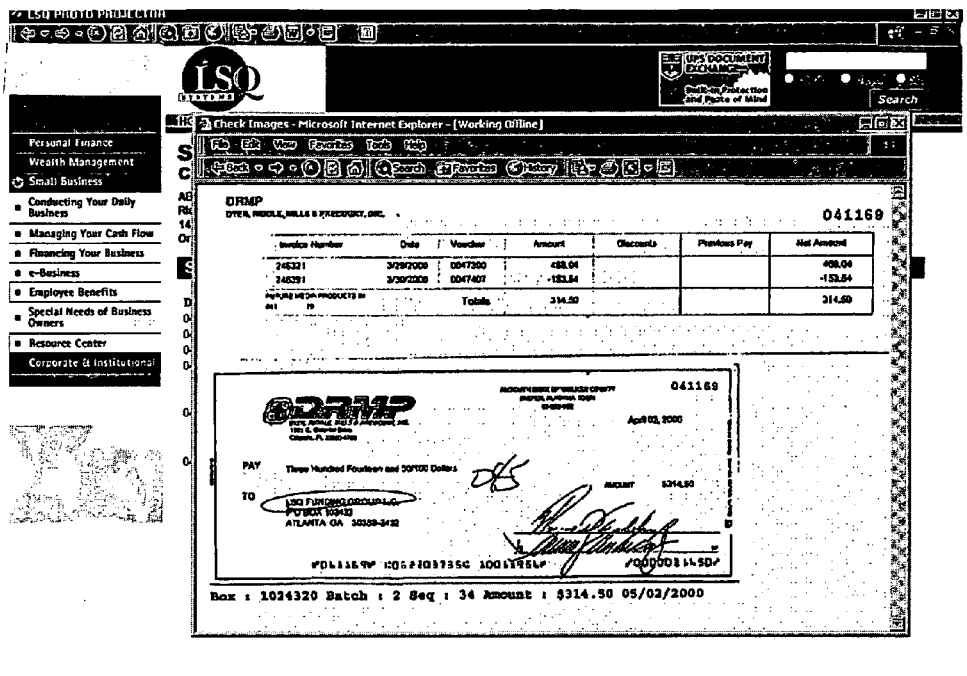
FIG. 36 is an exemplary screen display illustrating an image of a check payment accessed from the screen display illustrated in FIG. 35.
Figure 37:
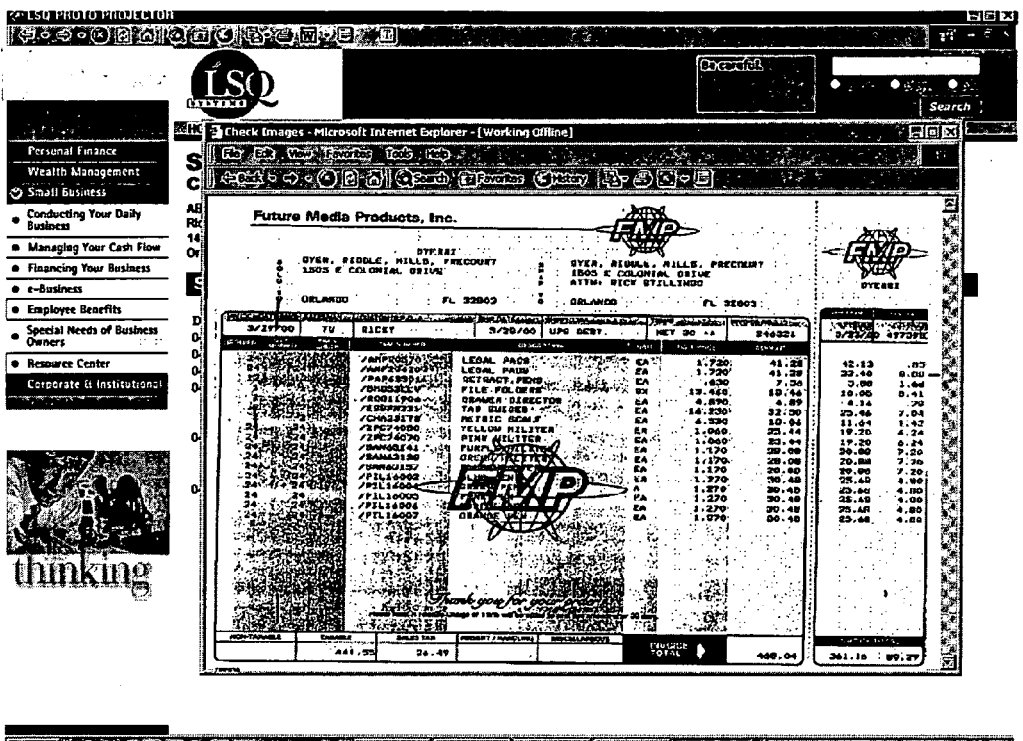
FIG. 37 is an exemplary screen display illustrating an image of an invoice accessed from the screen display illustrated in FIG. 35.

FIG. 36 illustrates an exemplary display screen 3600 of an image display of a check and a remittance advice from a debtor having made a payment directly to system 100. The image is displayed when a hypermedia link 3510 is selected from display screen 3500 (FIG. 35). In the example described above, the seller identifies the short payment and seeks to obtain additional information for management purposes. For example, the seller may view an image of the invoice which was short paid by clicking on a hypermedia link 3530 (FIG. 35). An exemplary invoice is illustrated in a display screen 3700 shown in FIG. 37.

Figure 38:
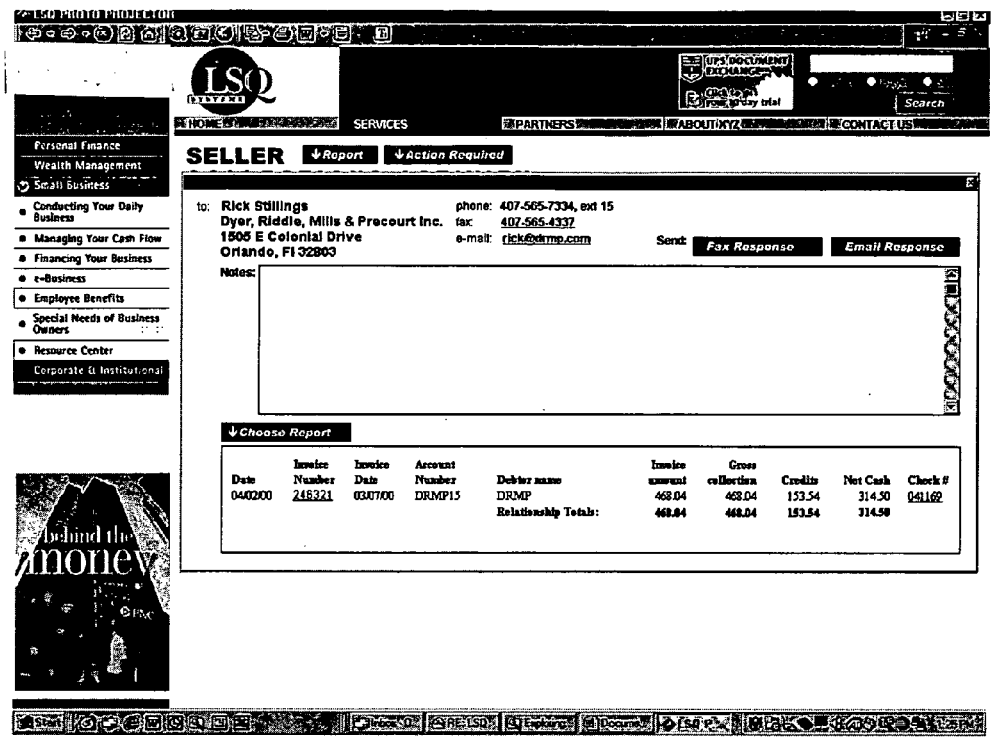
FIG. 38 is an exemplary screen display illustrating a window including communication functionality available to a seller in the transaction management and financial services system illustrated in FIG. 1.

Having viewed the check and invoice, the seller may determine that the short payment was unauthorized. The seller can then communicate with the debtor. Advantageously, by clicking on the debtor name on the collection activity screen of display screen 3500, the seller can view a display screen 3800 illustrated in FIG. 38. Display screen 3800 can include contact information for the debtor, such as e-mail address, mailing address, fax number, phone number, etc. Display screen 3800 can also include reports containing hypermedia links to commercial transaction information, such as invoices, debtor information, tracking data, etc. Advantageously, display screen 3800 illustrates that the seller can communicate with the debtor using fax or e-mail from within system 100. Debtor information does not have to be retrieved from other sources, including personal computers, black books, network servers, or other external information sources. Further, in one embodiment where the seller is trying to resolve an unauthorized short payment, the seller can easily attach invoice and payment information, including hypermedia links and/or images to a fax or e-mail initiated within system 100. As explained above with reference to FIGS. 33-34, communication between participants is made more efficient and effective.

While the embodiments illustrated in the FIGURES and described above are presently preferred, it should be understood that these embodiments are offered by way of example only. Other embodiments may include various processes for carrying out the functions described. Further, various data structures, networks, communication systems, and computing devices may be included or substituted for those described herein. The invention is not limited to a particular embodiment, but extends to various modifications, combinations, and permutations that nevertheless fall within the scope and spirit of the appended claims.

What is claimed is:

1. In a transaction management and financial services system configured to communicate between a server and at least one remote device via a network, a method comprising:

Providing a screen display indicating an affiliation with a referring party;

Receiving a referral from the referring party, the referral including information regarding any of a financing-seeking party that has been declined by the referring party, a transaction management-seeking party, a trade credit-seeking party, and a credit guarantee-seeking party;

Receiving commercial transaction information associated with the referral;

Storing the information regarding the referral and the received commercial transaction information in a storage device;

Determining, by a computer system, whether the referral satisfies system-based parameters;

If the referral satisfies system-based parameters, determining, by the computer system, whether the system has sufficient information to engage the referral;

If the system has sufficient information, engaging the referral;

If the referral becomes engaged, establishing an account for the referral;

Providing, by the computer system, operations which can be performed by the referral, the operations associated with managing a commercial transaction;

Capturing data access information, by the computer system, associated with what data is accessed by the referral using the provided operations;

Forming a profile, by the computer system, for the referral that includes the captured data access information; and Storing the formed profile in the storage device.

2. The method of claim 1, wherein the referral is received from a credit processing center of a financial institution.

3. The method of claim 1, wherein the referral is received from any of a centralized processing center of a financial institution, a centralized underwriting center of a financial institution, a financial institution, and an electronic commerce site.

4. The method of claim 1, if the referral party does not satisfy system-based parameters, further comprising forwarding information regarding the referral to a third party.

5. The method of claim 1, wherein the commercial transaction information comprises any one of invoices, purchase orders, shipping documentation, check copies, check remittance information, credit memos, time tickets, and other documentation associated with commercial transactions.

6. The method of claim 1, where there is not sufficient information to engage the referral, further comprising obtaining additional information from the referral.

7. The method of claim 1, where there is sufficient information to engage the referral and the referral is a financing-seeking party, further comprising providing a proposal for financing to the financing-seeking party.

8. The method of claim 7, further comprising receiving a response to the proposal from the financing-seeking party.

9. The method of claim 8, if the received response is a rejection of the provided proposal, further comprising providing an alternative financing proposal.

10. The method of claim 1, wherein the commercial transaction information is received from the referral.

11. The method of claim 1, wherein receiving the commercial transaction information comprises receiving electronic commercial transaction information, receiving paper-based commercial transaction information, converting the paper-based commercial transaction information into an electronic format, and storing the received commercial transaction information in a central server computer.

12. The method of claim 11, wherein the account is established within a the marketplace comprising buyers and sellers.

13. The method of claim 12, wherein the marketplace comprises a centralized repository of commercial transaction information for buyers and sellers.

14. The method of claim 12, wherein the provided operations which can be performed within the marketplace and comprise any of trade credit underwriting, financing, and modification and customization of a screen display at a remote device in communication with the server.

15. The method of claim 14, wherein trade credit underwriting comprises any of receiving a request to approve a buyer for trade credit; responding to the request by analyzing the buyer for trade credit eligibility; obtaining additional information on the buyer, where there is insufficient information to analyze the buyer for trade credit eligibility; and making a recommendation to the requesting party as to the eligibility of the buyer for trade credit.

16. The method of claim 15, wherein the additional information may include information obtained from any of the buyer seeking trade credit approval and external information sources.

17. The method of claim 16, wherein the information received from the buyer comprises any of length of time in business, number of employees, industry, sales size, credit references, banking references, type of business, financial information, and other buyer information.

18. The method of claim 16, wherein the external information sources comprise any of banks; suppliers; credit agencies; identification verification companies; local, state, federal, and international governments; and information gathering firms.

19. The method of claim 18, wherein the external information from banks comprises any of information on credit facilities to the buyer seeking trade credit approval, average size of bank balances, performance histories including overdraft frequency, credit facility default history, and other banking records relating to the buyer seeking trade credit approval.

20. The method of claim 18, wherein the external information from suppliers comprises any of information on the length of their relationship with the buyer seeking trade credit approval, average credit extended to the buyer seeking trade credit approval, payment performance history of the buyer seeking trade credit approval, products sold to the buyer seeking trade credit approval, degree of satisfaction with the performance of the buyer seeking trade credit approval, and other information concerning their relationship with the buyer seeking trade credit approval.

21. The method of claim 18, wherein the external information from credit agencies comprises any of length of time in business, number of employees, industry, sales size, bank of record, secured party information, payment performance history, type of business, financial information, organizational history, owner biographical information, and other buyer information.

22. The method of claim 18, wherein the external information from identification verification companies comprises authentication of buyer identity.

23. The method of claim 18, wherein the external information from local, state, federal, and international governments comprises any of corporate documents including articles of incorporation, corporate filing documents, information containing identification of the officers of the company, information contained within SEC filing documents, and other information available through various governments.

24. The method of claim 14, wherein financing comprises any of receiving information regarding a financing seeking party; where there is sufficient information to make a proposal, making a proposal to provide financing to the financing seeking party; where there is not sufficient information to make a proposal, obtaining additional information; and if the proposal is declined, providing an alternative financing proposal.

25. The method of claim 24, wherein sufficient information comprises any ene of financial information of the financing-seeking party, articles of incorporation of the financing-seeking party, customer list of the financing-seeking party, vendor list of the financing-seeking party, organizational history of the financing-seeking party, detailed lists of assets and liabilities of the financing-seeking party, number of employees of the financing-seeking party, industry of the financing-seeking party, type of business of the financing-seeking party, key employee biographies and responsibilities of the financing-seeking party, and other information on the financing-seeking party.

26. The method of claim 14, wherein the referral includes any of a specific company user and a specific individual user.

27. The method of claim 26, wherein the profile comprises information associated with how a display of data on the screen display is modified by the referral.

28. The method of claim 26, wherein the profile further comprises information gathered during any of the operations of trade credit underwriting and financing.

29. The method of claim 26, further comprising customizing a look and feel of the screen display based on the profile established for the referral.

30. The method of claim 26, further comprising customizing the content of the screen display based on the profile established for the referral.

31. The method of claim 26, further comprising customizing advertisements provided on the screen display based on the profile established for the referral.

32. The method of claim 31, wherein the advertisements are specific to the referring party.

33. The method of claim 26, further comprising customizing the presentation of referring party products and services to the screen display based on the profile established for the referral.

34. The method of claim 26, wherein the profile comprises attributes determined by an external party.

35. The method of claim 34, wherein the external party comprises any of an advertiser, referring party, financial institution, and any corporate entity.

36. The method of claim 34, further comprising providing a means for any of accessing, analyzing, interpreting, modifying, and retrieving attributes of the profile.

37. The method of claim 2, wherein the profile comprises system-defined attributes.

38. The method of claim 1, wherein managing the commercial transaction comprises any of aggregating commercial transaction information including images to a central server computer; providing access to ancillary commercial transaction information through the central server computer to facilitate management, maintenance, and conclusion of commercial transactions; enabling external users to access the central server computer to modify commercial transaction information, to electronically reconcile modifications of commercial transaction information with an accounting system located at a remote device, to conclude and electronically reconcile commercial transaction information with an accounting system located at a remote device; receipt and application of electronic and paper-based payment; storing payment information, including images, within the central server computer; and facilitating the management and collection of payments; allowing buyers and seller to electronically reconcile payment information with an accounting system located at a remote device.

39. The method of claim 38, wherein the ancillary commercial transaction information comprises any of electronic shipping information, bank account information, and other information necessary to manage, maintain, and conclude commercial transactions.

40. The method of claim 38, wherein the step of aggregating commercial transaction information comprises linking commercial transaction information to the associated commercial transaction and accounts of a buyer and seller that are parties to the commercial transaction.

41. The method of claim 38, wherein commercial transaction management further comprises providing dispute resolution, comprising the steps of:
   receiving dispute information related to an invoice, the dispute information including information identifying the disputed invoice, the invoice having an invoice issuer and an invoice recipient;
   communicating the dispute information to the invoice issuer; and
   providing for communication between the invoice issuer and the invoice recipient to facilitate resolution of the dispute.

42. The method of claim 36, further comprising providing access to commercial transaction documentation to both the buyer and the seller, commercial transaction documentation including commercial transaction information and ancillary commercial transaction information.

43. The method of claim 1, wherein the captured data access information can be information regarding any of advance requests, over advance requests, credit availability, and communications with financing seeking party.

44. The method of claim 1, wherein a look and feel of a screen display furthers brand exposure of the referring party.

45. The method of claim 1, wherein a look and feel of a screen display comports with a brand image of the referring party, whereby an impression is created that the operations of the transaction management and financial services system are being performed by the referring party.

46. The method of claim 1, wherein a look and feel of a screen display comports with a brand image of the referring party, whereby an impression is created that the operations of the transaction management and financial services system are being performed in affiliation with the referring party.

47. The method of claim 1, wherein the screen display is wholly representative of the referring party.

48. The method of claim 1, further comprising:
   evaluating the referral to determine whether the referral meets system-determined underwriting criteria, the system-determined underwriting criteria being variables used to determine whether the services and products of the system meets the needs of the referral; and
   if the referral does not meet system-determined underwriting criteria, seeking an alternative provider for the referral.

49. The method of claim 48, wherein the step of seeking an alternative provider for the referral comprises communicating application information on the referral to potential alternative providers; and receiving bids from potential alternative providers and communicating bids to the referral.

50. The method of claim 48, wherein the step of seeking an alternative provider for the referral comprises receiving bids from potential alternative providers; selecting a bid from the received bids; and communicating the selected bid to the referral as a system-branded bid.

51. The method of claim 48, wherein the step of seeking an alternative provider for the referral comprises matching application information for the referral to underwriting guidelines of a plurality of alternative financing providers and determining whether one or more matches exist.

52. The method of claim 51, further comprising notifying the alternative provider and the referral of the match.

53. The method of claim 52, wherein the match is provided on a private label basis, reflecting the brand of the transaction management and financial services system and the referring party.

54. The method of claim 52, wherein the match is provided on a co-branded label basis, reflecting the brand of the transaction management and financial services system and the alternative provider.

55. The method of claim 52, wherein the match reflects only the brand of the referring party.

56. The method of claim 1, further comprising:
   compiling a list of names and information associated with providers of commercial transaction management services; and
   communicating the list associated with providers of commercial transaction management services for presentation at a remote device.

57. A system configured to provide transaction management and financial services and to communicate between a server and at least one remote device via a network, the system comprising:
   means for providing a screen display indicating an affiliation with a referring party;
   means for receiving a referral from the referring party, the referral including information regarding any of a financing-seeking party that has been declined by the referring party, a transaction management-seeking party, a trade credit-seeking party, and a credit guarantee-seeking party;
   means for receiving commercial transaction information associated with the referral;
   means for storing the information regarding the referral and the received commercial transaction information in a storage device;
   means for determining whether the referral satisfies system-based parameters;
   if the referral satisfies system-based parameters, means for determining whether the system has sufficient information to engage the referral;
   if the system has sufficient information, means for engaging the referral;
   if the referral becomes engaged, means for establishing an account for the referral;
   means for providing operations which can be performed by the referral the operations associated with managing a commercial transaction;
   means for capturing data access information associated with what data is accessed by the referral using the provided operations;
   means for forming a profile for the referral that includes the captured data access information; and
   means for storing the formed profile in the storage device.

58. A computer program product comprising computer readable program code for handling declinations, the program code in the computer program product comprising:
   the computer readable program code configured to:
   provide a screen display indicating an affiliation with a referring party;
   receive a referral from the referring party, the referral including information regarding any of a financing-seeking party that has been declined by the referring party, a transaction management-seeking party, a trade credit-seeking party, and a credit guarantee-seeking party;

receive commercial transaction information associated with the referral;

store the information regarding the referral and the received commercial transaction information in a storage device;

determine whether the referral satisfies system-based parameters;

if the referral satisfies system-based parameters, determine whether the system has sufficient information to engage the referral;

if the system has sufficient information, engage the referral;

if the referral becomes engaged, establish an account for the referral;

provide operations which can be performed by the referral, the operations associated with managing commercial transaction;

capture data access information associated with what data is accessed by the referral using the provided operations;

form a profile for the referral that includes the captured data access information; and store the formed profile in the storage device.

\* \* \* \* \*